United States Patent [19]

Nakamura et al.

[11] Patent Number: 4,875,016

[45] Date of Patent: Oct. 17, 1989

[54] TRANSDUCER AND RELATED CIRCUITRY

[75] Inventors: Hideaki Nakamura, Joyo; Tamotsu Shimamori, Nagaokakyo; Shinichi Murashige, Kyoto, all of Japan

[73] Assignee: Omron Tateisi Electronics Company, Nagaokakyo, Japan

[21] Appl. No.: 85,963

[22] Filed: Aug. 17, 1987

Related U.S. Application Data

[62] Division of Ser. No. 903,976, Sep. 5, 1986.

[30] Foreign Application Priority Data

| Sep. 5, 1985  | [JP] | Japan | 60-196714 |
| Sep. 27, 1985 | [JP] | Japan | 60-215645 |
| Oct. 28, 1985 | [JP] | Japan | 60-241808 |
| Oct. 28, 1985 | [JP] | Japan | 60-241809 |

[51] Int. Cl.⁴ .................................. H03K 5/00
[52] U.S. Cl. ......................... 328/26; 307/261; 307/494; 328/144
[58] Field of Search ............... 307/261, 490, 494, 529; 328/26, 144

[56] References Cited

U.S. PATENT DOCUMENTS

| 3,564,389  | 2/1971  | Richman        | 328/26  |
| 3,628,160  | 12/1971 | Pickering      | 328/144 |
| 3,652,945  | 3/1972  | Nakane et al.  | 328/144 |
| 3,795,868  | 3/1974  | Ohme et al.    | 307/261 |
| 4,494,183  | 1/1985  | Bayer et al.   | 364/154 |
| 4,494,399  | 1/1985  | Youngman       | 73/1    |
| 4,644,478  | 2/1987  | Stephens et al.| 364/550 |

FOREIGN PATENT DOCUMENTS

| 3244878 | 6/1983  | Fed. Rep. of Germany . |
| 56-79908 | 6/1981 | Japan . |
| 1577900 | 10/1980 | United Kingdom . |

OTHER PUBLICATIONS

Measurement Techniques, vol. 23, No. 5, May 1980, pp. 454–457, Plenum Publ. Corp., New York, US N. N. Zhelbakov et al.: Transducer of Effective AC into DC Voltages, FIGS. 1, 2.

IEEE Transactions on Instrumentation and Measurement, vol. IM-20, No. 4, Nov. 1971, pp. 313–319, IEEE, New York, US P. Richman et al.: A New Fast Computing RMS-to-DC Conversion, pp. 313–319.

Electronique et Microelectronique Industrielles, No. 151, Feb. 15, 1972, pp. 49–53, J. C. Maillet: Circuit de Mesure de la Valeur Efficace d'Un Signal Electrique.

IBM Technical Disclosure Bulletin, vol. 14, No. 2, Jul. 1971, pp. 523–524, New York, US, H. A. Higuchi: Active Equivalent Series Resistance Filter—Whole Article.

Electrical World, vol. 185, No. 12, Jun. 15, 1976, pp. 137–138, McGraw Hill Pub. Co., New York, US, Data-Acquisition System.

JP-A-60-111 166 (Takemoto Denki Keiki K.K.) Abstract.

JP-A-59 43 408 (Tokyo Shibaura Denki K.K.) 10-03-1984 Abstract.

*Primary Examiner*—John Zazworsky
*Attorney, Agent, or Firm*—Foley & Lardner, Schwartz, Jeffery, Schwaab, Mack, Blumenthal & Evans

[57] ABSTRACT

A transducer which converts an analog input signal into an analog output signal whose level corresponds to the level of the analog input contains an A/D converter and comparison means for indicating when the value of digital A/D output exceeds or falls below certain limits and includes an AC effective value-DC conversion circuit which avoids expensive square root circuitry while providing accurate conversion. A rectified voltage and a feedback voltage are applied to a current squaring circuit whose output is applied to an averaging circuit. The squaring circuit has a first conversion means for generating a current proportional to the rectified input and a second conversion means for dividing the sum of the rectified and feedback voltages, and converting the result to a rectified current. The currents are then summed and supplied to the averaging means.

3 Claims, 41 Drawing Sheets

(A)

(A)

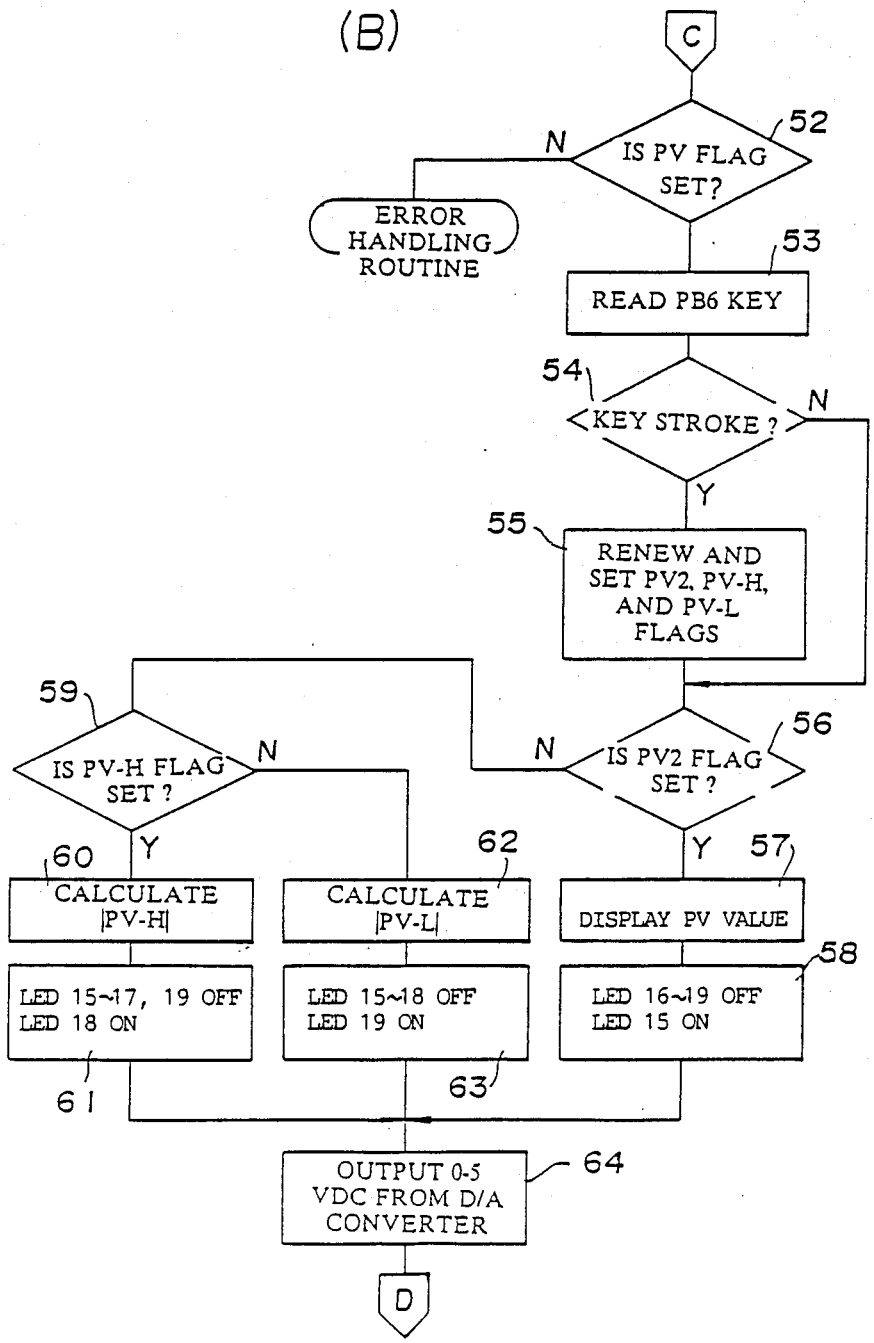

(B)

(B)

(C)

TRANSDUCER AND RELATED CIRCUITRY

This application is a division of application Ser. No. 903,976, filed Sept. 5, 1986.

BACKGROUND OF THE INVENTION

The present invention relates to a transducer for converting a physical quantity such as an electric current, an electric voltage, or a temperature or a pressure or the like into a linearized output which is restricted within a certain range, and more particularly relates to such a transducer which incorporates into itself some of the functions of a meter relay.

A conventional type of transducer, taking the exemplary case of for instance a voltage transducer, converts an inputted voltage of a potential transformer (referred to as PT hereinafter), which may range over the AC voltage range of for example about 0 to about 150 volts AC, into a DC voltage range of for example about 0 to about 5 volts DC, while on the other hand a current transducer converts an electric current obtained from a current transformer (referred to as CT hereinafter) into a DC voltage which may similarly vary over a certain range. Thus, the output of the transducer corresponds to the inputted physical quantity; and, when additionally it is required not only to display the input signal value but also an upper and a lower limit value for said input signal are required to be set up, and when it is further required to produce an output signal when the input signal value passes either of said limit values, i.e. exceeds the higher such limit value or drops below the lower such limit value, a so called meter relay is additionally required. However, since such a meter relay and such a transducer are, conventionally, different devices, and since they are required to be wired into a circuit individually, the problems have arisen that the wiring tends to become complicated, and the space required for installation of the combination tends to become rather substantial. Furthermore, since some disagreement may occur between the output voltage of the transducer and the upper and the lower limit values at which the meter relay is activated, the level of actual practical usability may not be as high as desirable. Additionally, when a control system is formed by applying such a transducer and such a meter relay to a sequencer or the like, the adjustment of the overall system is difficult unless an output signal of substantially predetermined specifications is supplied by the transducer to the system.

Further, in such a transducer, the problem has arisen in the prior art that the difference between the current value and the lower limit, or the difference between the current value and the upper limit, cannot be readily recognized or displayed.

Another desirable feature for such a transducer would be to have as high a current handling capacity as possible, or alternatively to be able to control two independent circuits at one time.

A yet further desirable feature for such a transducer would be for the setting of the values for the upper and the lower limit to be ensured to be foolproof. In other words, it would be desirable for it not to be possible to input a mistaken value for the upper limit or for the lower limit, and for transducer operation to continue based upon such a mistaken value. In the prior art, the inputting of such and upper limit or of such a lower limit has been conventionally performed by the use of a thumb wheel type rotary switch or the like, and no practical form of restriction upon such a rotary switch can usefully be imposed.

Further, this type of transducer incorporates, typically, one or more A/D converter circuits. Now, such an A/D converter circuit may be a so called AC effective value-DC conversion circuit, which is a circuit for finding the effective value of an AC signal and for converting it into a DC signal according to the effective value. A conventional AC effective value-DC conversion circuit comprises a squaring circuit for squaring an input signal, an averaging circuit for averaging the output of the squaring circuit by integrating it, and a square rooting circuit for square rooting the output of the averaging circuit, and is known in, for example, a form which is incorporated into a monolithic IC. Such a structure is detailed in, for example, pages 421 to 422 of the publication "Jitsuyo Denshi Handbook (4), Fifth Edition, which was published on approximately Nov. 1, 1983 by CQ Shuppan KK.

However, since such a conventional AC effective value-DC conversion circuit which is incorporated into a monolithic IC has required a square rooting circuit, its circuit structure has tended to be extremely complex and was therefore expensive. Furthermore, in spite of such high cost, its reliability has not proved to be quite satisfactory.

A previously proposed AC effective value-DC conversion circuit of another type comprises a rectifier and a time constant circuit consisting of a resistor and a capacitor, and conducts a pseudo effective value conversion by setting the time constant of the time constant circuit to a certain special value. This conversion circuit has the advantage of simplicity but is not precise in its conversion accuracy, making it unsuitable for precise effective value conversion.

Also, a requirement has arisen for an improved ripple removal circuit which can be applied when an AC signal is converted into a DC signal and the DC signal is supplied to an AD converter so that a certain appliance can be digitally controlled for instance in an AC effective value-DC conversion circuit. In the prior art, in the case of such an original signal, if an AC component is superimposed on the DC component of the original signal and the level of the ripple thereof is substantial, conversion errors in AD connversion can happen by confusing "L" level for "H" level. Therefore, conventionally, to the end of removing such a ripple, the rectified output from a rectifying circuit for converting an AC signal into a DC signal has been typically smoothed by a smoothing capacitor. However, in such a conventional situation, the capacitance of the capacitor is desired to be high to the end of better removing the ripple, but, as shown in FIG. 26 of the accompanying drawings, if the capacitance of the capacitor is excessive and the amplitude of the AC component which is inputted to the rectifying circuit is varied, the response to the amplitude variation is impaired and control errors may occur when highly timewise precise control is attempted, due to errors in the timing of the switch over between "L" and "H" level. Such errors can be reduced by reducing the capacitance of the capacitor but in that case the ripple can not be effectively removed. Thus, the removal of ripples and a high control response present themselves as two conflicting objectives when the ripples are to be removed by a smoothing capacitor, and it has in the prior art been impossible to accomplish the two objectives at the same time.

SUMMARY OF THE INVENTION

The inventors of the present invention considered the various problems detailed above in the case of such a transducer.

Accordingly, it is the primary object of the present invention to provide a transducer, which avoids the problems detailed above.

It is a further object of the present invention to provide such a transducer, which can itself monitor whether or not the signal inputted to it passes certain upper and lower limits, in either direction, and can output an output signal representative of such limit passing, when it occurs.

It is a further object of the present invention to provide such a transducer, which can provide both transducer functions and also meter relay functions.

It is a further object of the present invention to provide such a transducer, in which the functions of a conventional transducer and of a conventional meter relay are integrated, thus ensuring that no substantial disagreement between said functions can arise.

It is a yet further object of the present invention to provide such a transducer, which is compact.

It is a yet further object of the present invention to provide such a transducer, which is easily installed.

It is a yet further object of the present invention to provide such a transducer, which requires only a small space for installation.

It is a yet further object of the present invention to provide such a transducer, which has enhanced usability.

It is a yet further object of the present invention to provide such a transducer, whose output can be adjusted irrespective of the value of the input signal thereto.

It is a yet further object of the present invention to provide such a transducer, which can show the upper limit value and the lower limit value for the signal inputted to it, in a convenient fashion.

It is a yet further object of the present invention to provide such a transducer, which can show, for the signal inputted to it, the difference between the current value and said upper limit value, and the difference between the current value and said lower limit value, in a convenient fashion.

It is a yet further object of the present invention to provide such a transducer, which can thus show, for the signal inputted to it, the difference between the current value and said upper limit value, and the difference between the current value and said lower limit value, by the mere operation of a simple switch.

It is a yet further object of the present invention to provide such a transducer, which can be arranged to be able to control two independent circuits at one time.

It is a yet further object of the present invention to provide such a transducer, which has as high a current and power handling capacity as possible.

It is a yet further object of the present invention to provide such a transducer, in which the setting of the values for the upper and the lower limit is ensured to be foolproof.

It is a yet further object of the present invention to provide such a transducer, which ensures that it is not possible to input a mistaken value for the upper limit or for the lower limit, and for transducer operation to continue based upon such a mistaken value.

It is a yet further object of the present invention to provide such a transducer, which outputs an error indication to the user, if he or she attempts to input such a mistaken value for the upper limit or for the lower limit.

It is a yet further object of the present invention to provide such a transducer, which arbitrarily revises any such mistaken value for the upper limit or for the lower limit, erroneously attempted to be inputted by the user.

It is a yet further object of the present invention to provide an AC effective value-DC conversion circuit, which avoids the problems detailed above with regard to prior art such devices.

It is a yet further object of the present invention to provide a ripple removal circuit, which can effectively remove ripple on one hand, and can provide an improved response on the other hand.

It is a yet further object of the present invention to provide an AC effective value-DC conversion circuit, which is cheap to manufacture and provides superior performance during use.

According to one aspect of the present invention, these and other objects are attained by a transducer, for converting an analog input signal into an analog output signal whose level corresponds to the level of said analog input signal, comprising: (a) an A/D converter for converting said analog input signal into a digital signal; (b) an input device comprising a plurality of switches; (c) an upper limit setting means for setting an upper limit value for said analog input signal, according to operration of said switches of said input device; (d) a lower limit setting means for setting a lower limit value for said analog input signal, according to operation of said switches of said input device; (e) a storage device, for storing a current value of said digital signal output by said A/D converter as converted from said analog input signal and said upper limit value and said lower limit value which are set by said upper limit setting means and said lower limit setting means; (f) a comparison means for comparing said current value of said digital signal output by said A/D converter as converted from said analog input signal, and said upper limit value and said lower limit value, all of which being stored in said storage device; (g) an output means for producing an output when the comparison executed by said comparison means indicates that the current value of said digital signal output by said A/D converter as converted from said analog input signal has exceeded said upper limit value, or has dropped below said lower limit value; and: (h) a D/A converter for converting said digital signal output by said A/D converter as converted from said analog input signal into an analog output signal whose level corresponds to the level of said analog input signal; and, optionally but desirably, said output means may comprise a first relay which is activated when the current value of said digital signal output by said A/D converter as converted from said analog input signal exceeds said upper limit value, and a second relay which is activated when the current value of said digital signal output by said A/D converter as converted from said analog input signal drops below said lower limit value.

Thus, according to the transducer of the present invention, an input signal, which may be such a physical quantity as electric current, electric voltage, temperature, pressure and so on of a certain range is converted into a signal of a certain level while an upper and lower limit value of the input signal are set up in a storage means in such a manner that the function of a meter relay which produces an output when the input signal has exceeded the upper and the lower limit value is incorporated thereinto. According to such a transducer as specified above, thus, there is provided a transducer which can produce a linearized output of a certain range corresponding to an analog input signal, and an output when the input range has passed out from a range defined by a lower limit value and an upper limit value, both of which are set on the setting means therefor. Therefore, the disagreement between the value displayed on the transducer and the output when the upper limit value has been exceeded or the lower limit value has been dropped below are eliminated, and the usability of this transducer is enhanced by comparison with the prior art. Furthermore, as compared to the conventional type of transducer which is required to be combined with a meter relay, the wiring up of the input unit is simplified, and the overall structure is made more compact, thereby providing the advantage of lower cost.

Further, according to certain particular specializations of the present invention, the above specified and other objects are more particularly attained by a transducer as specified above, further comprising a selectably operable means for varying the level of the signal input to said D/A converter; and, optionally but desirably, said level varying means may be controlled from a set of said switches of said input device; and/or may be capable of varying the level of the signal input to said D/A converter substantially continuously; and/or may comprise two relays, one of which is activated when the comparison executed by said comparison means indicates that the current value of said digital signal output by said A/D converter as converted from said analog input signal has exceeded said upper limit value, and the other of which is activated when the comparison executed by said comparison means indicates that the current value of said digital signal output by said A/D converter as converted from said analog input signal has dropped below said lower limit value.

Thus, according to the transducer of the above described aspect of the present invention, the input signal, which again may be such a physical quantity as electric current, electric voltage, temperature, pressure and so on of a certain range is as before converted into a signal of a certain level while an upper and lower limit value of the input signal are set up in a storage means in such a manner that the function of a meter relay which produces an output when the input signal has exceeded the upper and the lower limit values is incorporated thereinto. And the adjustment of the system to which the transducer is connected can be effected by continuously varying the analog output signal by operating a means therefor, such as by depressing a certain switch. In other words, the output signal can be continuously varied irrespective of the input signal by depressing a certain switch. Therefore, not only the action of the transducer can be checked but also the action of the overall system which is based on the output of the transducer can be diagnosed.

Further, according to an alternative particular specialization of the present invention, the above specified and other objects are alternatively attained by a transducer, for converting an analog input signal into an analog output signal whose level corresponds to the level of said analog input signal, comprising: (a) an A/D converter for converting said analog input signal into a digital signal; (b) an upper limit setting means for setting an upper limit value for said analog input signal; (c) a lower limit setting means for setting a lower limit value for said analog input signal; (d) a storage device, for storing a current value of said digital signal output by said A/D converter as converted from said analog input signal and said upper limit value and said lower limit value which are set by said upper limit setting means and said lower limit setting means; (e) a comparison means for comparing said current value of said digital signal output by said A/D converter as converted from said analog input signal, and said upper limit value and said lower limit value, all of which being stored in said storage device; (f) an output means for producing an output when the comparison executed by said comparison means indicates that the current value of said digital signal output by said A/D converter as converted from said analog input signal has exceeded said upper limit value, or has dropped below said lower limit value; (g) a D/A converter for converting said digital signal output by said A/D converter as converted from said analog input signal into an analog output signal whose level corresponds to the level of said analog input signal; (h) a means for displaying said upper limit value, said lower limit value, and said current value; (i) a switching input means, for switching over the display on said display means between said upper limit value and said lower limit value, and said current value; and: (j) a control means for switching over said display of said upper limit value and said lower limit value on said display means as switched over by said switching input means to the display of said current value after the lapse of a certain time interval.

According to such a transducer as specified above, the additional advantage is obtained, that it is possible, by operating the switching input means, to display the upper limit value or the lower limit value on the display means for a certain time interval, and then the display means returns automatically to display the current value. Thus, the possibility of confusing the upper limit value or the lower limit value with the current value is eliminated, in addition to the other advantages of the present invention already specified above.

Further, according to an alternative particular specialization of the present invention, the above specified and other objects are alternatively attained by a transducer, for converting an analog input signal into an analog output signal whose level corresponds to the level of said analog input signal, comprising: (a) an A/D converter for converting said analog input signal into a digital signal; (b) an upper limit setting means for setting an upper limit value for said analog input signal; (c) a lower limit setting means for setting a lower limit value for said analog input signal; (d) a storage device, for storing a current value of said digital signal output by said A/D converter as converted from said analog input signal and said upper limit value and said lower limit value which are set by said upper limit setting means and said lower limit setting means, and further for storing the difference between said upper limit value and said current value, and the difference between said lower limit value and said current value; (e) a comparison means for comparing said current value of said digital signal output by said A/D converter as converted from said analog input signal, and said upper limit value and said lower limit value, all of which being stored in said storage device; (f) an output means for producing an output when the comparison executed by said comparison means indicates that the current value of said digital signal output by said A/D converter as converted from said analog input signal has exceeded said upper limit value, or has dropped below said lower limit value; (g) a D/A converter for converting said digital signal output by said A/D converter as converted from said analog input signal into an analog output signal whose level corresponds to the level of said analog input signal; (h) a means for displaying the difference between said upper limit value and said current value, and the difference between said lower limit value and said current value; and: (i) a switching means, for switching over the display on said display means of said difference between said upper limit value and said current value, and said difference between said lower limit value and said current value.

According to such a transducer as specified above, the transducer can additionally show the difference between said upper limit value and said current value, and the difference between said lower limit value and said current value, by a simple control. Therefore, its operational condition can be readily recognized. Furthermore, discrepancy between the display on the transducer and the output when the upper limit value has been exceeded or the lower limit value has been dropped below can be eliminated, and accordingly the usability of the transducer can be enhanced.

Further, according to an alternative particular specialization of the present invention, the above specified and other objects are alternatively attained by a transducer, for converting an analog input signal into an analog output signal whose level corresponds to the level of said analog input signal, comprising: (a) an A/D converter for converting said analog input signal into a digital signal; (b) an upper limit setting means for setting an upper limit value for said analog input signal; (c) a lower limit setting means for setting a lower limit value for said analog input signal; (d) a storage device, for storing a current value of said digital signal output by said A/D converter as converted from said analog input signal and said upper limit value and said lower limit value which are set by said upper limit setting means and said lower limit setting means; (e) a comparison means for comparing said current value of said digital signal output by said A/D converter as converted from said analog input signal, and said upper limit value and said lower limit value, all of which being stored in said storage device; (f) a first relay which is activated when said current value of said digital signal exceeds said upper limit value; (g) a second relay which is activated when said current value of said digital signal drops below said lower limit value; (h) a D/A converter for converting said digital signal output by said A/D converter as converted from said analog input signal into an analog output signal whose level corresponds to the level of said analog input signal; and: (i) a control means, for substantially simultaneously activating both said first relay and said second relay, when both either said current value of said digital signal exceeds said upper limit value or said current value of said digital signal drops below said lower limit value, and also one of said upper limit value and said lower limit value is not set by said setting means therefor.

According to such a transducer as specified above, as high a current and power handling capacity as possible is provided. Further, according to the particular manner in which said transducer is installed, it is possible to arrange for said transducer to be able to control two independent circuits at one time, when one only of said upper limit value and said lower limit value has been set by said setting means therefor, and when said set one of said upper limit value and said lower limit value has been passed past by said current value.

Further, according to an alternative particular specialization of the present invention, the above specified and other objects are alternatively attained by a transducer, for converting an analog input signal into an analog output signal whose level corresponds to the level of said analog input signal, comprising: (a) an A/D converter for converting said analog input signal into a digital signal; (b) an upper limit setting means for setting an upper limit value for said analog input signal; (c) a lower limit setting means for setting a lower limit value for said analog input signal; (d) a storage device, for storing a current value of said digital signal output by said A/D converter as converted from said analog input signal and said upper limit value and said lower limit value which are set by said upper limit setting means and said lower limit setting means; (e) a comparison means for comparing said current value of said digital signal output by said A/D converter as converted from said analog input signal, and said upper limit value and said lower limit value, all of which being stored in said storage device; (f) an output means for producing an output when the comparison executed by said comparison means indicates that the current value of said digital signal output by said A/D converter as converted from said analog input signal has exceeded said upper limit value, or has dropped below said lower limit value; (g) a D/A converter for converting said digital signal output by said A/D converter as converted from said analog input signal into an analog output signal whose level corresponds to the level of said analog input signal; and: (h) a checking means, for checking whether either said upper limit value as set up to said limit setting means or said lower limit value as set up to said lower limit setting means falls outside the permissible range therefor, and for issuing a re-setup command if said checking process results in a positive outcome.

According to such a transducer as specified above, when inputting the values for the upper limit value and the lower limit value, if any erroneous entry is made that is outside the prescribed limits for the input voltage, an error indication is presented to the user, so that he or she may correct the error and may input a new valid entry. Accordingly, mistaken operation is effectively prevented.

Further, according to an alternative particular specialization of the present invention, the above specified and other objects are alternatively attained by a transducer, for converting an analog input signal into an analog output signal whose level corresponds to the level of said analog input signal, comprising: (a) an A/D converter for converting said analog input signal into a digital signal; (b) an upper limit setting means for setting an upper limit value for said analog input signal; (c) a lower limit setting means for setting a lower limit value for said analog input signal; (d) a storage device, for storing a current value of said digital signal output by said A/D converter as converted from said analog input signal and said upper limit value and said lower limit value which are set by said upper limit setting means and said lower limit setting means; (e) a comparison means for comparing said current value of said digital signal output by said A/D converter as converted from said analog input signal, and said upper limit value and said lower limit value, all of which being stored in said storage device; (f) an output means for producing an output when the comparison executed by said comparison means indicates that the current value of said digital signal output by said A/D converter as converted from said analog input signal has exceeded said upper limit value, or has dropped below said lower limit value; (g) a D/A converter for converting said digital signal output by said A/D converter as converted from said analog input signal into an analog output signal whose level corresponds to the level of said analog input signal; and: (h) a checking means, for checking whether either said upper limit value as set up to said upper limit setting means or said lower limit value as set up to said lower limit setting means falls outside the permissible range therefor, and for, if said checking process results in a positive outcome, adjusting the value of said upper limit value as set up to said upper limit setting means or the value of said lower limit value as set up to said lower limit setting means, so as to bring said adjusted limit value to be within said permissible range.

According to such a transducer as specified above, when inputting the values for the upper limit value and the lower limit value, if any erroneous entry is made that is outside the prescribed limits for the input voltage, no particular error indication is presented to the user so that he or she may correct the error and may input a new valid entry, as was done in the case of the construction specified proximately above, but instead in this particular construction the inputted value is arbitrarily revised to be within the acceptable range therefor. Accordingly, mistaken operation is effectively prevented, in a different way from what was done in the construction specified proximately above. Accordingly, mistaken operation is effectively prevented, in a different and distinguished manner.

Further, according to yet another alternative particular specialization of the present invention, the above specified and other objects are alternatively attained by an AC effective value—DC conversion circuit, comprising: a squaring circuit having an input unit for receiving a rectified voltage which is to be effective value converted, an output unit for outputting a squared electric current, and a negative feedback input unit for inputting a negative feedback voltage; and an averaging circuit having an input unit for receiving the squared electric current from the output unit of the squaring circuit, and an output unit for outputting an effective value voltage of the rectified voltage, and outputting the rectified voltage as an effective value voltage by averaging the rectified voltage according to the squared current; the squaring circuit comprising: a first conversion means for converting the rectified voltage given to the input unit thereof into an electric current which is proportional to the rectified voltage value; a second conversion means for converting the averaged voltage from the averaging circuit given to the negative feedback input unit thereof into a negative feedback voltage and then into an electric current which is inversely proportional to the negative feedback voltage; and a summing means for summing the electric currents from the two conversion means and outputting the summed current as a squared electric current.

According to such an AC effective value—DC conversion circuit as specified above, the rectified voltage applied to the input unit of the squaring circuit is converted into a proportional current by the first conversion means of the squaring circuit. The output of the averaging circuit is given to the negative feedback input unit of the squaring circuit. The negative feedback voltage which is given to the negative feedback input unit of the squaring circuit is converted into an inversely proportional current by the second means. The electric currents are summed by the summing means of the squaring circuit, whereby the squared current is outputted from the squaring circuit.

As a result, the squared current can be expressed by a mathematical expression having the negative feedback voltage as a denominator and the squared value of the rectified voltage value as a numerator. And, as the squared current is supplied to the averaging circuit, the averaging circuit ultimately produces the effective voltage value of the rectified voltage according the theoretical formula.

Therefore, according to the present invention, since the circuit structure is simple, consisting only of a combination of a squaring circuit and an averaging circuit without using a square rooting circuit, the cost of the circuit is lower than the one consisting of a monolithic IC. Furthermore, since the effective value conversion process is based on the exact theoretical formula, the reliability is enhanced, not only as compared to one which is based on the pseudo effective value conversion process, but also as compared to one consisting of a monolithic IC, if a cost and reliability trade-off is considered.

Further, according to yet another alternative particular specialization of the present invention, the above specified and other objects are alternatively attained by a ripple removal circuit, comprising: an extraction circuit for extracting an AC component from an original signal containing a ripple therein; and a computing means for receiving the AC component extracted by the extraction circuit and the original signal, and producing a DC output from the original circuit by subtracting the AC component from the original signal; and, optionally but desirably, the extraction circuit may comprise a capacitor for removing a DC component from the original signal, and a voltage division resistor for adjusting an input gain of the AC component to the computing means.

According to such a ripple removal circuit as specified above, the AC component is extracted from the original signal and by subtracting the AC component from the original signal a DC output free from ripple can be obtained. Furthermore, only the extraction and the subtraction of the ripple are required for removal of the ripple, no electric charging as was the case in a conventional capacitor for smoothing is involved, and the removal of the ripple can be effected in a very short time, with the result that the response in obtaining a DC output for control purpose can be improved and high precision control is made possible.

Further, according to yet another alternative particular specialization of the present invention, the above specified and other objects are alternatively attained by an AC effective value—DC conversion circuit, comprising: a squaring circuit having an output unit at which a squared current appears and a negative feedback input unit for inputting a negative feedback voltage; an averaging circuit having an operational amplifier, one of the input terminals of the operational amplifier being connected to the output unit of the squaring circuit while the other input terminal receives a rectified voltage which is to be effective value converted;

and: a difference amplifier having an input terminal which is connected to the output unit of the operational amplifier of the averaging circuit, another input terminal which is connected to the other input terminal of the operational amplifier of the averaging circuit, and an output terminal which is connected to the negative feedback input unit of the squaring circuit; the squaring circuit comprising: a primary path which conducts a primary electric current which corresponds to the voltage difference between the rectified voltage and the ground voltage or the voltage difference between the rectified voltage and the negative feedback voltage; and: a secondary path which conducts a secondary electric current between a voltage point which is lower than the rectified voltage and the ground voltage or the negative feedback voltage; a directional element such as a diode being provided in the secondary path; and: a sum electric current produced as a sum of the primary and the secondary electric current becoming the squared current.

According to such an AC effective value—DC conversion circuit as specified above, since the two input terminals of the operational amplifier of the averaging circuit are imaginarily short circuited and the rectified voltage applied to one of the input terminals is identical to the voltage of the other input. Therefore, an electric current (primary electric current) corresponding to the voltage difference between the output end of the squaring circuit and the ground or the voltage difference between the rectified voltage and the negative feedback voltage and the resistive value of a primary path flows through the primary path. Since a directive element is provided in the secondary path, when either the voltage of a low voltage point is higher or lower than the ground voltage, or when the voltage of the low voltage point is higher or lower than the negative feedback voltage, a secondary current which corresponds the voltage difference and the resistive value of a secondary path flows through the secondary path. The primary and the secondary current are summed up in the squaring circuit and the squared current can be obtained from the output unit of the squaring circuit. Since this squared current is proportional to the square of the rectified voltage and inversely proportional to the output of the difference amplifier, the squared current is inputted and averaged by the averaging circuit and the voltage which is produced as a result of the action of the difference amplifier becomes a voltage which corresponds to the theoretical value of the effective value.

Therefore, according to this version of the present invention, since the circuit structure is simple consisting only of a combination of a squaring circuit and an averaging circuit without using a square rooting circuit, the cost of the circuit is lower than the one consisting of a monolithic IC. Furthermore, since the effective value conversion process is based on the exact theoretical formula, the reliability is enhanced not only as compared to the one which is based on the pseudo effective value conversion process but also as compared to the one consisting of a monolithic IC if a cost and reliability trade-off is considered.

Furthermore, according to the present invention, since the output of the averaging circuit is not directly fed back to the squaring circuit, the averaging circuit can be designed without considering the effect of the impedance of the squaring circuit, and the circuit design thereof can be simplified.

Further, according to yet another alternative particular specialization of the present invention, the above specified and other objects are alternatively attained by an AC effective value—DC conversion circuit, comprising: a squaring circuit having an input unit which receives a rectified voltage which is to be effective value converted, and an output unit at which a squared current appears; an averaging circuit having an operational amplifier, one of the input terminals of the operational amplifier being connected to the output unit of the squaring circuit; and: an inverting amplifier which inverts and amplifies the output of the averaging circuit and supplies its output to the other input terminal of the operational amplifier of the averaging circuit; the squaring circuit comprising a primary path which conducts a primary electric current between its input unit and output unit, and a secondary path which conducts a secondary electric current between a voltage point which is lower than the rectified voltage and the output unit; a directional element such as a diode being provided in the secondary path; and: a sum electric current produced as a sum of the primary electric current and the secondary electric current becoming the squared current.

According to such an AC effective value—DC conversion circuit as specified above, since the two input terminals of the operational amplifier of the averaging circuit are imaginarily short-circuited and the rectified voltage applied to one of the input terminals is identical to the voltage of the other input or the inverted output of the inverting amplifier, therefore, an electric current (primary electric current) corresponding to the voltage difference between the input give to the squaring circuit and the voltage given to the other input terminal of the operational amplifier and the resistive value of the primary path flows through the primary path. Since a directive element is provided in the secondary path, when either the voltage of a low voltage point is higher or lower than the voltage at the output, a secondary current which corresponds the voltage difference between one of the inputs of the operational amplifier and the low voltage point and the resistive value of the secondary path flows through the secondary path. The primary and the secondary current are summed up in the squaring circuit and the squared current can be obtained from the output unit of the squaring circuit. Since this squared current is proportional to the square of the rectified voltage and inversely proportional to the output of the inverting amplifier, the squared current is inputted and averaged by the averaging circuit and the voltage outputted by the squaring circuit becomes a voltage which corresponds to the theoretical value of the effective value.

Therefore, according to the present invention, since the circuit structure is simple consisting only of a combination of a squaring circuit and an averaging circuit without using a square rooting circuit, the cost of the circuit is lower than the one consisting of a monolithic IC. Furthermore, since the effective value conversion process is based on the exact theoretical formula, the reliability is enhanced not only as compared to the one which is based on the pseudo effective value conversion process but also as compared to the one consisting of a monolithic IC if a cost and reliability tradeoff is considered.

Furthermore, according to the present invention, since the output of the averaging circuit is not directly fed back to the squaring circuit, the averaging circuit can be designed without considering the effect of the impedance of the squaring circuit and the circuit design thereof can be simplified.

BRIEF DESCRIPTION OF THE DRAWINGS

The present invention will now be described with respect to the preferred embodiments thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference numerals, unless otherwise so specified, denote the same parts and gaps and spaces and so on in the various figures relating to one preferred embodiment, and like parts and gaps and spaces and so on in the figures relating to different preferred embodiments; and:

FIG. 7 is a flow chart, similarly broken into two portions in FIGS. 7(a) and 7(b) for the convenience of layout, which shows the overall flow of a top level program obeyed by a micro computer incorporated in said second preferred embodiment transducer shown in FIG. 5, when the power to said transducer is turned on;

DESCRIPTION OF THE PREFERRED EMBODIMENTS

The present invention will now be described with reference to the preferred embodiments thereof, and with reference to the figures.

Structure of the first preferred embodiment

Figure 1:
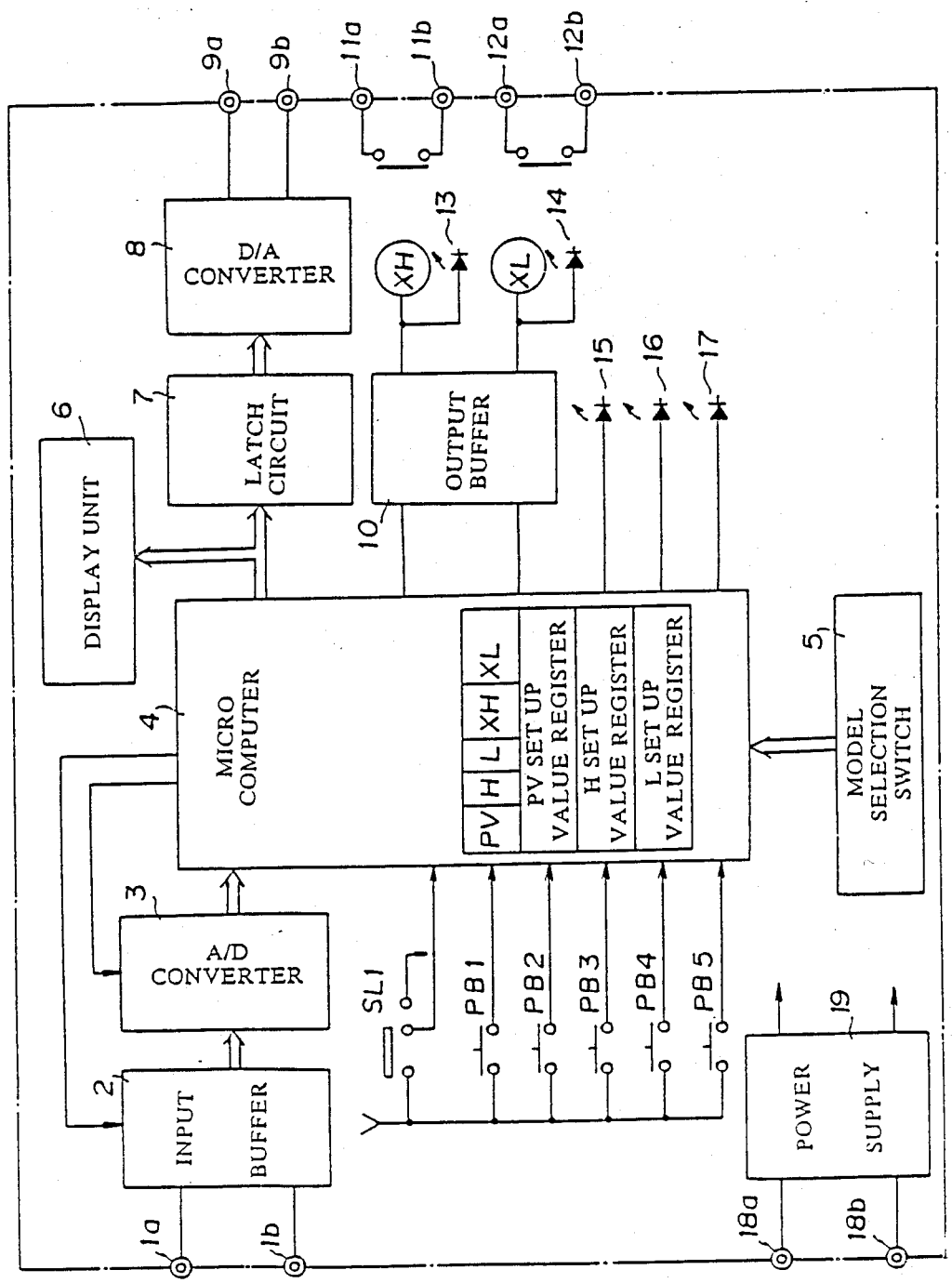
FIG. 1 is a schematic block diagrammatical view of the internal structure of the first preferred embodiment of the transducer of the present invention.
Figure 2:
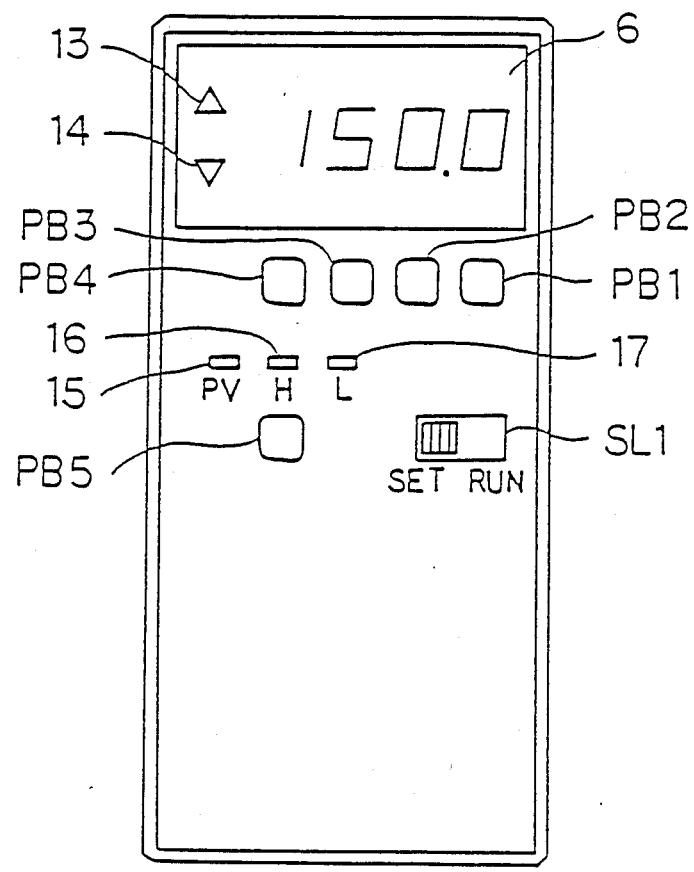
FIG. 2 is a schematic view of a front control panel of said first preferred embodiment of the transducer of the present invention.

FIG. 1 is a schematic block diagrammatical view of the internal structure of the first preferred embodiment of the transducer of the present invention, while FIG. 2 is a schematic view of a front control panel of said first preferred embodiment. The transducer of this first preferred embodiment of the present invention is of a type which converts an input of AC voltage from about 0 to about 150 volts AC into an output of DC voltage from about 0 to about 5 volts DC. As shown in these drawings, an input buffer, designated by the reference numeral 2, is connected across a pair of input terminals 1a and 1b. This input buffer 1 receives an AC voltage input with a high impedance, and voltage divides it, and the thus voltage divided output is rectified and is supplied to an A/D converter 3. This A/D converter 3 converts an analog signal which is provided to it, at a certain timing, into a digital signal, and supplies this digital signal as output to a micro computer 4. This micro computer 4 is a control device which is internally provided with a micro processor, an input/output interface, and a storage means which comprises a group of registers as illustrated, including: a PV flag register, a H flag register, and a L flag register, all of which represent display states; a XH flag and a XL flag which are set when the current value has exceeded its upper limit and its lower limit, respectively, and a relay is activated; and a PV value register which stores the current value, a H set up value register which stores the upper limit value, and a L set up value register which stores the lower limit value. The micro computer 4 is connected to a slide switch SL1 (see FIG. 2 as well as FIG. 1), which can be switched over between a set mode and a run mode as will be more particularly described hereinafter, and said micro computer 4 is further connected to a series of push button switches designated as PB1 through PB4 for setting up the corresponding digits of the display, and to a further push button switch designated as PB5 for switching over the contents of the display; and said micro computer 4 is further connected to the output of a model selection switch 5. This model selection switch is provided for giving the data that are required for adapting this transducer to certain input-/output specifications, and the input buffer that is intended to be used must also be adapted to the input/output specifications. The micro computer 4 gives the current value to the display circuit 6 and to the latch circuit 7, at a certain time interval, according to the input which is provided from outside. The latch circuit 7 holds the output of the micro computer 4 for a certain time interval, and the output of this latch circuit 7 is supplied to a D/A converter 8. This D/A converter 8 converts the digital signal into a corresponding output, for example a DC output of from about 0 to about 5 volts, and provides this output to the outside by way of terminals 9a and 9b. The micro computer 4 determines whether or not the input value has exceeded the upper limit or dropped below the lower limit, and if either limit has been passed said micro computer 4 supplies an output to the output buffer 10. This output buffer 10 drives a relay XH or a relay XL according to this input. The normally open contacts of these relays XH and XL are connected across terminals 11a and 11b and 12a and 12b of this transducer, to provide external outputs thereof. Moreover, when the relay XH or the relay XL is driven, the output buffer 10 drives a light emitting diode (which will be referred to as LEDs hereinafter in this specification) 13 or 14, respectively, said LEDs 13 and 14 being located on the upper part of the display panel shown in FIG. 2. The micro computer 4 is further connected to a PV display LED 15, a H display LED 16, and a L display LED 17, for indicating the current output of the display unit 6. An AC power source is connected to a power supply unit 19 by way of terminals 18a and 18b, and the power supply unit 19 supplies appropriate levels of DC power to the various units of this transducer.

Operation of the first preferred embodiment—set mode

Now, the operational action of this first preferred embodiment of the transducer according to the present invention will be explained. First, the operation with regard to setting up the upper and the lower value will be detailed, with particular reference to FIG. 3 which is a flow chart which shows the flow of a program obeyed by the micro computer 4 of FIG. 1, during such a program set mode for setting up an upper and a lower limit value.

First, after the START block, in the decision step 21, a decision is made as to whether the current mode is the set mode, or not, as set on the slide switch SL1 of the front panel shown in FIG. 2 (this slide switch SL1 has a RUN position and a SET position, and can be manually positioned by the operator of the transducer). If the answer to this decision is NO, so that the current mode is not the set mode, then it is deemed that the current mode is now the run mode, and then the flow of control passes next to tag "B", which leads to the program whose flow chart is detailed in FIG. 4, for the run mode. On the other hand, if the answer to this decision is YES, so that the current mode is indeed the set mode, in this case the flow of control passes next to the decision step 22.

In this decision step 22, a decision is made as to whether the push button switch PB5 is currently being depressed by the operator, or not. If the answer to this decision is NO, so that said push button switch PB5 is not currently being depressed, then it is deemed that no set action is currently being initiated by the operator, and then the flow of control passes next back to the step 21 again, to continue to cycle until either the slide switch SL1 of the front panel is moved or the push button switch PB5 is depressed. This is also the point of this program indicated by the tag "A" to which control is transferred from the FIG. 4 program, to be described later. On the other hand, if the answer to this decision is YES, so that the push button switch PB5 is indeed now currently being depressed, then it is deemed that set action for this transducer is currently being required, and in this case the flow of control passes next to the step 23.

In this step 23, at which point it is definitely determined that the push button switch PB5 is being depressed by the operator, the values of the PV flag, of the H flag, and of the L flag are sequentially set up and renewed, and next the flow of control passes to the decision step 24.

In this decision step 24, a decision is made as to whether the H flag is set, or not. If the answer to this decision is NO, so that the H flag is not set, then the flow of control passes next to the decision step 25. On the other hand, if the answer to this decision is YES, so that the H flag is set, then in this case the flow of control passes next to the step 26.

In the decision step 25, at which point it is determined that the H flag is not set, a further decision is made as to whether the L flag is set, or not. If the answer to this decision is NO, so that the L flag is not set, then the flow of control passes next to the tag "A", which is at the top of this program, so that the program flow of control cycles around again. On the other hand, if the answer to this decision is YES, so that the L flag is set, then in this case the flow of control passes next to the step 28.

In the step 26, the LED 16 is turned on and the LED 17 is turned off, so as to indicate on the control panel of this transducer that it is the upper limit which is being exceeded (vide FIG. 2), and the next flow of control passes to the step 27. Thereby, an indication of "H" is displayed upon the surface of the control panel.

In this step 27, an upper limit setting up routine is executed. In this routine from this step 27, which is not itself shown herein in detail because various possibilities therefor will be readily apparent to one of ordinary skill in the relevant art based upon the disclosures in this specification, the various digits in the display 6 are set up by the operation of the push button switches PB1 through PB4, for setting up a numerical value, and this upper limit value as thus inputted by the operator of this transducer is stored in the H set up value register, shown in FIG. 1. Next, the flow of control passes to the tag "A", which is at the top of this program, so that the program flow of control cycles around again.

On the other hand, for the "L" side, in the step 27, the LED 16 is turned off and the LED 17 is turned on, so as to indicate on the control panel of this transducer that it is the lower limit which is being exceeded (again, vide FIG. 2), and next the flow of control passes to the step 29. Thereby, an indication of "L" is displayed upon the surface of the control panel.

In this step 29, a lower limit setting up routine is executed. In this routine from this step 29, which again is not itself shown herein in detail because various possibilities therefor will be readily apparent to one of ordinary skill in the relevant art based upon the disclosures in this specification, the various digits in the display 6 are set up by the operation of the push button switches PB1 through PB4, for setting up a numerical value, in substantially the same manner as was done in the step 27 for the higher limit value, and this lower limit value as thus inputted by the operator of this transducer is stored in the L set up value register, shown in FIG. 1. Next, as before, the flow of control passes to the tag "A", which is at the top of this program, so that the program flow of control cycles around again.

Figure 4:
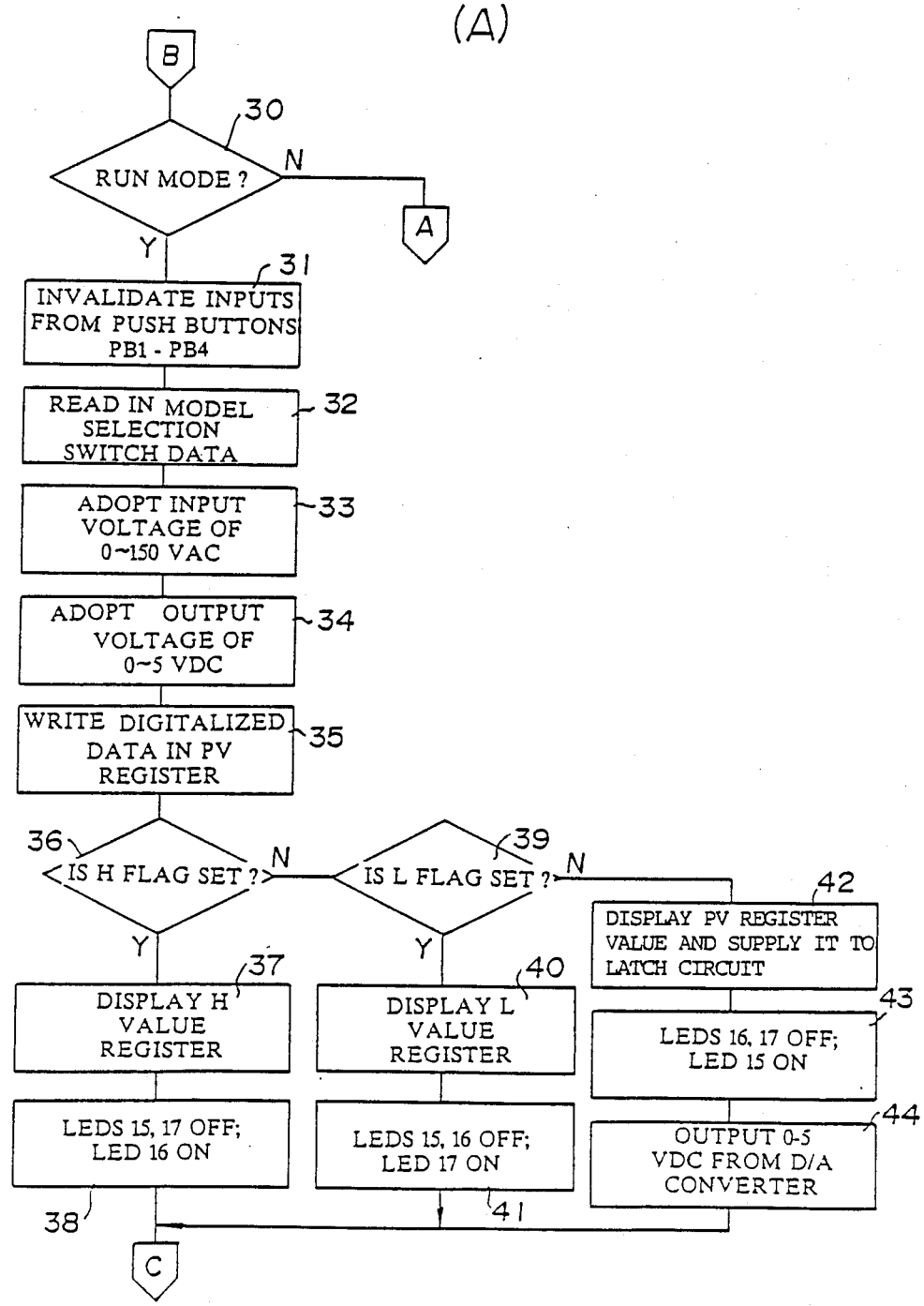
FIG. 4 is another flow chart, broken into two portions in FIGS. 4(a) and 4(b) for the convenience of layout, similarly showing the flow of said program obeyed by said micro computer incorporated in said first preferred embodiment of the transducer of the present invention, this time during a run mode of said program.
Figure 4:
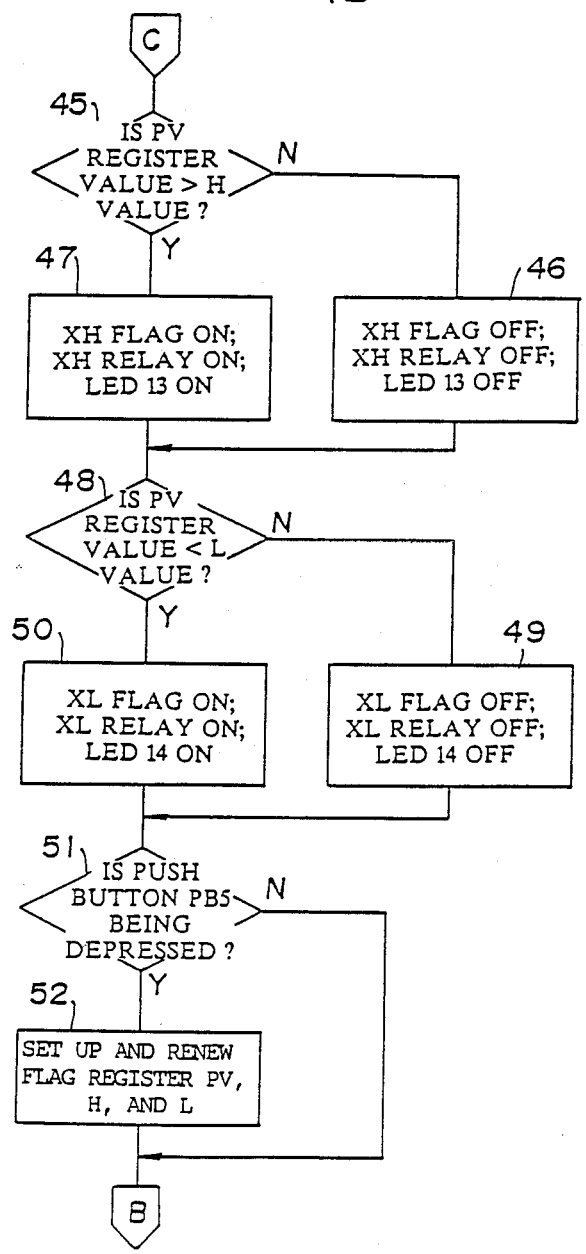

Thereby, as a whole, the process of setting up the upper and the lower limit values is completed, and finally the operator slides the slide switch SL1 over to its position denoting run operation, and the program flow passes to the tag "B" of FIG. 4.

Operation of the first preferred embodiment—run mode

Next, the operation of this first preferred embodiment of the transducer of the present invention with regard to actual running will be detailed, with particular reference to FIG. 4 which is a flow chart which shows the flow of a program obeyed by the micro computer 4 of FIG. 1, during such a program run mode. It should be noted that the flow chart of FIG. 4 is broken into two portions denoted as 4(a) and 4(b) for the convenience of layout, with the tag "C" joining said two flow chart portions 4(a) and 4(b) in the logical sense.

Upon completion of the set up stage detailed above, so that a lower limit value and an upper limit value have been set up by the operator of this transducer, said operator then switches over the slide switch SL1 to the run mode. The micro computer 4 checks to ascertain the position of this slide switch SL1 in the step 21, and also in the decision step 30 of this program portion, to which control is passed from the tag "B" at which point the flow of control enters this program portion. In other words, in this decision step 30, a decision is made as to whether the position of the slide switch indicates running operation, or not. If the answer to this decision is NO, so that the current mode is not the run mode, then it is deemed that the current mode is now the set mode, and then the flow of control passes next to the tag "A", which leads to the program whose flow chart is detailed in FIG. 3 and has been explained above, for the set mode. On the other hand, if the answer to this decision is YES, so that the current mode is indeed the run mode, in this case the flow of control passes next to the step 31.

In this step 31, further input to the push button switches PB1 through PB4 is invalidated, and the next flow of control passes to the step 32.

In this step 32, the data set on the model selection switch 5 is read in to the micro computer 4, and next the flow of control passes to the steps 33 and 34; these following steps shown here are exemplary, in the exemplary case that these data on the model selection switch 5 should indicate that the operation required from this transducer is the conversion of a 0 to 150 VAC voltage into a 0 to 5 VDC voltage. In this step 33, then, an input voltage of from approximately 0 to approximately 150 volts of AC is adopted, and next the flow of control passes to the step 34. And, in this step 34, an output voltage of from approximately 0 to approximately 5 volts of DC is adopted, and next the flow of control passes to the step 35. Thus, the input voltage supplied from outside to the input terminasl 1a and 1b is rectified and is voltage divided by the input buffer 2, and the output of this input buffer 2 is supplied to the A/D converter 3.

In this step 35, while thus the output of this input buffer 2 is supplied to the A/D converter 3, sampling pulses of a certain frequency are supplied from the micro computer 4 to said A/D converter 3, and the digitalized data is written into the PV value register in the memory of said micro computer 4; and next the flow of control passes to the decision step 36.

In this decision step 36, a decision is made as to whether the H flag register is currently set or not. If the answer to this decision is NO, so that the H flag register is not currently set, then it is deemed that the higher limit value is not currently being exceeded, and then the flow of control passes next to the decision step 39, so as to check for whether or not the lower limit value is currently being executed. On the other hand, if the answer to this decision is YES, so that the H flag register is currently set, then it is deemed that the higher limit value is currently being exceeded, and in this case the flow of control passes next to the step 37.

In this step 37, the upper limit value, already stored in the H set up value register during the set portion of the program of the micro computer 4, is displayed upon the display 6 of the front panel of the transducer, and next the flow of control passes to the step 38. And, in this step 38, the LEDs 15 and 17 are turned off, and the LED 16 is turned on, thus to indicate that the high set value limit has been exceeded, and next the flow of control passes to the tag "C", to transit to the next portion 4(b) of this FIG. 4 program portion.

On the other hand, in the decision step 39, a decision is made as to whether the L flag register is currently set, or not. If the answer to this decision is NO, so that the L flag register is not currently set, then it is deemed that the lower limit value is not currently being exceeded (either), and then the flow of control passes next to the step 42. On the other hand, if the answer to this decision is YES, so that the L flag register is currently set, then it is deemed that the lower limit value is currently being exceeded, and in this case the flow of control passes next to the step 40.

In this step 40, like in the step 38, the lower limit value, already stored in the L set up value register during the set portion of the program of the micro computer 4, is displayed upon the display 6 of the front panel of the transducer, and next the flow of control passes to the step 41. And, in this step 41, the LEDs 15 and 16 are turned off, and the LED 17 is turned on, thus to indicate that the low set value limit has been exceeded, and next as before the flow of control passes to the tag "C", to transit to the next portion 4(b) of this FIG. 4 program portion.

On the other hand, if in the decision steps 36 and 39 it has been determined that neither the H flag nor the L flag have been set, then the flow of program control passes to the step 42. In this step 42, the current value in the PV register, which was inputted thereinto in the step 35, is displayed on the display 6, and is also fed to the latch circuit 7 so as to be temporarily retained therein; and next the flow of control passes to the step 43.

In this step 43, the LEDs 16 and 17 are turned off and the LED 15 is turned on, thus to indicate that the current value is being displayed; and next the flow of control passes to the step 44.

In this step 44, a DC voltage between about 0 and about 5 volts DC corresponding to the input voltage is produced from the A/D converter 8 and is outputted to the outside from the output terminals 9a and 9b; and next the flow of control passes to the tag "C", to transit to the next portion 4(b) of this FIG. 4 program portion.

Control is passed from the tag "C" at which point the flow of control enters this second FIG. 4 program portion 4(b), to the decision step 45. In this decision step 45, a decision is made as to whether the current value in the PV register is greater than the value set in the H value register, or not. If the answer to this decision is NO, so that the current PV register value has not exceeded the upper limit therefor, then the flow of control passes next to the step 46. On the other hand, if the answer to this decision is YES, so that the current PV register value has indeed in fact exceeded the upper limit therefor, then in this case the flow of control passes next to the step 47.

In this step 47, to which control is thus passed if the upper limit value has in fact been exceeded, the XH flag is set, the XH relay is turned on, and the LED 13 is turned on, thus to indicate that the upper limit value has been exceeded; and next the flow of control passes to the decision step 48. On the other hand, in the step 46, to which control is thus passed if the upper limit value has not in fact been exceeded, the XH flag is unset (i.e., set off), the XH relay is turned off, and the LED 13 is turned off, thus to indicate that the upper limit value has not in fact been exceeded; and next as before the flow of control passes to the decision step 48.

In this decision 48, a decision is made as to whether the current value in the PV register is less than the value set in the L value register, or not. If the answer to this decision is NO, so that the current PV register value has not dropped below the lower limit therefor, then the flow of control passes next to the step 49. On the other hand, if the answer to this decision is YES, so that current PV register value has indeed in fact dropped below the lower limit therefore, then in this case the flow of control passes next to the step 50.

In the step 50, to which control is thus passed if the lower limit value has in fact been dropped below, the XL flag is set, the XL relay is turned on, and the LED 14 is turned on, thus to indicate that the lower limit value has been dropped below; and next the flow of control passes to the decision step 51. On the other hand, in the step 49, to which control is thus passed if the lower limit value has not in fact been dropped below, the XL flag is unset (i.e., set off), the XL relay is turned off, and the LED 14 is turned off, thus to indicate that the lower limit value has not in fact been dropped below; and next as before the flow of control passes to the decision step 51.

In this decision step 51, a decision is made as to whether the push button switch PB5 is currently being pressed by the operator of this transducer, or not. If the answer to this decision is NO, so that the push button switch PB5 is not currently being depressed, then the flow of control passes next to the tag "B", to transit back to the first portion 4(a) of this FIG. 4 program portion, to repeat the program flow explained above without further ado. On the other hand, if the answer to this decision is YES, so that the push button switch PB5 is in fact currently being depressed, then in this case the flow of control passes next to the step 52.

In this step 52, at which point it is definitely determined that the push button switch PB5 is being depressed by the operator, the values of the PV flag, of the H flag, and of the L flag are sequentially set up and renewed, as in the step 23 explained earlier, and next as above the flow of control passes to the tag "B", to transit back to the first portion 4(a) of this FIG. 4 program portion, to repeat the program flow explained above.

Thus, according to the construction and operation of the first preferred embodiment of the transducer of the present invention as explained above, it is seen that it is possible to display the input voltage at the same time as obtaining a linearized DC output which corresponds to said input voltage, and to provide a transducer which has the function of a meter relay to set up the upper and the lower limits of the input with a pair of set up registers, and to produce a certain output when these limits are exceeded.

Although the above described and disclosed first preferred embodiment of the transducer of the present invention pertains to a transducer which converts an AC voltage which lies within a certain range to a DC voltage which lies within a certain desired range, by varying the input buffer and the input specifications in the run mode it is possible to provide a transducer which accepts a different type of input; for example, it is possible to apply the present invention to a transducer which detects either AC or DC current, or a transducer for appropriately converting the output of a thermo couple, a tacho generator, a potentiometer, or the like. Other applications could also be envisaged.

The second preferred embodiment

Figure 5:
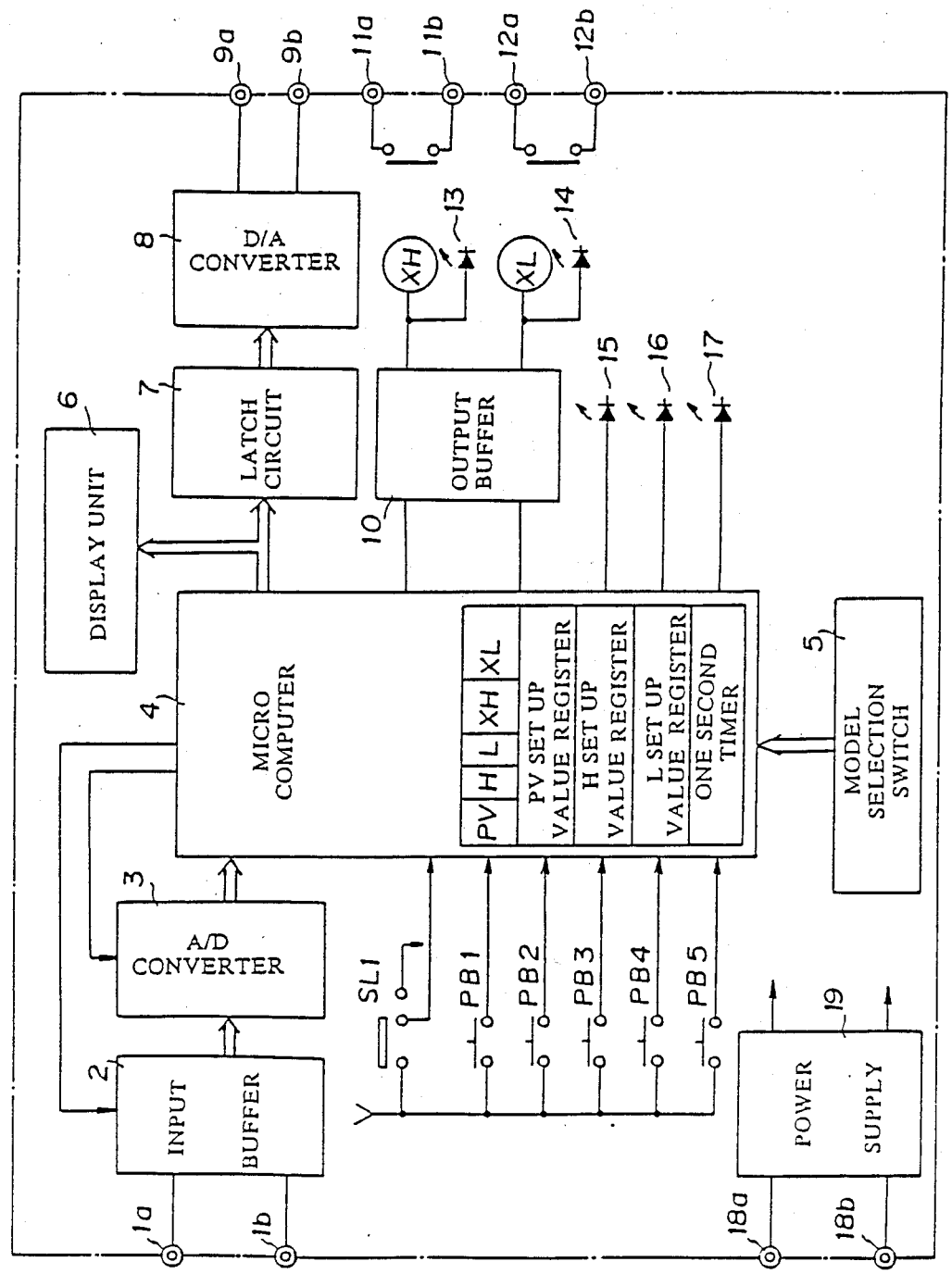
FIG. 5, similarly to FIG. 1 for the first preferred embodiment, is a schematic block diagrammatical view of the internal structure of the second preferred embodiment of the transducer of the present invention.
Figure 6:
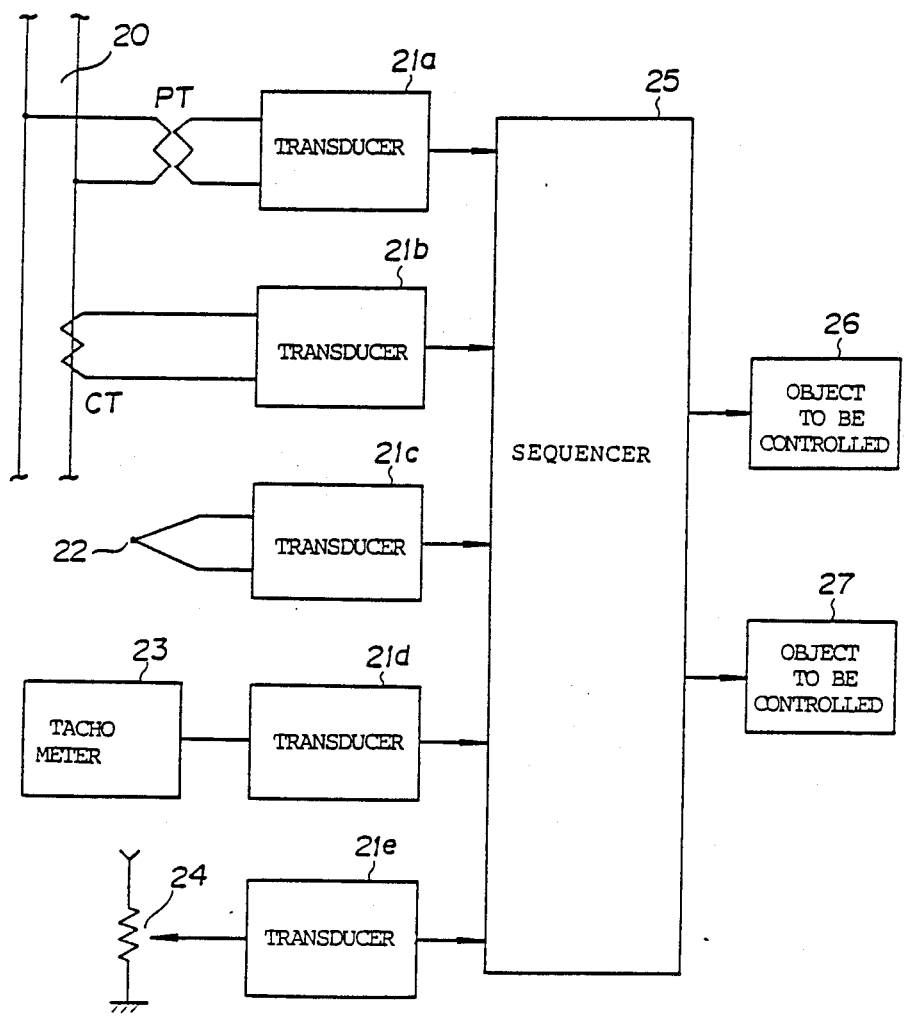
FIG. 6 is a schematic block diagram view of an exemplary application for said second preferred embodiment of the transducer of the present invention.
Figure 7:
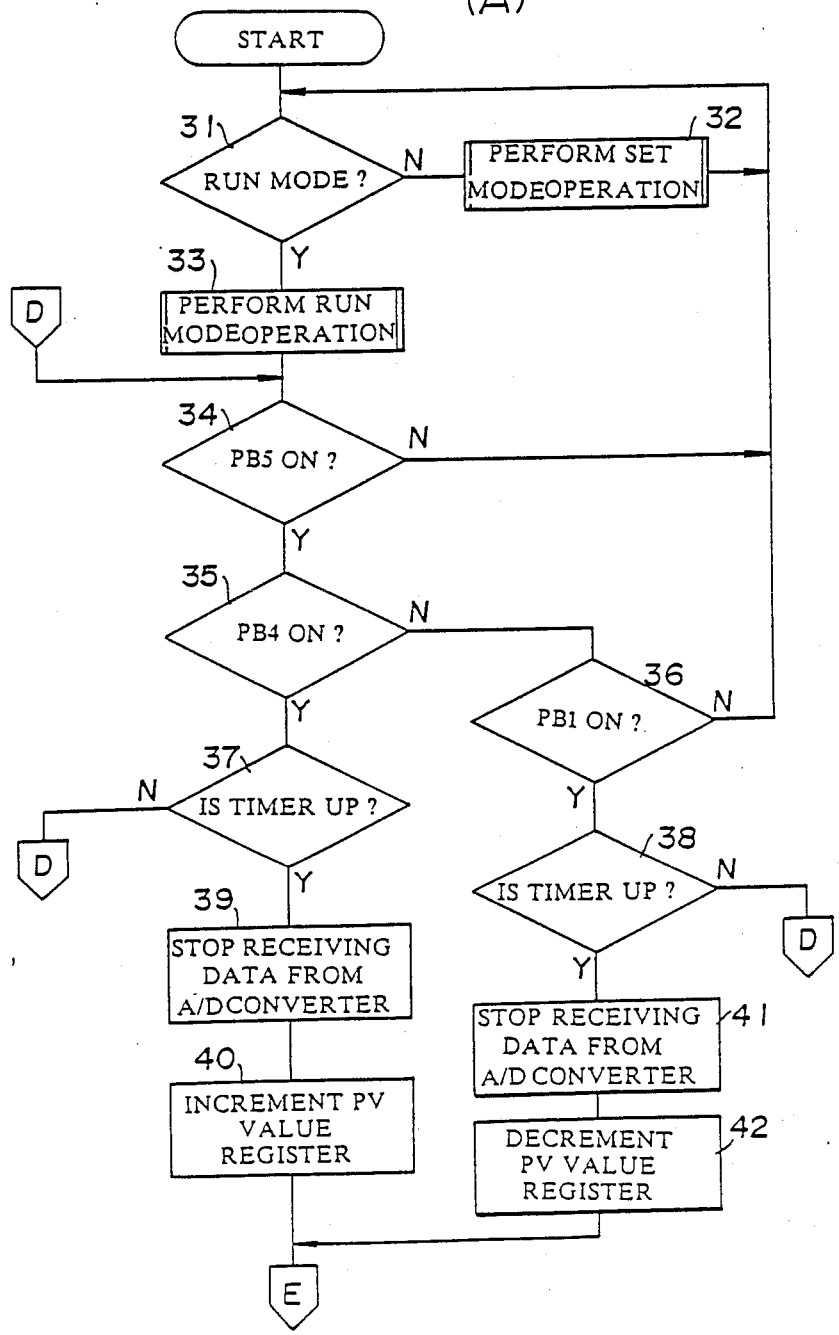
Figure 7:
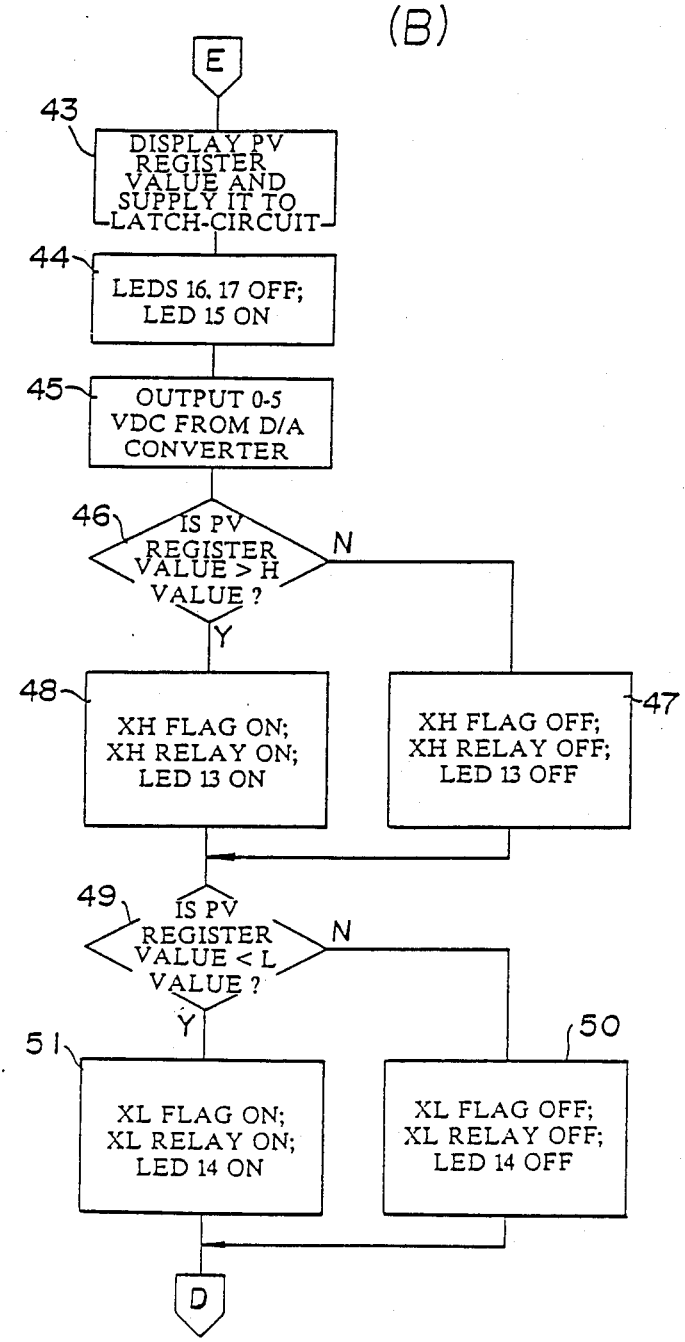

The second preferred embodiment of the transducer of the present invention will now be shown and described with the aid of FIGS. 5 through 7, in a similar manner to what was done above with relation to FIGS. 1 through 4 relating to the first preferred embodiment. In these figures, parts and gaps and spaces and so on which correspond to amalogous parts and gaps and spaces and so on of the first preferred embodiment are denoted by reference numerals like to those utilized in the figures relating to said first preferred embodiment.

Structure of the second preferred embodiment

FIG. 5 is a schematic block diagrammatical view of the internal structure of the second preferred embodiment of the transducer of the present invention, and is similar to FIG. 1 for the first preferred embodiment. The front control panel schematic view which was shown in FIG. 2 can be applied to this second preferred embodiment, also; and hence no particular repetition thereof will be made, in the interests of brevity of description. Again, the transducer of this second preferred embodiment of the present invention is of a type which converts an input of AC voltage from about 0 to about 150 volts AC into an output of DC voltage from about 0 to about 5 volts DC. As shown in FIG. 5, the only substantial physical way in which this second preferred embodiment of the present invention differs from the first preferred embodiment disclosed above, is that the micro computer 4, in addition to its previously mentioned micro processor, input/output interface, and storage means comprising the illustrated group of registers including the PV flag register, the H flag register, the L flag register, the XH flag, the XL flag, the PV value register, the H set up value register, and the L set up value register, is further internally provided with a one second timer, which is capable of timing an interval, which is exemplarily set to be one second, after the system has been started up. Apart from this feature, the second preferred embodiment of the transducer of the present invention is structured substantially in the same way as the first preferred embodiment of the transducer of the present invention; and hence no particular repetition of the recitation of such structure will be made, in the interests of brevity of description.

Structure of a system to which this Transducer is fitted

This transducer is typically applied to a control system for controlling an object which is required to be controlled. An exemplary such application is shown in schematic block diagram view in FIG. 6. In this figure, the reference symbols 21a through 21e denote five units of this type of transducer, and 25 is a sequencer, while 26 and 27 are objects to be controlled, only schematically shown. In detail, the transducer 21a converts an output signal from a potential transformer PT which is connected across the two conductors of a power line, and supplies its output signal, which is a DC voltage, to the sequencer 25. The transducer 21b converts an output signal from a current transformer CT which is connected around one of said two power line conductors, and supplies its output signal, which is also a DC voltage, to the sequencer 25. The transducer 21c converts an output signal from a thermo couple 22 (schematically shown) which is fitted to some part or member, and supplies its output signal, which is likewise a DC volage, to the sequencer 25. The transducer 21d converts an output signal from a tacho meter 23, which is fitted to some rotating part or member, and supplies its output signal, which is likewise a DC voltage, to the sequencer 25. And the transducer 21e converts an output signal from a potentiometer 24, and supplies its output signal, which is likewise a DC voltage, to the sequencer 25. The sequencer 25 controls the control objects 26 and 27 in a certain sequence, according to the values of these inputs. The transducer according to the present invention allows of easy manual adjustment of the output of the system to which the transducer is applied, irrespective of the inputs.

Operation of the second preferred embodiment

Now, the operational action of this second preferred embodiment of the transducer according to the present invention will be explained. First, the general operation thereof will be detailed, with particular reference to FIG. 7 which is a flow chart which shows the overall flow of a top level program obeyed by the micro computer 4 of FIG. 5, when the power to this transducer is turned on. It should be noted that the flow chart of FIG. 7 is broken into two portions denoted as 7(a) and 7(b) for the convenience of layout, with the tag "e" joining said two flow chart portions 7(a) and 7(b) in the logical sense.

First, after the start of operation in the start block, in the decision step 31, a decision is made as to whether the current mode is the run mode, or not, as set on the slide switch SL1 of the front panel which is identical to that one which is shown in FIG. 2. If the answer to this decision is NO, so that the current mode is not the run mode, then it is deemed that the current mode is now the set mode, and then the flow of control passes next to the step 32, which in fact is a subroutine for setting up an upper value and a lower value, whose operation and whose effects will be explained shortly. On the other hand, if the answer to this decision is YES, so that the current mode is indeed the run mode, in this case the flow of control passes next to the step 33, which also in fact is a subroutine, this time for performing run mode transducer operation, whose operation and whose effects will also be explained shortly.

Operation of the second preferred embodiment in set mode

The subroutine step 32 for setting up an upper value and a lower value will now be explained, with particular reference to FIG. 8 which is a flow chart which shows the flow of said subroutine step 32, shown only as a block in FIG. 7, during such a program set mode for setting up an upper and a lower limit value.

First, after the START block when this subroutine is entered, in the decision step 61, a decision is made as to whether the current mode is the set mode, or not, as set on the slide switch SL1 of the front panel which is identical to that one which is shown in FIG. 2. If the answer to this decision is NO, so that the current mode is not the set mode, then it is deemed that the current mode is now the run mode, and then the flow of control returns from this subroutine. On the other hand, if the answer to this decision is YES, so that the current mode is indeed the set mode, in this case the flow of control passes next to the decision step 62.

In this decision step 62, a decision is made as to whether the push button switch PB5 is currently being depressed by the operator, or not. If the answer to this decision is NO, so that said push button switch PB5 is not currently being depressed, then it is deemed that no set action is currently being initiated by the operator, and then the flow of control passes next back to the decision step 61 again, to continue to cycle until either the slide switch SL1 of the front panel is moved to its run position or the push button switch PB5 is depressed. This is also the point of this program indicated by the tag "A" to which control is transferred from the various ends of this subroutine program, to be described later. On the other hand, if the answer to this decision is YES, so that the push button switch PB5 is indeed now currently being depressed, then it is deemed that set action for this transducer is currently being required, and in this case the flow of control passes next to the step 63.

In this step 63, at which point it is definitely determined that the push button switch PB5 is being depressed by the operator, the value of the PV flag, of the H flag, and of the L flag are sequentially set up and renewed, and next the flow of control passes to the decision step 64.

In this decision step 64, a decision is made as to whether the H flag is set, or not. If the answer to this decision is NO, so that the H flag is not set, then the flow of control passes next to the decision step 65. On the other hand, if the answer to this decision is YES, so that the H flag is set, then in this case the flow of control passes next to the step 66.

In the decision step 65, at which point it is determined that the H flag is not set, a further decision is made as to whether the L flag is set, or not. If the answer to this decision is NO, so that the L flag is not set, then the flow of control passes next to the tag "A", which is at the top of this subroutine program, so that the program flow of control cycles around again. On the other hand, if the answer to this decision is YES, so that the L flag is set, then in this case the flow of control passes next to the step 68.

In the step 66, the LED 16 is turned on and the LED 17 is turned off, so as to indicate on the control panel of this transducer that it is the upper limit which is being exceeded (vide FIG. 2), and next the flow of control passes to the step 67. Thereby, an indication of "H" is displayed upon the surface of the control panel.

In this step 67, an upper limit setting up routine is executed. In this routine from this step 67, which is as before not itself shown herein in detail because various possibilities therefor will be readily apparent to one of ordinary skill in the relevant art based upon the disclosures in this specification, the various digits in the display 6 are set up by the operation of the push button switches PB1 through PB4, for setting up a numerical value, and this upper limit value as thus inputted by the operator of this transducer is stored in the H set up value register, shown in FIG. 5. Next, the flow of control passes to the tag "A", which is at the top of this subroutine program, so that the program flow of control cycles around again.

On the other hand, for the "T", side in the step 67, the LED 16 is turned off and the LED 17 is turned on, so as to indicate on the control panel of this transducer that it is the lower limit which is being exceeded (again, vide FIG. 2), and next the flow of control passes to the step 69. Thereby, an indication of "L" is displayed upon the surface of the control panel.

In this step 69, a lower limit setting up routine is executed. In this routine from this step 69, which again is not itself shown herein in detail because various possibilities therefor will be readily apparent to one of ordinary skill in the relevant art based upon the disclosures in this specification, the various digits in the display 6 are set up by the operation of the push button switches PB1 through PB4, for setting up a numerical value, in substantially the same manner as was done in the step 67 for the higher limit value, and this lower limit value as thus inputted by the operator of this transducer is stored in the L set up value register, shown in FIG. 5. Next, as before, the flow of control passes to the tag "A", which is at the top of this program, so that the program flow of control cycles around again.

Thereby, as a whole, the process of setting up the upper and the lower limit values is completed, and finally, when the operator slides the slide switch SL1 over to its position denoting run operation, the program flow passes to return from this subroutine, to return to the decision step 31 of FIG. 7, to perform the cycle already detailed, again.

Operation of the second preferred embodiment-run mode

Figure 9:
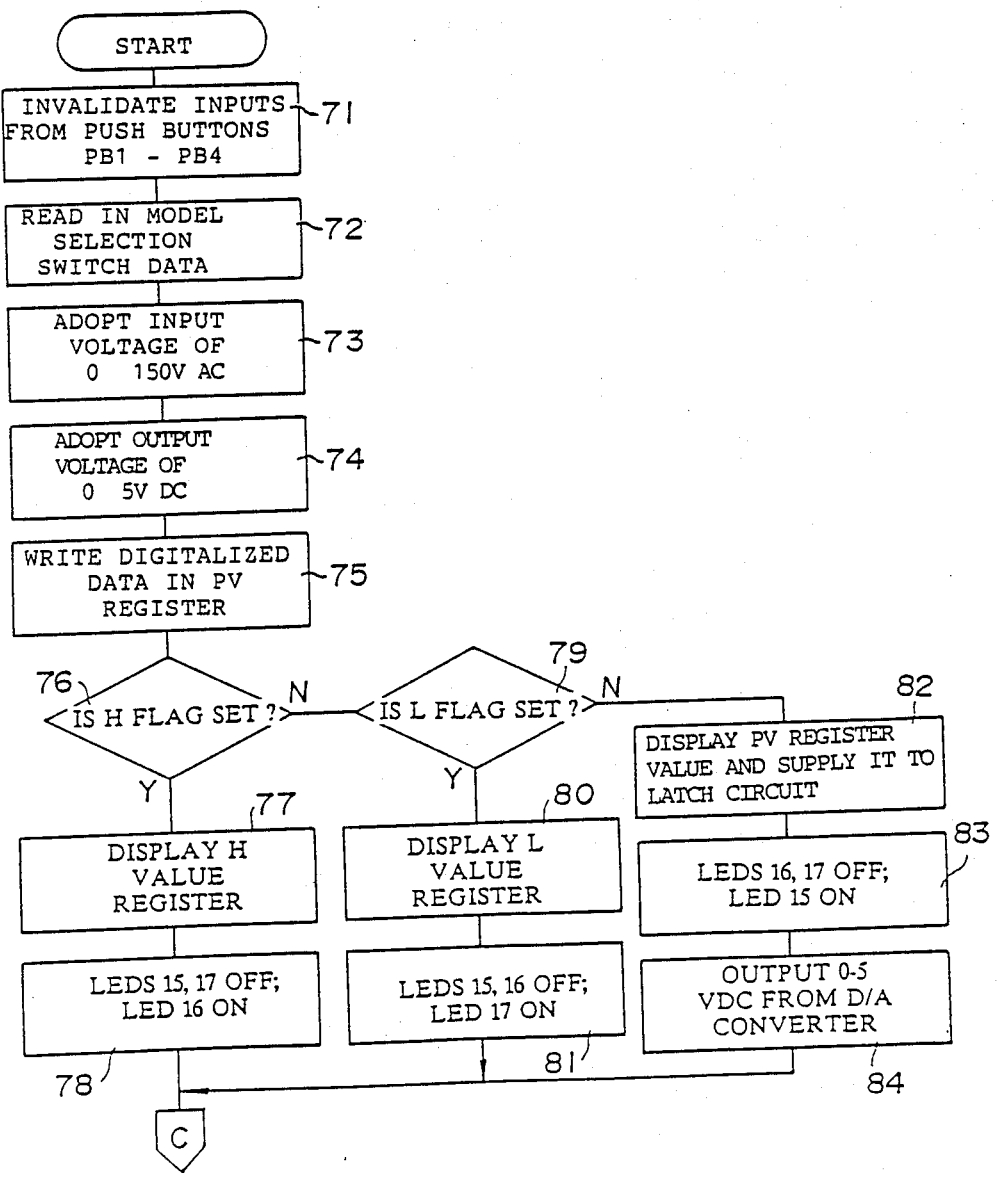
FIG. 9 is another flow chart, similarly broken into two portions in FIGS. 9(a) and 9(b) for the convenience of layout, like FIG. 4 for the first preferred embodiment showing the flow of a subroutine program fragment obeyed by said micro computer incorporated in said second preferred embodiment, this time during a run mode of said program.
Figure 9:
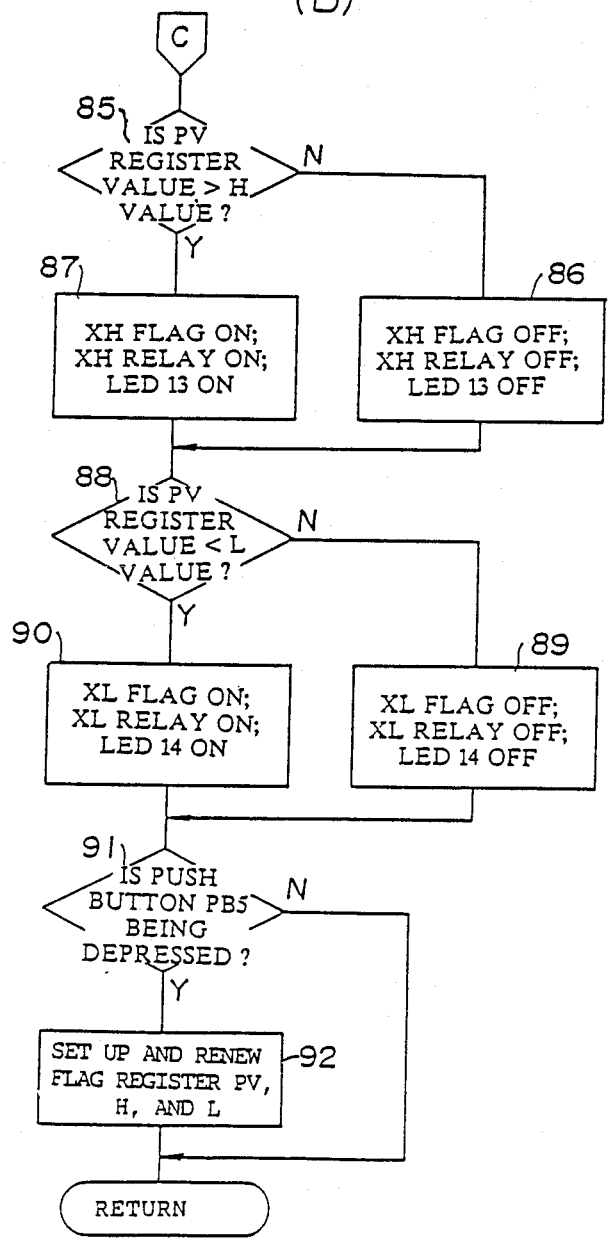

Referring now to FIG. 7 again, if on the other hand the test in the decision step 31 produces a YES result, then the flow of control passes next to the step 33, which in fact is a subroutine for performing run mode transducer operation. Thus, typically, when the transducer is supplied with power, first the slide switch SL1 is set to the set mode and the upper and lower limit values will then be set as explained above, and only after such limit value setting is said slide switch SL1 set by the user to the run mode so that now the flow of control passes next from the decision step 31 of FIG. 7 to this subroutine step 33. This subroutine step 33, which defines the operation of this second preferred embodiment of the transducer of the present invention with regard to actual running, will now be detailed, with particular reference to FIG. 9 which is a flow chart which shows the flow of the program obeyed by the micro computer 4 of FIG. 5, during this program run mode subroutine. It should be noted that the flow chart of FIG. 9 is broken into two portions denoted as 9(a) and 9(b) for the convenience of layout, with the tag "C" joining said two flow chart portions 9(a) and 9(b) in the logical sense. This running stage performed by the subroutine step 33 is very similar to the run stage of the first preferred embodiment detailed above, so it will only be described synoptically.

Thus, upon completion of the set up stage detailed above, so that a lower limit value and an upper limit value have been set up by the operator of this tranducer, said operator then switches over the slide switch SL1 to the run mode, and the micro computer 4 checks to ascertain the position of this slide switch SL1 in the step 31, and the flow of control passes next to the step 71 of this subroutine. In this step 71, further input to the push button switches PB1 through PB4 is invalidated, and next the flow of control passes to the step 72.

In this step 72, the data set on the model selection switch 5 is read in to the micro computer 4, and next the flow of control passes to the steps 73 and 74; these following steps shown here are, as before, exemplary, in the exemplary case that these data on the model selection switch 5 should indicate that the operation required from this transducer is the conversion of a 0 to 150 VAC voltage into a 0 to 5 VDC voltage. In this step 73, then, an input voltage of from approximately 0 to approximately 150 volts of AC is adopted, and next the flow of control passes to the step 74. And, in this step 74, an output voltage of from approximately 0 to approximately 5 volts of DC is adopted, and next the flow of control passes to the step 75. Thus, the input voltage supplied from outside to the input terminals 1a and 1b is rectified and is voltage divided by the input buffer 7, and the output of this input buffer 7 is supplied to the A/D converter 7. And, in this next step 75, while thus the output of this input buffer 7 is supplied to the A/D converter 7, sampling pulses of a certain frequency are supplied from the micro computer 4 to said A/D converter 7, and the digitalized data is written into the PV value register in the memory of said micro computer 4; and next the flow of control passes to the decision step 76.

In this decision step 76, a decision is made as to whether the H flag register is currently set, or not. If the answer to this decision is NO, so that the H flag register is not currently set, then it is deemed that the higher limit value is not currently being exceeded, and then the flow of control passes next to the decision step 79, so as to check, for whether or not the lower limit value is currently being exceeded. On the other hand, if the answer to this decision is YES, so that hte H flag register is currently set, then it is deemed that the higher limit value is currently being exceeded, and in this case the flow of control passes next to the step 77.

In this step 77, the upper limit value, already stored in the H set up value register during the set portion of the program of the micro computer 4 performed during the step 32 subroutine, is displayed upon the display 7 of the front panel of the transducer, and next the flow of control passes to the step 78. And, in this step 78, the LEDs 15 and 17 are turned off, and the LED 16 is turned on, thus to inidcate that the high set value limit has been exceeded, and next the flow of control passes to the tag "C", to transit to the next portion 9(b) of this FIG. 9 program portion.

On the other hand, in the decision step 79, a decision is made as to whether the L flag register is currently set, or not. If the answer to this decision is NO, so that the L flag register is not currently set, then it is deemed that the lowerlimit value is not currently being exceeded (either), and then the flow of control passes next to the step 82. On the other hand, if the answer to this decision is YES, so that the L flag register is currently set, then it is deemed that the lower limit value is currently being exceeded, and in this case the flow of control passes next to the step 80.

In this step 80, like in the step 78 but mutatis mutandis, the lower limit value, already stored in the L set up value register during the set portion of the program of the micro computer 8 performed during the step 32 subroutine, is displayed upon the display 7 of the front panel of the transducer, and next the flow of control passes to the step 81. And, in this step 81, the LEDs 15 and 16 are turned off, and the LED 17 is turned on, thus to indicate that the low set value limit has been exceeded, and next as before the flow of control passes to the tag "C", to transit t the next porition 9(b) of this FIG. 9 program portion.

On the other hand, if the decision steps 76 and 79 it has been determined that neither the H flag nor the L flag have been set, then the flow of program control passes to the step 82. In this step 82, the current value in the PV register, which was inputted thereinto in the step 75, is displayed on the display 7, and is also fed to the latch circuit 7 so as to be temporarily retained therein; and next the flow of control passes to the step 83. In this step 83, the LEDs 16 and 17 are turned off and the LED 15 is turned on, thus to indicate that the current value is being displayed; and next the flow of control passes to the step 84. In this step 84, a DC voltage between about 0 and about 5 volts DC corresponding to the input voltage is produced from the A/D converter 8 and is outputted to the outside from the output terminals 9a and 9b; and next the flowof control passes to the tag "C", to transit to the next portion 9(b) of this FIG. 9 program portion.

Control is passed from the tag "C" at which point the flow of control enters this second FIG. 9 program portion 9(b), to the decision step 85. In this decision step 85, a decision is made as to whether the current value in the PV register is greater than the value set in the H value register, or not. If the answer to this decision is NO, so that the current PV register value has not exceeded the upper limit therefor, then the flow of control passes next to the step 86. On the other hand, if the answer to this decision is YES, so that the current PV register value has indeed in fact exceeded the upper limit therefor, then in this case the flow of control passes next to the step 87.

In the step 87, to which control is thus passed if the upper limit value has in fact been exceeded, the XH flag is set, the XH relay is turned on, and the LED 13 is turned on, thus to indicate that the upper limit value has been exceeded; and next the flow of control passes to the decision step 88. On the other hand, in the step 86, to which control is thus passed if the upper limit value has not in fact been exceeded, the XH flag is unset (i.e., set off) the XH relay is turned off, and the LED 13 is turned off, thus to indicate that the upper limit value has not in fact been exceeded; and next as before the flow of control passes to the decision step 88.

In this decision step 88, a decision is made as to whether the current value in the PV register is less than the value set in the L value register, or not. If the answer to this decision is NO, so that the current PV register value has not dropped below the lower limit therefor, then the flow of control passes next to the step 89. On the other hand, if the answer to this decision is YES, so that the current PV register value has indeed in fact dropped below the lower limit therefor, then in this case the flow of control passes next to the step 90.

In the step 90, to which control is thus passed if the lower limit value has in fact been dropped below, the XL flag is set, the XL relay is turned on, and the LED 14 is turned on, thus to indicate that the lower limit value has been dropped below; and next the flow of control passes to the decision step 91. On the other hand, in the step 89, to which control is thus passed if the lower limit value has not in fact been dropped below, the XL flag is unset (i.e., set off), the XL relay is turned off, and the LED 14 is turned off, thus to indicate that the lower limit value has not in fact been dropped below; and next as before the flow of control passes to the decision step 91.

In this decision step 91, a decision is made as to whether the push button switch PB5 is currently being pressed by the operator of this transducer, or not. If the answer to this decision is NO, so that the push button switch PB5 is not currently being depressed, then the flow of control passes next to return from this step 33 subroutine for running operation, so as to transit back to the FIG. 7 main program portion. On the other hand, if the answer to this decision is YES, so that the push button switch PB5 is in fact currently being depressed, then in this case the flow of control passes next to the step 92.

In this step 92, at which point it is definitely determined that the push button switch PB5 is being depressed by the operator, the values of the PV flag, of the H flag, and the L flag are sequentially set up and renewed, as in the step 73 explained earlier, and next as above the flow of control passes to return from this step 33 subroutine for running operation, so as to transit back to the FIG. 7 main program portion.

The process of manually varying the output

Now, the process whereby the output of this transducer may be manually varied will be explained, as the flow of the explanation returns to the FIG. 7 main program portion.

Upon completion of the run mode process performed by the subroutine step 33 therefore, the flow of control passes to the decision step 34. In this decision step 34, a decision is made as to whether the push button switch PB5 is currently being depressed by the operator, or not. If the answer to this decision is NO, so that the push button switch PB5 is not currently being depressed, then the flow of control passes next to the decision step 31, which is at the head of this main program, and the cycle described above repeats. On the other hand, if the answer to this decision is YES, so that the push button switch PB5 is in fact currently being depressed, then the next text should be performed, and in this case the flow of control passes next to the decision step 35.

In this decision step 35, a decision is made as to whether the push button switch PB4 is currently being depressed by the operator, or not. If the answer to this decision is NO, so that the push button switch PB4 is not currently being depressed, then the flow of control passes next to the decision step 36. On the other hand, if the answer to this decision is YES, so that the push button switch PB4 is in fact currently being depressed, then in this case the flow of control passs next to the decision step 37.

In the decision step 36, a decision is made as to whether the push button switch PB1 is currently being depressed by the operator, or not. If the answer to this decision is NO, so that, although the push button switch PB5 is being depessed, neither the push button switch PB1 nor the push button switch PB4 is currently being depressed, then the flow of control passes, as before, back to the start of this main program again, to cycle. On the other hand, if the answer to this decision is YES, so that the push button switch PB5 and the push button switch PB1 are in fact currently being depressed together, then in this case the flow of control passes next to the decision step 38.

On the other hand, in the decision step 37, at which the flow of control arrives if the push button switch PB5 and the push button switch PB4 are in fact currently being depressed together, a decision is made as to whether the time which has passed on the one second timer (vide FIG. 5) incorporated in the micro computer 4 has become greater than one second, or not. If the answer to this decision is NO, so that as yet one second has not elapsed from the time that the one second timer was started, then it is deemed that more time should be allowed to elapse, and then the flow of control passes next to the tag "D", which in fact leads back to the decision step 34 again, in a tight cycle to wait some further time. On the other hand, if the answer to this decision is YES, so that now the time as timed by the one second timer has become greater than one second while the push button switch PB5 and the push button switch PB4 were being depressed together, then it is deemed that it is now time for appropriate action, and in this case the flow of control passes next to the step 39. In this step 39, the receiving of the input data from the A/D converter 3 is suspended, and the next flow of control passes to the step 40. And, in this step 40, the value currently in the PV value register is incremented, and next the flow of control passes via the flag "E" to the step 43 of the second part of this main routine.

And in the decision step 38 likewise, at which the flow of control arrives if the push button switch PB5 and the push button switch PB1 are in fact currently being depressed together, again a decision is made as to whether the time which has passed on the one second timer (vide FIG. 5) incorporated in the micro computer 4 has become greater than one second, or not. If the answer to this decision is NO, so that as yet one second has not elapsed from the time that the one second timer was started, then it is deemed that more time should be allowed to elapse, and then the flow of control again passes next to the tag "D" which leads back to the decision step 34 again, in a tight cycle to wait some further time. On the other hand, if the answer to this decision is YES, so that now the time as timed by the one second timer has become greater than one second while the push button switch PB5 and the push button switch PB1 were being depressed together, then it is deemed that it is now time for appropriate action, and in this case the flow of control passes next to the step 41. In this step 41, the receiving of the input data from the A/D converter 3 is suspended, and next the flow of control passes to the step 42. And, in this step 42, the value currently in the PV value register is, this time, decremented, and next as before the flow of control passes via the flag "E" to the step 43 of the second part of this main routine.

In this step 43, the current value in the PV value register is displayed upon the display unit 6, and is temporarily retained in the latch circuit 7; and next the flow of control passes to the step 44. In this step 44, the LEDs 16 and 17 are turned off, while the LED 15 is turned on, thereby to indicate "PV" on the control panel of this transducer; and next the flow of control passes to the step 45.

In this step 45, a DC voltage between about 0 and about 5 volts DC corresponding to the input voltage is produced from the A/D converter 8 and is outputted to the outside from the output terminal 9a and 9b; and next the flow of control passes to the decision step 46. From here on, the program flow approximates to the program flow during the appropriate portion of the run mode subroutine, i.e. during the step 33.

In this decision step 46, then, a decision is made as to whether the current value in the PV register is greater than the value set in the H value register, or not. If the answer to this decision is NO, so that the current PV register value has not exceeded the upper limit therefor, then the flow of control passes next to the step 47. On the other hand, if the answer to this decision is YES, so that the current PV register value has indeed in fact exceeded the upper limit therefor, then in this case the flow of control passes next to the step 48.

In the step 48, to which control is thus passed if the upper limit value has in fact been exceeded, the XH flag is set, the XH relay is turned on, and the LED 13 is turned on, thus to indicate that the upper limit value has been exceeded; and next the flow of control passes to the decision step 49. On the other hand, in the step 47, to which control is thus passed if the upper limit value has not in fact been exceeded, the XH flag is unset (i.e., set off), the XH relay is turned off, and the LED 13 is turned off, thus to indicate that the upper limit value has not in fact been exceeded; and next as before the flow of control passes to the decision step 49.

In this decision step 49, a decision is made as to whether the current value in the PV register is less than the value set in the L value register, or not. If the answer to this decision is NO, so that the current PV register value has not dropped below the lower limit therefor, then the flow of control passes next to the step 50. On the other hand if the answer to this decision is YES, so that the current PV register value has indeed in fact dropped below the lower limit therefor, then in this case the flow of control passes next to the step 51.

In the step 50, to which control is thus passed if the lower limit value has in fact been dropped below, the XL flag is set, the XL relay is turned on, and the LED 14 is turned on, thus to indicate that the lower limit value has been dropped below; and next the flow of control passes to the point of this flow chart indicated by the tag "D", to cycle around. On the other hand, in the step 51, to which control is thus passed if the lower limit value has not in fact been dropped below, the XL flag is unset (i.e., set off), the XL relay is turned off, and the LED 14 is turned off, thus to indicate that the lower limit value has not in fact been dropped below, and next as before the flow of control passes to the point of this flow chart indicated by the tag "D", to cycle around. In either case, the results of this cycle depend upon whether or not, and which of, the push button switches PB1, PB4, and PB5 are being depressed.

Thus, it is seen that, according to the construction and operation of this second preferred embodiment of the transducer of the present invention as explained above, as before, it is possible to display the input voltage at the same time as obtaining a linearized DC output which corresponds to said input voltage, and to provide a transducer which has the function of a meter relay to set up the upper and the lower limits of the input with a pair of set up registers, and to produce a certain output when these limits are exceeded. And, further, by appropriately depressing the push button switches, it is possible to continuously vary the analog output irrespectively of the input, and to obtan a relay output when the input limits are exceeded. Thereby, by varying the output value to an arbitrary value during adjustment, it is possible to check the action of the transducer, and the action of the system to which said transducer is connected.

According to the above described second preferred embodiment of the present invention, the push button switch PB5 and the push button switches PB4 and PB1 were used for changing the display contents and for setting up digits, and the output value was varied when these push button switches are depressed at the same time, but it goes without saying that other switches may be used, in alternative possible embodiments of the present invention, to effect a similar action. The utilization of push button switches which have other functions, as herein disclosed, allows variation of the output without increasing the number of switches, but it would be possible alternatively to use dedicated switches to effect such an action. Such a variation should be considered to be within the scope of the present invention.

The third preferred embodiment

Figure 8:
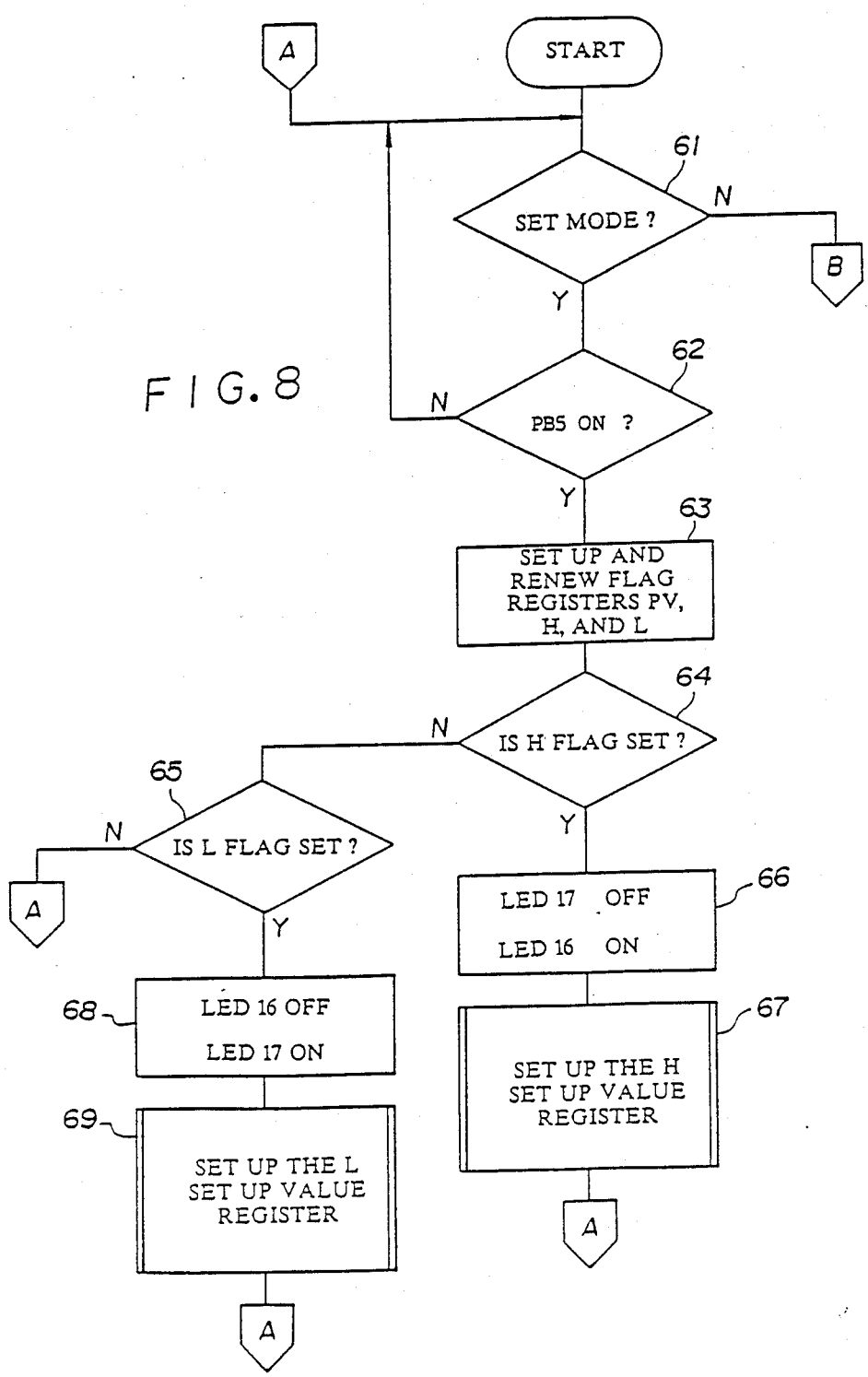
FIG. 8 is a flow chart, similar to the flow chart of FIG. 3, showing the flow of a subroutine program fragment obeyed by said micro computer, during a set mode of said program for setting up an upper and a lower limit value.

The third preferred embodiment of the transducer of the present invention will now be shown and described with the aid of FIGS. 8 and 9, in a similar manner to what was done above with relation to FIGS. 1 through 4 relating to the first preferred embodiment and FIGS. 5 through 7 relating to the second preferred embodiment. In these figures, parts and gaps and spaces and so on which correspond to analogous parts and gaps and spaces and so on of the first and second preferred embodiments are denoted by reference numerals like to those utilized in the figures relating to said first and second preferred embodiments.

Structure of the third preferred embodiment

FIG. 8 is a schematic block diagrammatical view of the internal structure of the third preferred embodiment of the transducer of the present invention, and is similar to FIG. 1 for the first preferred embodiment and FIG. 5 for the second preferred embodiment. The front control panel schematic view which was shown in FIG. 2 can be applied to this third preferred embodiment, also; and hence no particular repetiton thereof will be made, in the interests of brevity of description. Again, the transduer of this third preferred embodiment of the present invention is of a type which converts an input of AC voltage from about 0 to about 150 volts AC into an output of DC voltage from about 0 to about 5 volts DC. As shown in FIG. 8, the only substantial physical way in which this third preferred embodiment of the present invention differs from the first preferred embodiment disclosed above, is that the micro computer 4, in addition to its previously mentioned micro processor, input-/output interface, and storage means comprising the illustrated group of registers including the PV flag register, the H flag register, the L flag register, the XH flag, the XL flag, the PV value register, the H set up value register, and the L set up value register, is further internally provided with a PB5 flag register which is set when the push button switch PB5 is depressed, and is further provided with a timer of a per se known type. Apart from these features, the third preferred embodiment of the transducer of the present invention is structured substantially in the same way as the first preferred embodiment of the transducer of the present invention; and hence no particular repetition of the recitation of such structure will be made, in the interests of brevity of description.

Operation of the third preferred embodiment

Now, the operational action of this third preferred embodiment of the transducer according to the present invention will be explained. The general or overall flow of the operation thereof is substantially the same as that of the first preferred embodiment detailed above, but there are some differences with regard to the run mode. Thus, in the case of the

Operation of the third preferred embodiment in set mode there are no substantial differences from the first preferred embodiment as detailed above, and hence no particular repetition thereof will be made, in the interests of brevity of description. And, particularly, the flow chart shown in FIG. 3 applies exactly, including its tags "A" and "B".

Operation of the third preferred embodiment-run mode

Figure 10:
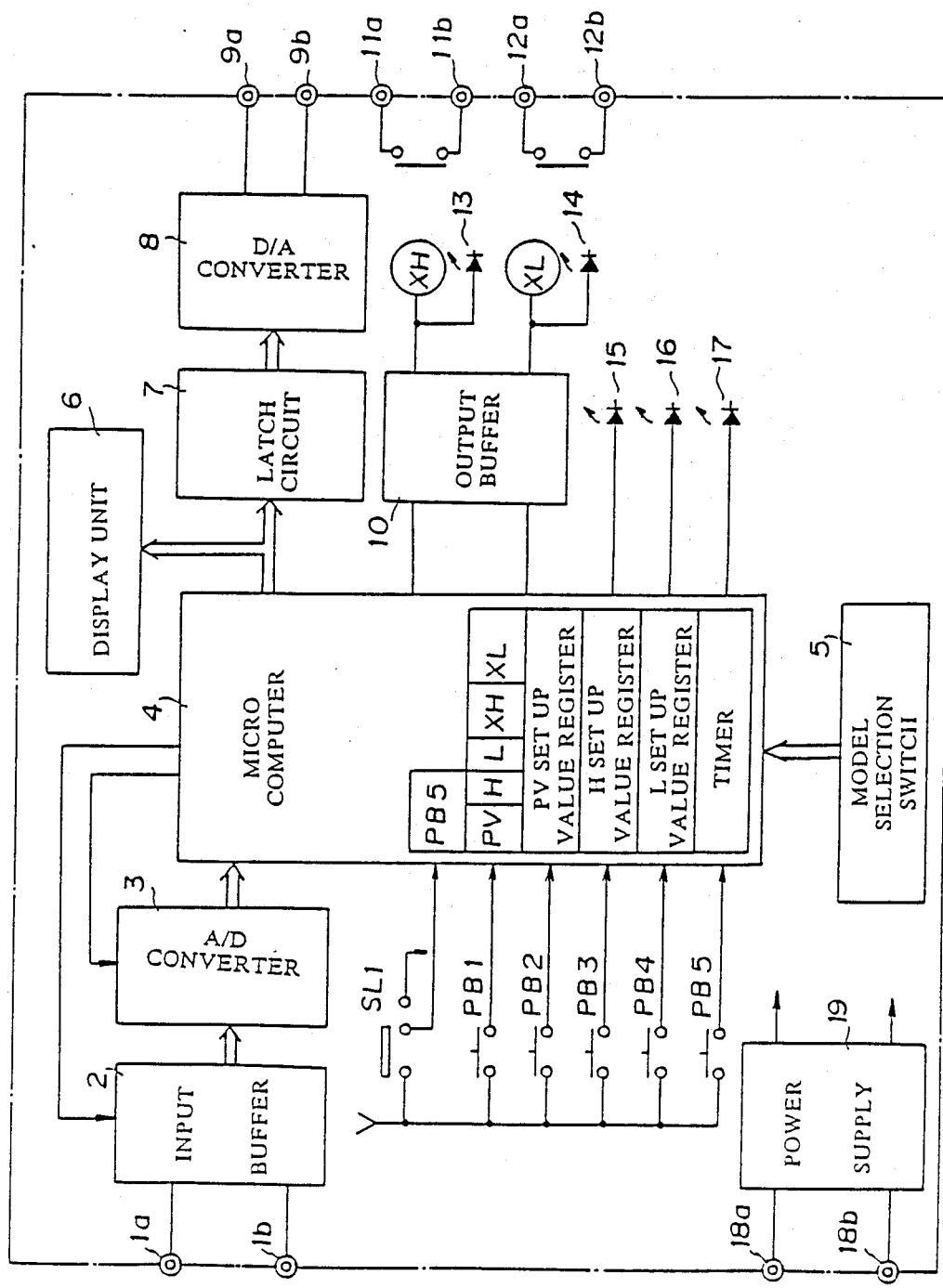
FIG. 10, similarly to FIGS. 1 and 5 for the first and the second preferred embodiments respectively, is a schematic block diagrammatical view of the internal structure of the third preferred embodiment of the transducer of the present invention.
Figure 11A:
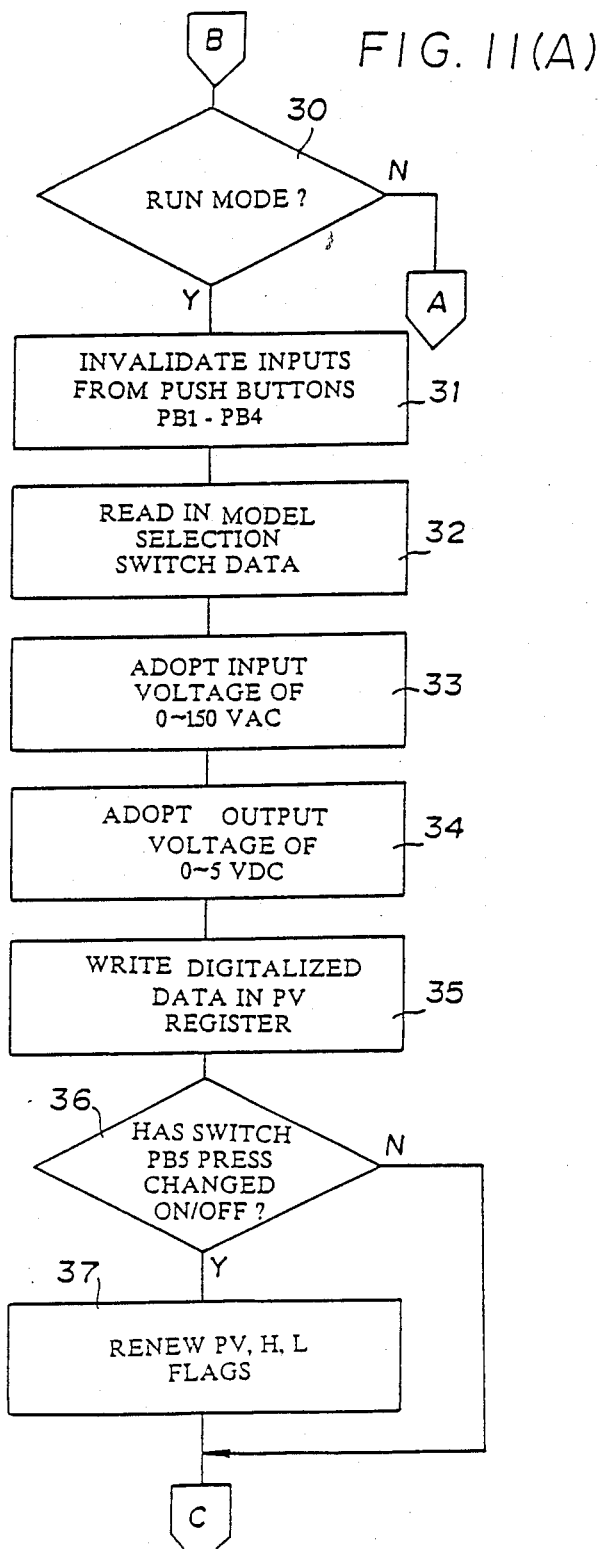
FIG. 11 is another flow chart, similarly broken into, now, three portions in FIGS. 11(a), 11(b), and 11(c) for the convenience of layout, like FIGS. 4 and 9 for the first and the second preferred embodiments respectively, showing the flow of a program obeyed by a micro computer incorporated in said third preferred embodiment of the transducer of the present invention during a run mode of said program.
Figure 11B:
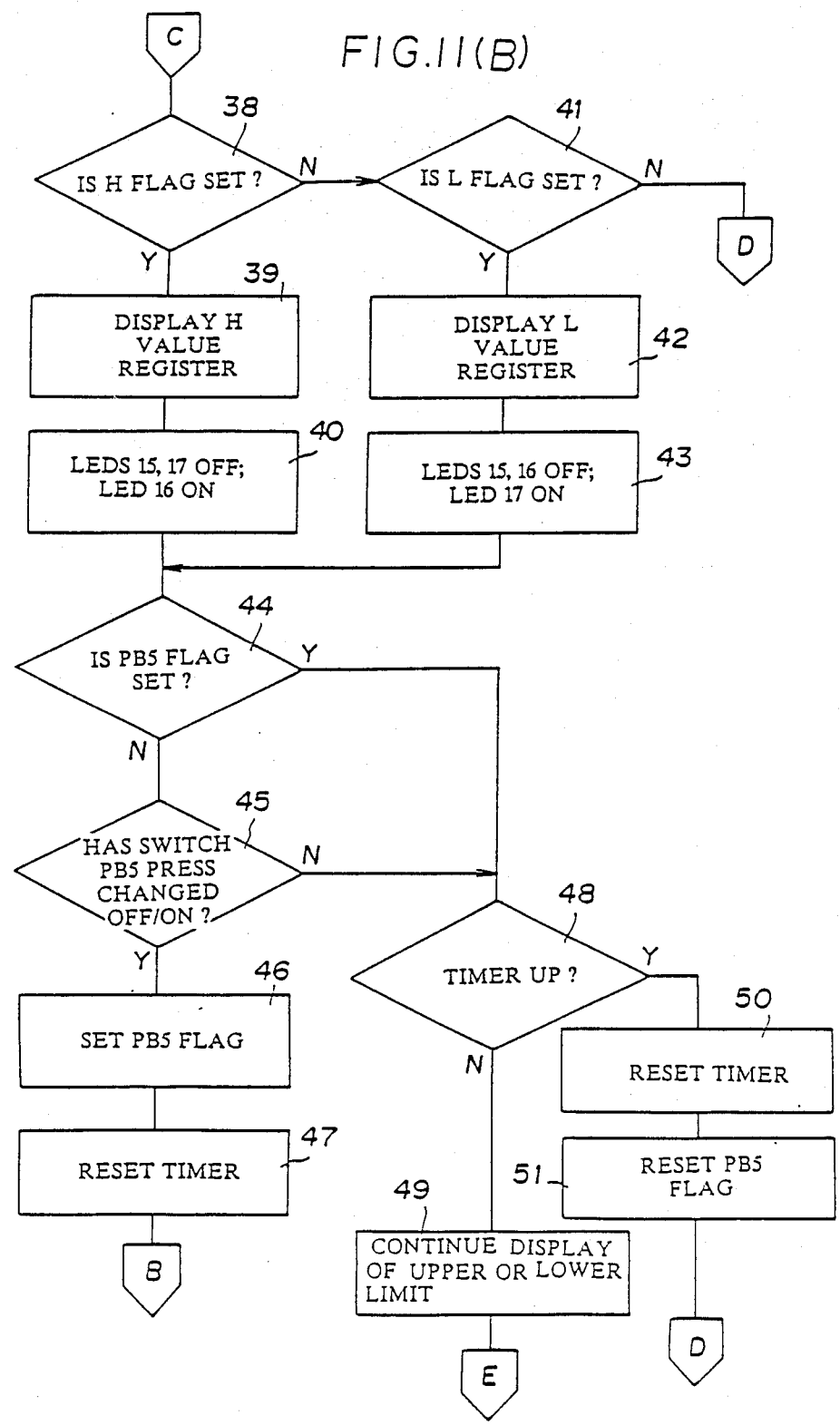
Figure 11C:
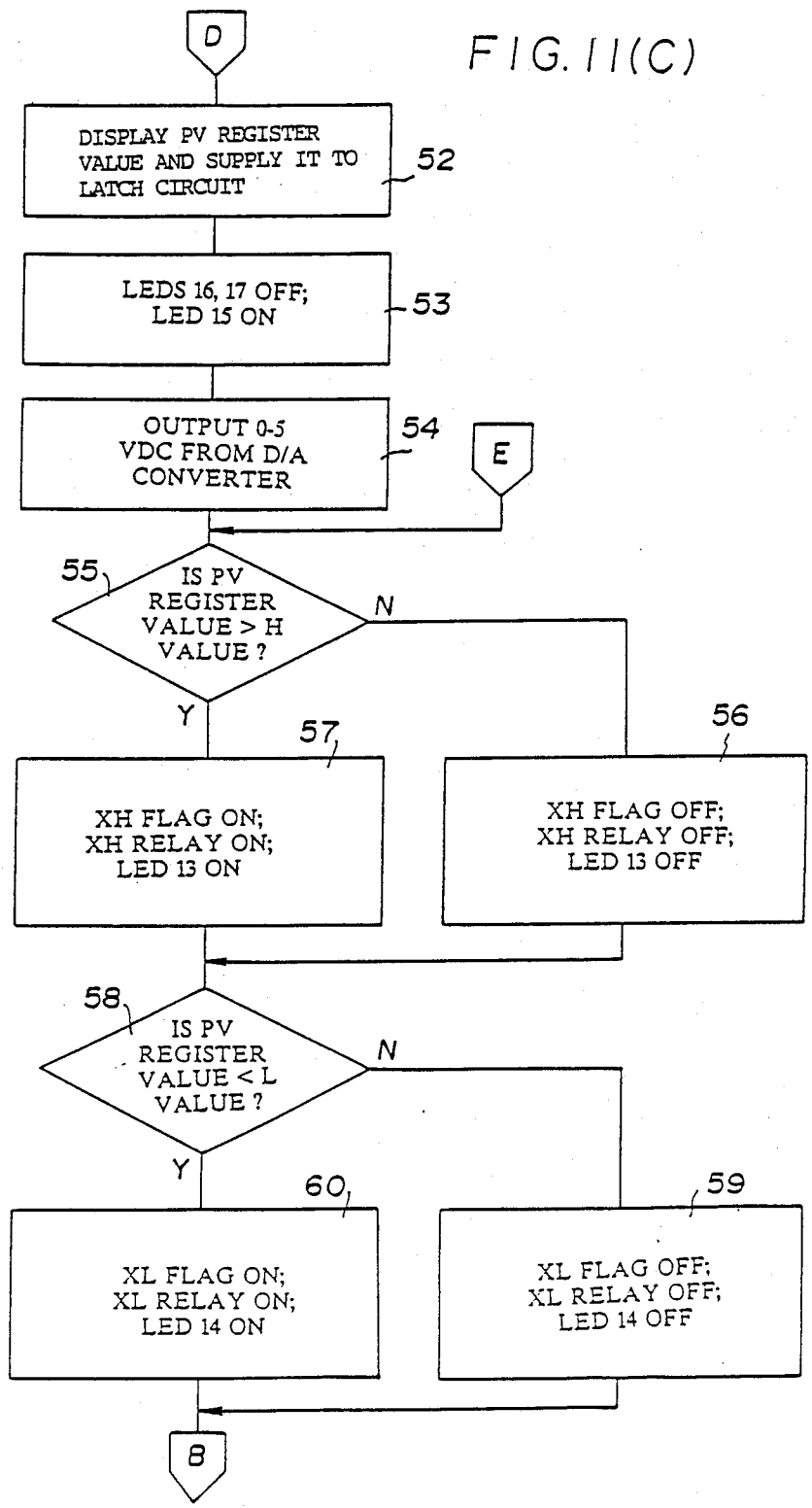

Next, the operation of this third preferred embodiment of the transducer of the present invention with regard to actual running will be detailed, with particular reference to FIG. 11 which is a flow chart which shows the flow of a program obeyed by the micro computer 4 of FIG. 10, during such a program run mode. It should be noted that the flow chart of FIG. 11 is broken into three portions denoted as 11(a), 11(b) and 11(c) for the convenience of layout, with the tag "C" joining the first II(a) of said flow chart portions to the second 11(b) in the logical sense, and similarly the tags "D" and "E" joining the second 11(b) of said flow chart portions to the third 11(c).

Upon completion of the set up stage, so that a lower limit value and an upper limit value have been set up by the operator of this transducer, said operator then switches over the slide switch SL1 to the run mode. The micro computer 4 checks to ascertain the position of this slide switch SL1 in the step 21, and also in the decision step 30 of this program portion, to which control is passed from the tag "B" at which point the flow of control enters this program portion. In other words, in this decision step 30, a decision is made as to whether the position of the slide switch indicates running operation, or not. If the answer to this decision is NO, so that the current mode is not the run mode, then it is deemed that the current mode is now the set mode, and then the flow of control passes next to the tag "A", which leads to the program whose flow chart is detailed in FIG. 3, for the set mode. On the other hand, if the answer to this decision is YES, so that the current mode is indeed the run mode, in this case the flow of control passes next to the step 31.

In this step 31, further input to the push button switches PB1 through PB4 is invalidated, and next the flow of control passes to the step 32.

In this step 32, the data set on the model selection switch SW5 is read in to the micro computer 4, and next the flow of control passes to the steps 33 and 34; these following steps shown here are exemplary, in the exemplary case that these data on the model selection switch 5 should indicate that the operation required from this transducer is the conversion of a 0 to 150 VAC voltage into a 0 to 5 VDC voltage. In this step 33, then, an input voltage of from approximately 0 to approximately 150 volts of AC is adopted, and next the flow of control passes to the step 34. And, in this step 34, an output voltage of from approximately 0 to approximately 5 volts of DC is adopted, and next the flow of control passes to the step 35. Thus, the input voltage supplied from outside to the input terminals 1a and 1b is rectified and is voltage divided by the input buffer 2, and the output of this input buffer 2 is supplied to the A/D converter 3.

In this step 35, while thus the output of this input buffer 2 is supplied to the A/D converter 3, sampling pulses of a certain frequency are supplied from the micro computer 4 to said A/D converter 3, and the digitalized data is written into the PV value register in the memory of said micro computer 4; and next the flow of control passes to the decision step 36.

In this decision step 36, a decision is made as to whether the push button switch SW5 is pressed and has changed from off to on, or not. If the answer to this decision is NO, then the flow of control passes next to the decision step 38 (via the tag "C"). On the other hand, if the answer to this decision is YES, then the flow of control passes through the step 37.

In this step 37, the PV flag, the H flag, and the L flag are renewed; and then the control flow passes next to the decision step 38 (via the tag "C").

In this decision step 38, a decision is made as to whether or not the H flag register is currently set, or not. If the answer to this decision is NO, so that the H flag register is not currently set, then it is deemed that the higher limit value is not currently being exceeded, and then the flow of control passes next to the decision step 41, so as to check for whether or not the lower limit value is currently being exceeded. On the other hand, if the answer to this decision is YES, so that the H flag register is currently set, then it is deemed that the higher limit value is currently being exceeded, and in this case the flow of control passes next to the step 39.

In this step 39, the upper limit value, already stored in the H set up value register during the set portion of the program of the micro computer 4, is displayed upon the display 6 of the front panel of the transducer, and next the flow of control passes to the step 40. And, in this step 40, the LEDs 15 and 17 are turned off, and the LED 16 is turned on, thus to indicate that the high set value limit has been exceeded, and next the flow of control passes to the decision step 44.

On the other hand, in the decision step 41, a decision is made as to whether the L flag register is currently set, or not. If the answer to this decision is NO, so that the L flag register is not currently set, then it is deemed that the lower limit value is not currently being exceeded (either), and then the flow of control passes next via the tag "D" to the step 52. On the other hand, if the answer to this decision is YES, so that the L flag register is currently set, then it is deemed that the lower limit value is currently being exceeded, and in this case the flow of control passes next to the step 42.

In this step 42, like in the step 40, the lower limit value, already stored in the L set up value register during the set portion of the program of the micro computer 4, is displayed upon the display 6 of the front panel of the transducer, and next the flow of control passes to the step 43. And, in this step 43, the LEDs 15 and 16 are turned off, and the LED 17 is turned on, thus to indicate that the low set value limit has been exceeded, and next as before the flow of control passes to the decision step 44.

In this decision step 44, a decision is made as to whether the PB5 flag is set, or not. If the answer to this decision is YES, then the flow of control passes next to the decision step 48; while, if the answer to this decision is NO, then the flow of control passes next to the decision step 45. Initially, since this flag is reset, the flow of the program advances to the decision step 45.

In this decision step 45, a decision is made as to whether the push button switch PB5 has changed from on to off, or not. If the answer to this decision is NO, so that the push button switch PB5 has not thus changed from ON to OFF, then the flow of control passes next to the decision step 48. On the other hand, if the answer to this decision is YES, so that the push button switch PB5 has in fact thus changed from ON to OFF, then in this case the flow of control passes next to the step 46.

In this step 46, the PB5 flag is set, and next the flow of control passes to the step 47. In this step 47, the internal timer of the micro computer 4 is started. This timer may, for example, be a five second timer. Then, via the tag "B", the flow of the program returns to the decision step 30 at the head of FIG. 11, to cycle round.

On the other hand, in the decision step 48, after it has been detected that the PB5 flag is set to the step 44, after performing the steps 39 and 40 or the steps 42 and 43, a decision is made as to whether the timer has finished its count, or not. If the answer to this decision is NO, so that the timer has not yet finished its count, then it is deemed that further time is required, and then the flow of control passes next to the step 49. On the other hand, if the answer to this decision is YES, so that the time is now up, then it is deemed that no more time is required, and in this case the flow of control passes next to the step 50.

In this step 49, at which point it is determined that the timer has not yet timed up, the display of the upper limit value or the lower limit value, as performed in the step 39 or 42 respectively, is continued, and next, via the tag "E", the flow of the program passes to the decision step 55, later in this program fragment.

On the other hand, if the timer has finished its count, then, in the step 50, said timer is reset, and then in the step 51 the PB5 flag is reset. Thus, it is possible to automatically restore the display 6 to that of the current value after confirming the upper or the lower limit value by pressing the push button switch PB5, during the action of this transducer. Then, via the tag "D", the flow of the program passes to the step 52.

In this step 52, the current value in the PV register, which was inputted thereinto in the step 35, is displayed on the display 6, and is also fed to the latch circuit 7 so as to be temporarily retained therein; and next the flow of control passes to the step 53.

In this step 53, the LEDs 16 and 17 are turned off and the LED 15 is turned on, thus to indicate that the current value is being displayed; and next the flow of control passes to the step 54.

In this step 54, a DC voltage between about 0 and about 5 volts DC corresponding to the input voltage is produced from the A/D converter 8 and is outputted to the outside from the output terminals 9a and 9b; and next the flow of control passes to the decision step 55. This point in the FIG. 11 program is also identified by the tag "E", and control is passed thereto from the step 49, described earlier in this specification.

In the decision step 55, then, a decision is made as to whether the current value in the PV register is greater than the value set in the H value register, or not. If the answer to this decision is NO, so that the current PV register value has not exceeded the upper limit therefor, then the flow of control passes next to the step 56. On the other hand, if the answer to this decision is YES, so that the current PV register value has indeed in fact exceeded the upper limit therefor, then in this case the flow of control passes next to the step 57.

In the step 57, to which control is thus passed if the upper limit value has in fact been exceeded, the XH flag is set, the XH relay is turned on, and the LED 13 is turned on, thus to indicate that the upper limit value has been exceeded; and next the flow of control passes to the decision step 58. On the other hand, in the step 56, to which control is thus passed if the upper limit value has not in fact been exceeded, the XH flag is unset (i.e., set off), the XH relay is turned off, and the LED 13 is turned off, thus to indicate that the upper limit value has not in fact been exceeded; and next as before the flow of control passes to the decision step 58.

In this decision step 58, a decision is made as to whether the current value in the PV register is less than the value set in the L value register, or not. If the answer to this decision is NO, so that the current PV register value has not dropped below the lower limit therefor, then the flow of control passes next to the step 59. On the other hand, if the answer to this decision is YES, so that the current PV register value has indeed in fact dropped below the lower limit therefor, then in this case the flow of control passes next to the step 60.

In the step 60, to which control is thus passed if the lower limit value has in fact been dropped below, the XL flag is set, the XL relay is turned on, and the LED 14 is turned on, thus to indicate that the lower limit value has been dropped below; and next the flow of control passes, via the tag "B", to the decision step 30 at the head of this program, to cycle around again. On the other hand, in the step 59, to which control is thus passed if the lower limit value has not in fact been dropped below, the XL flag is unset (i.e., set off), the XL relay is turned off, and the LED 14 is turned off, thus to indicate that the lower limit value has not in fact been dropped below; and next as before the flow of control passes, via the tag "B", to the decision step 30 at the head of this program, to cycle around again, to repeat the program flow explained above.

Thus, according to the construction and operation of the third preferred embodiment of the transducer of the present invention as explained above, it is seen that it is possible, by pushing the push button switch PB5, to display the upper limit value or the lower limit value on the display 6 for a certain time interval, and then the display 6 returns automatically to display the current value. Thus, the possibility of confusing the upper limit value or the lower limit value with the current value is eliminated, in addition to the other advantages of the present invention already discussed with respect to the first and the second preferred embodiments of the transducer of the present invention.

The fourth preferred embodiment

The fourth preferred embodiment of the transducer of the present invention will now be shown and described with the aid of FIGS. 12 through 15, in a similar manner to what was done above with relation to FIGS. 1 through 4 relating to the first preferred embodiment. In these figures, parts and gaps and spaces and so on which correspond to analogous parts and gaps and spaces and so on of the first through the third preferred embodiments are denoted by reference numerals like to those utilized in the figures relating to said first through preferred embodiments.

Structure of the fourth preferred embodiment

Figure 12:
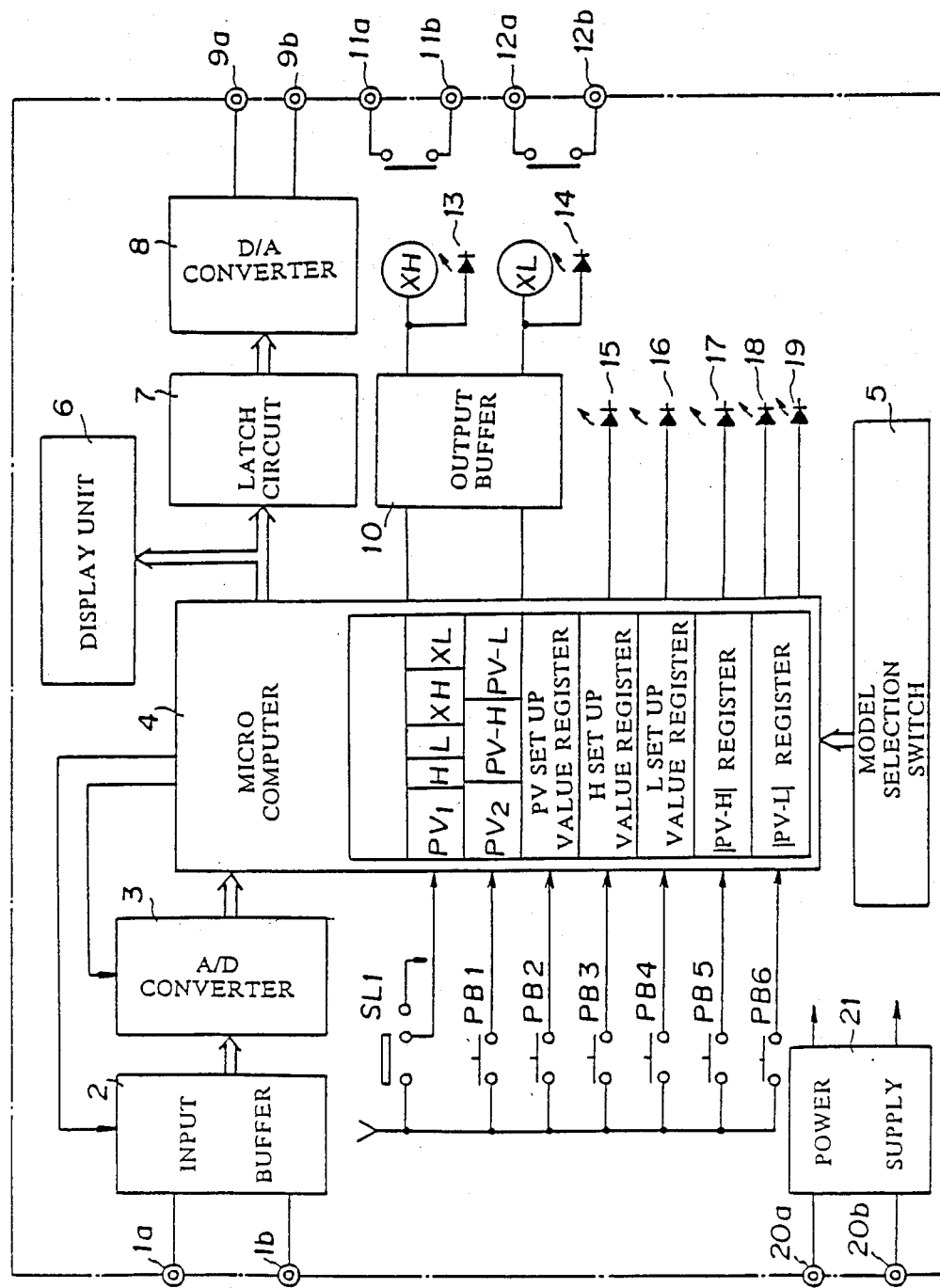
FIG. 12, similarly to FIGS. 1, 5, and 10 for the first, the second, and the third preferred embodiments respectively, is a schematic block diagrammatical view of the internal structure of the fourth preferred embodiment of the transducer of the present invention.
Figure 13:
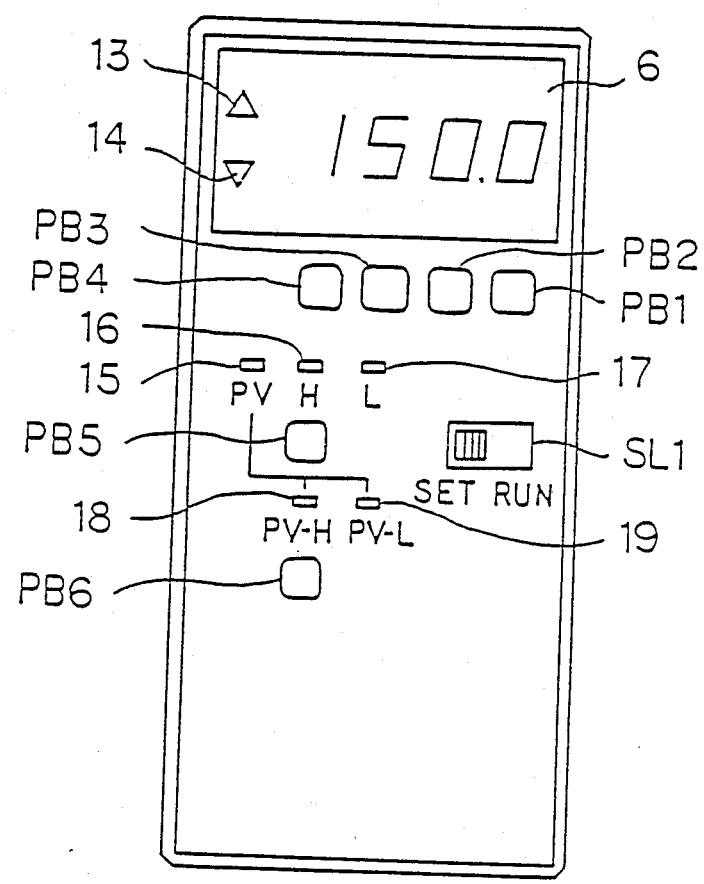
FIG. 13 is a schematic view of a front control panel of said fourth preferred embodiment of the transducer of the present invention, like FIG. 2 for the first preferred embodiment.

FIG. 12 is a schematic block diagrammatical view of the internal structure of the fourth preferred embodiment of the transducer of the present invention, and is similar to FIG. 1 for the first preferred embodiment; and a front control panel schematic view of this fourth preferred embodiment is shown in FIG. 13. Again, the transducer of this fourth preferred embodiment of the present invention is of a type which converts an input of AC voltage from about 0 to about 150 volts AC into an output of DC voltage from about 0 to about 5 volts DC. As shown in FIGS. 12 and 13, the only substantial physical ways in which this fourth preferred embodiment of the present invention differs from the first preferred embodiment disclosed above, are that a sixth push button switch PB6 is provided on the front panel of the transducer for switching over the contents of the display, and further the micro computer 4, in addition to its previously mentioned micro processor, input/output interface, and storage means comprising the illustrated group of registers including the H flag register, the L flag register, the XH flag, the XL flag, the PV value register, the H set up value register, and the L set up value register, is further internally provided with an accumulator, a PV1 flag register and a PV2 flag register (instead of only a PV flag as was the case in the previous embodiments), and also with a PV-H flag register anbd a PV-L flag register which are set when the difference between the current value and the upper limit value is to be displayed or when the difference between the current value and the lower limit value is to be displayed respectively, and further is provided with a |PV-H| value register and a |PV-L| value register, which are for storing the absolute value of the difference between the current value and the upper limit value and the absolute value of the difference between the current value and the lower limit value respectively. Further, the micro computer 4 is connected to two further LEDs: a PV-H LED 18 and a PV-L LED 19, which are for indicating the fact of the display of the difference between the current value and the upper limit value, and the fact of the display of the difference between the current value and the lower limit value, respectively. The power source is now denoted by the reference symbol 21, while the terminals for the power are denoted as 20a and 20b. Apart from these features, the fourth preferred embodiment of the transducer of the present invention is structured substantially in the same way as the first preferred embodiment of the transducer of the present invention; and hence no particular repitition of the recitation of such structure will be made, in the interests of brevity of description.

Operation of the fourth preferred embodiment

Now, the operational action of this fourth preferred embodiment of the transducer according to the present invention will be explained. The general or overall flow of the operation thereof is substantially the same as that of the first preferred embodiment detailed above, but there are some differences with regard to the run mode. Thus, in the case of the

Operation of the fourth preferred embodiment in set mode there are no substantial differences from the first preferred embodiment as detailed above, and hence no particular repetition thereof will be made, in the interests of brevity of description. And, particularly, the flow chart shown in FIG. 3 applies exactly, including its tags "A" and "B".

Operation of the fourth preferred embodiment—run mode

Figure 14:
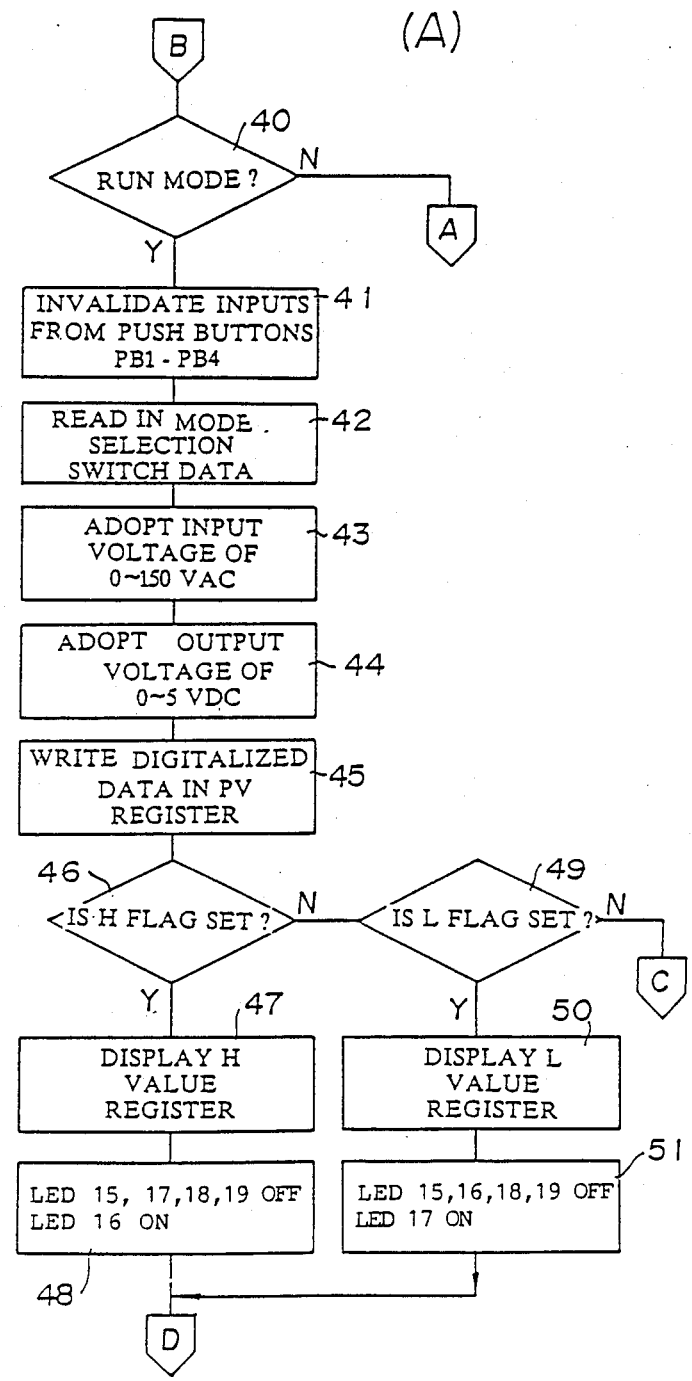
FIG. 14 is another flow chart, similarly broken into two portions in FIGS. 14(a) and 14(b) for the convenience of layout, like FIGS. 4, 9, and 11 for the first, the second, and the third preferred embodiments respectively, showing the flow of a program obeyed by a micro computer incorporated in said fourth preferred embodiment of the transducer of the present invention during a run mode of said program.

Next, the operation of this fourth preferred embodiment of the transducer of the present invention with regard to actual running will be detailed, with particular reference to FIG. 14 which is a flow chart which shows the flow of a program obeyed by the micro computer 4 of FIG. 12, during such a program run mode. It should be noted that the flow chart of FIG. 14 is broken into two portions denoted as 14(a) and 14(b) for the convenience of layout, with the tag "C" joining said two flow chart portions 14(a) and 14(b) in the logical sense.

Upon completion of the set up stage, so that a lower limit value and an upper limit value have been set up by the operator of this transducer, said operator then switches over the slide switch SL1 to the run mode. The micro computer 4 checks to ascertain the position of this slide switch SL1 in the step 40. If the answer to this decision is NO, so that the current mode is not the run mode, then it is deemed that the current mode is now the set mode, and then the flow of control passes next to the tag "A", which leads to the program analogous to the previously described program whose flow chart was detailed in FIG. 3, for the set mode. On the other hand, if the answer to this decision is YES, so that the current mode is indeed the run mode, in this case the flow of control passes next to the step 41.

In this step 41, further input to the push button switches PB1 through PB4 is invalidated, and next the flow of control passes to the step 42.

In this step 42, the data set on the model selection switch 5 is read in to the micro computer 4, and next the flow of control passes to the steps 33 and 34; these following steps shown here are exemplary, in the exemplary case that these data on the model selection switch 5 should indicate that the operation required from this transducer is the conversion of a 0 to 150 VAC voltage into a 0 to 5 VDC voltage. In this step 43, then, an input voltage of from approximately 0 to approximately 150 volts of AC is adopted, and next the flow of control passes to the step 44. And, in this step 44, an output voltage of from approximately 0 to approximately 5 volts of DC is adopted, and next the flow of control passes to the step 45. Thus, the input voltage supplied from outside to the input terminals 1a and 1b is rectified and is voltage divided by the input buffer 2, and the output of this input buffer 2 is supplied to the A/D converter 3.

In this step 45, while thus the output of this input buffer 2 is supplied to the A/D converter 3, sampling pulses of a certain frequency are supplied from the micro computer 4 to said A/D converter 3, and the digitalized data is written into the PV value register in the memory of said micro computer 4; and next the flow of control passes to the decision step 46.

In this decision step 46, a decision is made as to whether the H flag register is currently set, or not. If the answer to this decision is NO, so that the H flag register is not currently set, then it is deemed that the higher limit value is not currently being exceeded, and then the flow of control passes next to the decision step 49, so as to check for whether or not the lower limit value is currently being exceeded. On the other hand, if the answer to this decision is YES, so that the H flag register is currently set, then it is deemed that the higher limit value is currently being exceeded, and in this case the flow of control passes next to the step 47.

In this step 47, the upper limit value, already stored in the H set up value register during the set portion of the program of the micro computer 4, is displayed upon the display 6 of the front panel of the transducer, and next the flow of control passes to the step 48. And, in this step 48, the LEDs 15 and 17 through 19 are turned off, and the LED 16 is turned on, thus to indicate that the high set value limit has been exceeded, and next the flow of control passes to the tag "D", to transit to the FIG. 15 program portion.

On the other hand, in the decision step 49, a decision is made as to whether the L flag register is currently set, or not. If the answer to this decision is NO, so that the L flag register is not currently set, then it is deemed that the lower limit value is not currently being exceeded (either), and then the flow of control passes next to the decision step 52. On the other hand, if the answer to this decision is YES, so that the L flag register is currently set, then it is deemed that the lower limit value is currently being exceeded, and in this case the flow of control passes next to the step 50.

In this step 50, like in the step 48, the lower limit value, already stored in the L set up value register during the set portion of the program of the micro computer 4, is displayed upon the display 6 of the front panel of the transducer, and next the flow of control passes to the step 51. And, in this step 51, the LEDs 15, 16, 18, and 19 are turned off, and the LED 17 is turned on, thus to indicate that the low set value limit has been exceeded, and next as before the flow of control passes to the tag "d", to transit to the FIG. 15 program portion.

On the other hand, if in the decision steps 36 and 39 it has been determined that neither the H flag nor the L flag have been set, then the flow program control passes via the tag "C" to the decision step 52 in the next FIG. 14(b) program portion. In this decision step 52, a decision is made as to whether the PV1 flag is set, or not. If the answer to this decision is NO, so that the PV1 flag is not currently set, then this indicates an error condition, and then the flow of control passes next to an error handling routine, which for instance operates by displaying "EEE" on the display 6. On the other hand, if the answer to this decision is YES, so that the PV1 flag is in fact currently set, then in this case the flow of control passes next to the step 53.

In this step 53, the PB6 key data are inputted by the micro computer 4, and next the flow of control passes to the decision step 54. In this decision step 54, a decision is made as to whether a key stroke has occurred, or not. If the answer to this decision is NO, then the flow of control passes next to the step 56, thus skipping the step 55. On the other hand, if the answer to this decision is YES, so that a key stroke has occurred, then the flow of control passes next to the step 55.

In this step 55, the PV2 flag (this should be noted), the PV-H flag, and the PV-L flag are renewed and set, and next the flow of control passes to the decision step 56.

In this decision step 56, a decision is made as to whether the PV2 flag is set, or not. If the answer to this decision is NO, so that the PV2 flag is not set, then the flow of control passes next to the step 59. On the other hand, if the answer to this decision is YES, so that the PV2 flag is in fact set, then it is necessary to display the current value on the display 6, and thus in this case the flow of control passes next to the step 57.

In this step 57, the PV value in the PV register is displayed on the display 6, and next the flow of control passes to the step 58. In this step 58, the LED's 16 through 19 are turned off, while on the other hand the LED 15 is turned on, thus indicating that the current value is being displayed on the display 6; and next the flow of control passes to the step 64.

On the other hand, in the decision step 59, to which as explained above control is passed if the current value is not to be displayed on the display 6, a decision is made as to whether the PV−H flag is set, or not. If the answer to this decision is NO, so that the PV−H flag is not currently set, then it is deemed that it is the PV−1 flag which is the one which is currently set, and then the flow of control passes next to the step 62. On the other hand, if the answer to this decision is YES, so that the PV−H flag is in fact currently set, then in this case the flow of control passes next to the step 60.

In this step 60, the absolute value of the difference between the contents of the PV value register and the contents of the H value register is computed, using the accumulator of the micro computer 4, and the result |PV−H| is displayed on the display 6; and next the flow of control passes to the step 61. In this step 61, the LED 18 is turned on while the other LEDs 15, 16, 17, and 19 are turned off, thus to indicate that it is the value of |PV−H| which is being displayed; and next the flow of control passes to the step 64.

On the other hand, in the step 62, the absolute value of the difference between the contents of the PV value register and the contents of the L value register is similarly computed using the accumulator of the micro computer 4, and the result |PV−L| is displayed on the display 6; and next the flow of control passes to the step 63. In this step 63, the LED 19 is turned on while the other LEDs 15 through 18 are turned off, thus to indicate that it is the value of |PV−L| which is being displayed; and next the flow of control passes to the step 64.

Then finally, in the step 64, which thus can in fact have been arrived at via any one of three program paths, a DC voltage between about 0 and about 5 volts DC corresponding to the input voltage is produced from the A/D converter 8 and is outputted to the outside from the output terminals 9a and 9b; and next the flow of control passes to the tag "D", to transit to the FIG. 15 program portion, which will now be explained, and which is similar but not identical to the previously described preferred embodiments.

Figure 15:
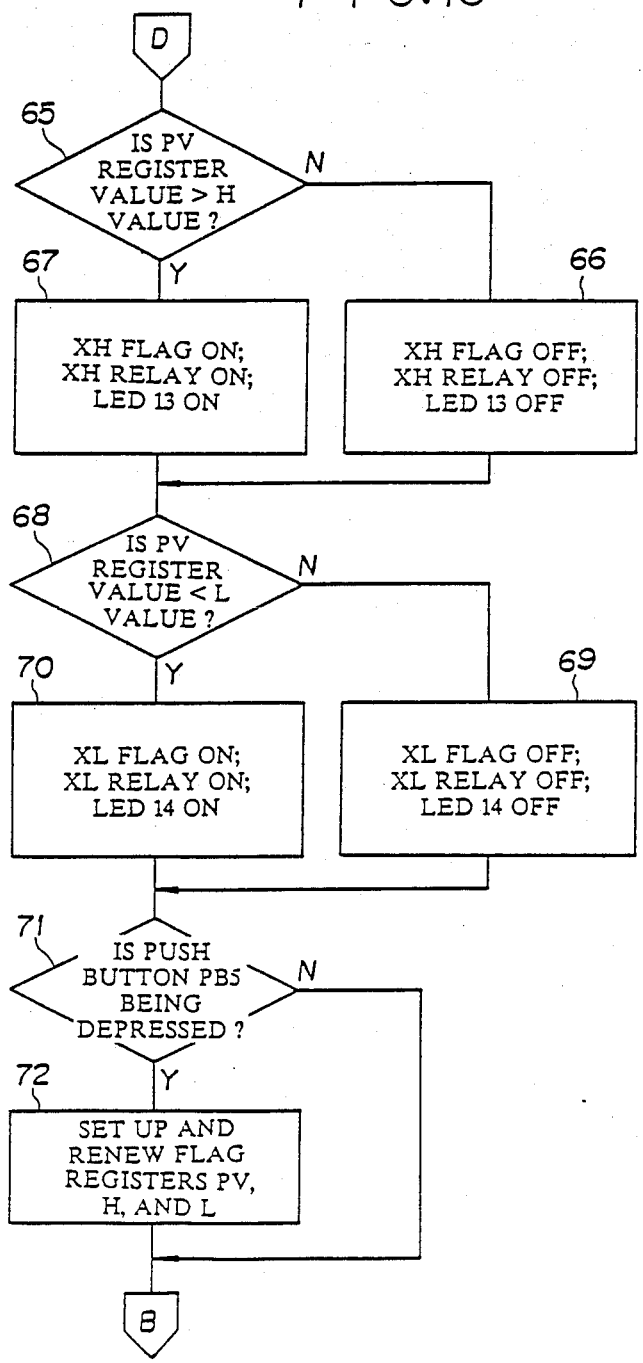
FIG. 15 is another flow chart, continuing on from the FIG. 14 flow charts, and showing the flow of said program of said fourth preferred embodiment during its run mode.

Control is passed from the tag "D", at which point the flow of control enters the FIG. 15 program portion to the decision step 65. In this decision step 65, a decision is made as to whether the current value in the PV register is greater than the value set in the H value register, or not. If the answer to this decision is NO, so that the current PV register value has not exceeded the upper limit therefor, then the flow of control passes next to the step 66. On the other hand, if the answer to this decision is YES, so that the current PV register value has indeed in fact exceeded the upper limit therefor, then in this case the flow of control passes next to the step 67.

In the step 67, to which control is thus passed if the upper limit value has in fact been exceeded, the XH flag is set, the XH relay is turned on, and the LED 13 is turned on, thus to indicate that the upper limit value has been exceeded; and next the flow of control passes to the decision step 68. On the other hand, in the step 66, to which control is thus passed if the upper limit value has not in fact been exceeded, the XH flag is unset (i.e., set off), the XH relay is turned off, and the LED 13 is turned off, thus to indicate that the upper limit value has not in fact been exceeded; and next as before the flow of control passes to the decision step 68.

In this decision step 68, a decision is made as to whether the current value in the PV register is less than the value set in the L value register, or not. If the answer to this decision is NO, so that the current PV register value has not dropped below the lower limit therefor, then the flow of control passes next to the step 69. On the other hand, if the answer to this decision is YES, so that the current PV register value has indeed in fact dropped below the lower limit therefor, then in this case the flow of control passes next to the step 70.

In the step 70, to which control is thus passed if the lower limit value has in fact been dropped below, the XL flag is set, the XL relay is turned on, and the LED 14 is turned on, thus to indicate that the lower limit value has been dropped below; and next the flow of control passes to the decision step 71. On the other hand, in the step 79, to which control is thus passed if the lower limit value has not in fact been dropped below, the XL flag is unset (i.e., set off), the XL relay is turned off, and the LED 14 is turned off, thus to indicate that the lower limit value has not in fact been dropped below; and next as before the flow of control passes to the decision step 71.

In this decision step 71, a decision is made as to whether the push button switch PB5 is currently being pressed by the operator of this transducer, or not. If the answer to this decision is NO, so that the push button switch PB5 is not currently being depressed, then the flow of control passes next to the tag "B", to transit back to the FIG. 14 program portion, to repeat the program flow explained above without further ado. On the other hand, if the answer to this decision is YES, so that the push button switch PB5 is in fact currently being depressed, then in this case the flow of control passes next to the step 72.

In this step 72, at which point it is definitely determined that the push button switch PB5 is being depressed by the operator, the values of the PV1 flag (this should be noted), of the H flag, and of the L flag are sequentially set up and renewed, and next as above the flow of control passes to the tag "B", to transit back to the FIG. 14 program portion, to repeat the program flow explained above.

Thus, it is seen that, as before, according to the above described fourth preferred embodiment of the transducer of the present invention, it is possible to display the input voltage at the same time as obtaining a linearized DC output which corresponds to said input voltage, and to provide a transducer which has the function of a meter relay to set up the upper and the lower limits of the input with a pair of set up registers, and to produce a certain output when these limits are exceeded. And, further, at the same time it is possible to display on the display the difference between the current value and the upper limit value, or alternatively the difference between the current value and the lower limit value. Thereby, the operating condition of this transducer can be recognized.

Although in the above described fourth preferred embodiment of the transducer of the present invention LEDs for displaying the indications "PV−H" and "PV−L" were provided on the panel of the device, it would be alternatively possible to light up the PV display diode and the lower or the upper limit display diode at the same time, in order to indicate that the difference therebetween was being displayed. Such a variation should be considered as being within the scope of the above described specialized inventive concept.

The fifth preferred embodiment

The fifth preferred embodiment of the transducer of the present invention will now be shown and described with the aid of FIGS. 16 through 19, in a similar manner to what was done above with relation to FIGS. 1 through 4 relating to the first preferred embodiment. In these figures, parts and gaps and spaces and so on which correspond to analogous parts and gaps and spaces and so on of the first through the fourth preferred embodiments are denoted by reference numerals like to those utilized in the figures relating to said first through fourth preferred embodiments.

Structure of the fifth preferred embodiment

Figure 16:
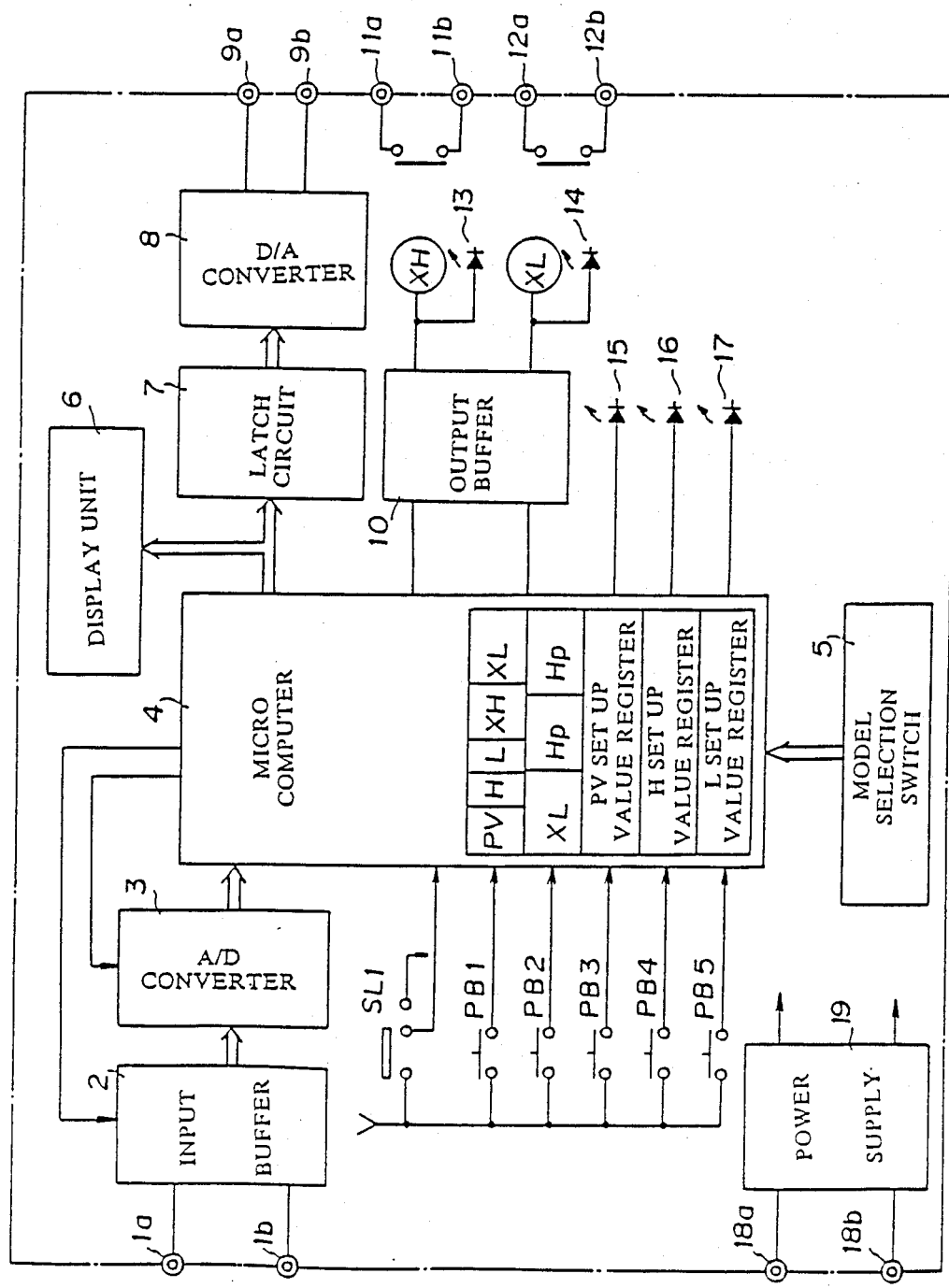
FIG. 16, similarly to FIGS. 1, 5, 10, and 12 for the first through the fourth preferred embodiments respectively, is a schematic block diagrammatical view of the internal structure of the fifth preferred embodiment of the transducer of the present invention.

FIG. 16 is a schematic block diagrammatical view of the internal structure of the fifth preferred embodiment of the transducer of the present invention, and is similar to FIG. 1 for the first preferred embodiment; no particular front control panel schematic view of this fifth preferred embodiment is shown, since such a view is substantially identical to the FIG. 2 view, which accordingly will suffice for this fifth preferred embodiment also. Again, the transducer of this fifth preferred embodiment of the present invention is of a type which converts an input of AC voltage from about 0 to about 150 volts AC into an output of DC voltage from about 0 to about 5 volts DC. As shown in FIG. 16, the only substantial physical way in which this fifth preferred embodiment of the present invention differs from the first preferred embodiment disclosed above, is that the micro computer 4, in addition to its previously mentioned micro processor, input/output interface, and storage means comprising the illustrated group of registers including the H flag register, the L flag register, the XH flag register, the XL flag register, the PV value register the H set up value register, and the L set up value register, is further internally provided with an Hp flag register and an Lp flag register, which are set when the upper limit value and the lower limit value have been set up, respectively. Apart from this feature, the fifth preferred embodiment of the transducer of the present invention is structured substantially in the same way as the first preferred embodiment of the transducer of the present invention; and hence no particular repetition of the recitation of such structure will be made, in the interests of brevity of description.

Operation of the fifth preferred embodiment

Now, the operational action of this fifth preferred embodiment of the transducer according to the present invention will be explained. The general or overall flow of the operation thereof is substantially the same as that of the first preferred embodiment detailed above, but there are some differences.

Operation of the fifth preferred embodiment in set mode

Figure 17:
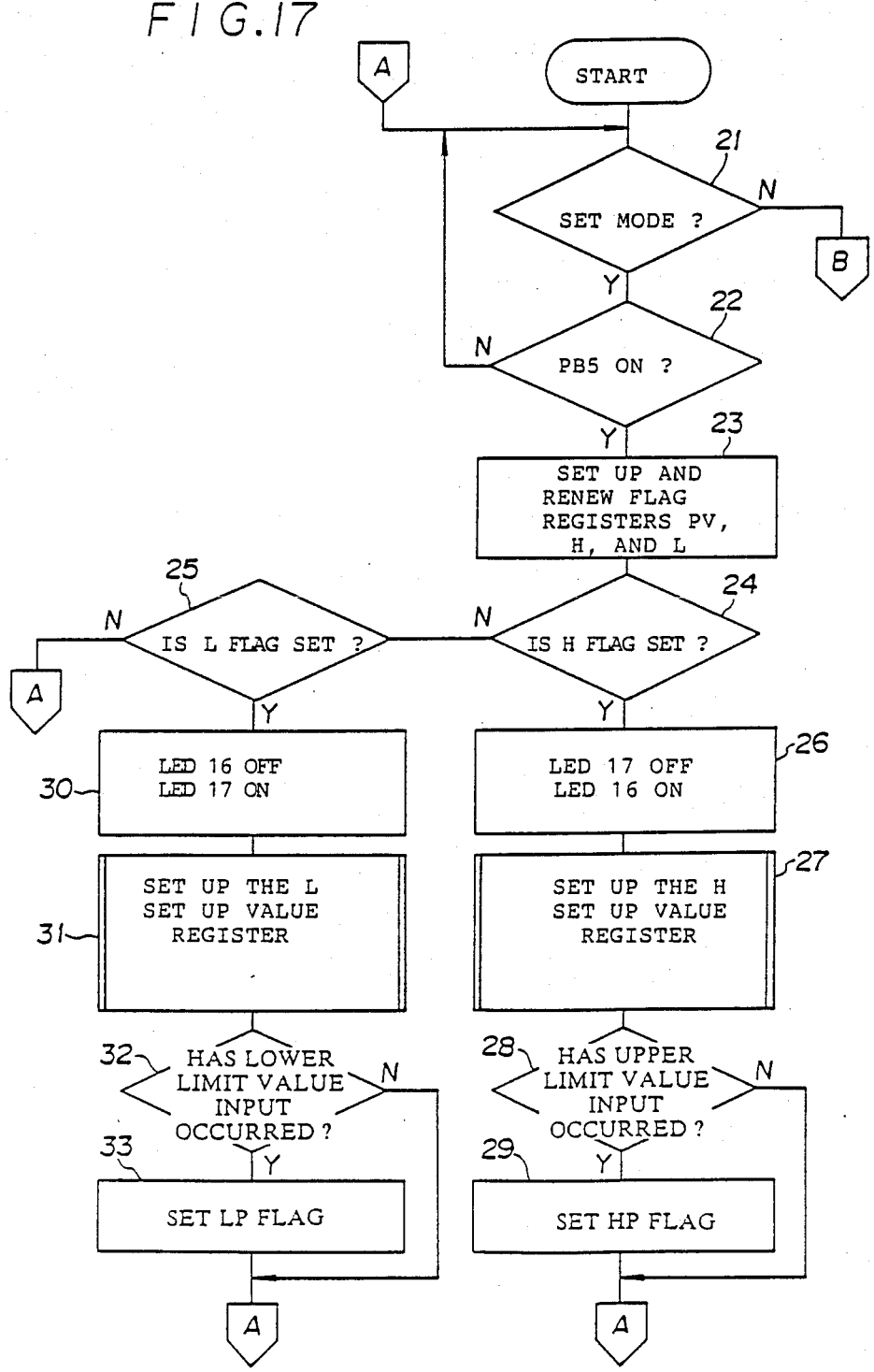
FIG. 17 is a flow chart, similar to the FIG. 3 flow chart for the first preferred embodiment, showing the flow of a program obeyed by a micro computer incorporated in said fifth preferred embodiment of the transducer of the present invention, during a set mode of said program for setting up an upper and a lower limit value.

First, the operation with regard to setting up the upper and the lower value will be detailed, with particular reference to FIG. 17 which is a flow chart which shows the flow of a program obeyed by the micro computer 4 of FIG. 16, during such a program set mode for setting up an upper and a lower limit value.

First, after the START block, in the decision step 21, a decision is made as to whether the current mode is the set mode, or not, as set on the slide switch SL1 of the front panel as shown in FIG. 2 (this slide switch SL1 has a RUN position and a SET position, and can be manually positioned by the operator of the transducer). If the answer to this decision is NO, so that the current mode is not the set mode, then it is deemed that the current mode is now the run mode, and then the flow of control passes next to the tag "B", which leads to the program whose flow chart is detailed in FIGS. 18 and 19, for the run mode. On the other hand, if the answer to this decision is YES, so that the current mode is indeed the set mode, in this case the flow of control passes next to the decision step 22.

In this decision step 22, a decision is made as to whether the push button switch PB5 is currently being depressed by the operator, or not. If the answer to this decision is NO, so that said push button switch PB5 is not currently being depressed, then it is deemed that no set action is currently being initiated by the operator, and then the flow of control passes next back to the step 21 again, to continue to cycle until either the slide switch SL1 of the front panel is moved or the push button switch PB5 is depressed. This is also the point of this program indicated by the tag "A" to which control is transferred from the program described in FIGS. 18 and 19, to be described later. On the other hand, if the answer to this decision is YES, so that the push button switch PB5 is indeed now currently being depressed, then it is deemed that set action for this transducer is currently being required, and in this case the flow of control passes next to the step 23.

In this step 23, at which point it is definitely determined that the push button switch PB5 is being depressed by the operator, the values of the PV flag, of the H flag, and of the L flag are sequentially set up and renewed, and next the flow of control passes to the decision step 24.

In this decision step 24, a decision is made as to whether the H flag is set, or not. If the answer to this decision is NO, so that the H flag is not set, then the flow of control passes next to the decision step 25. On the other hand, if the answer to this decision is YES, so that the H flag is set, then in this case the flow of control passes next to the step 26.

In the decision step 25, at which point it is determined that the H flag is not set, a further decision is made as to whether the L flag is set, or not. If the answer to this decision is NO, so that the L flag is not set, then the flow of control passes next to the tag "A", which is at the top of this program portion, so that the program flow of control cycles around again. On the other hand, if the answer to this decision is YES, so that the L flag is set, then in this case the flow of control passes next to the step 30.

In the step 26, the LED 16 is turned on and the LED 17 is turned off, so as to indicate on the control panel of this transducer that it is the upper limit which is being exceeded (vide FIG. 2), and next the flow of control passes to the step 27. Thereby, an indication of "H" is displayed upon the surface of the control panel.

In this step 27, an upper limit setting up routine is executed. In this routine from this step 27, which is not itself shown herein in detail for this preferred embodiment because various possibilities therefor will be readily apparent to one of ordinary skill in the relevant art based upon the disclosures in this specification, the various digits in the display 6 are set up by the operation of the push button switches PB1 through PB4, for setting up a numerical value, and this upper limit value as thus inputted by the operator of this transducer is stored in the H set up value register, shown in FIG. 16. Next, the flow of control passes to the decision step 28.

In this decision step 28, a decision is made as to whether input of the upper limit value has occurred, or not. If the answer to this decision is NO, so that said upper limit value has not actually been inputted, then the flow of control passes next to the tag "A", bypassing the step 29, and the program cycles around again. On the other hand, if the answer to this decision is YES, so that said upper limit value has indeed been inputted, then in this case the flow of control passes next to the step 29.

In this step 29, the Hp flag is set, so as to indicate that said upper limit value was indeed inputted, and next the flow of control passes to the tag "A", which is at the top of this program, so that the program flow of control cycles around again.

On the other hand, for the "L" side, in the step 30, the LED 16 is turned off and the LED 17 is turned on, so as to indicate on the control panel of this transducer that it is the lower limit which is being exceeded (again, vide FIG. 2), and next the flow of control passes to the step 31. Thereby, an indication of "L" is displayed upon the surface of the control panel.

In this step 31, a lower limit setting up routine is executed. In this routine from this step 29, which again is not itself shown herein in detail because various possibilities therefor will be readily apparent to one of ordinary skill in the relevant art based upon the disclosures in this specification, the various digits in the display 6 are set up by the operation of the push button switches PB1 through PB4, for setting up a numerical value, in substantially the same manner as was done in the step 27 for the higher limit value, and this lower limit value as thus inputted by the operator of this transducer is stored in the L set up value register, shown in FIG. 16. Next, the flow of control passes to the decision step 32.

In this decision step 32, a decision is made as to whether input of the lower limit value has occurred, or not. If the answer to this decision is NO, so that said lower limit value has not actually been inputted, then the flow of control passes next to the tag "A", bypassing the step 32, and the program cycles around again. On the other hand, if the answer to this decision is YES, so that said lower limit value has indeed been inputted, then in this case the flow of control passes next to the step 32.

In this step 32, the Lp flag is set, so as to indicate that said lower limit value was indeed inputted, and next the flow of control passes to the tag "A", which is at the top of this program, so that the program flow of control cycles around again.

Figure 18:
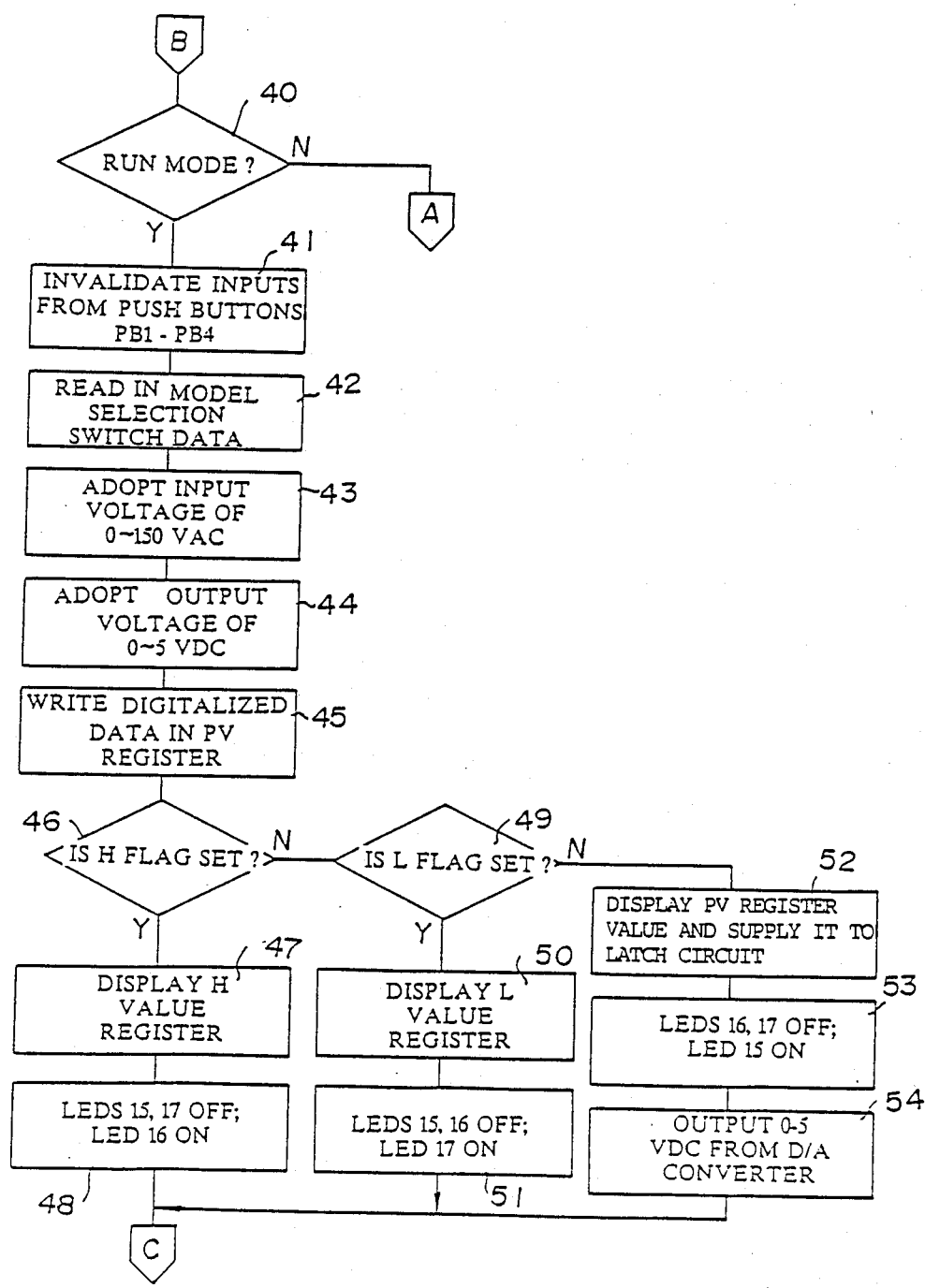
FIG. 18 is another flow chart, similar to a part of the FIG. 4 flow chart for the first preferred embodiment, similarly showing a part of the flow of said program obeyed by said micro computer incorporated in said fifth preferred embodiment of the transducer of the present invention, this time during a run mode of said program.
Figure 19:
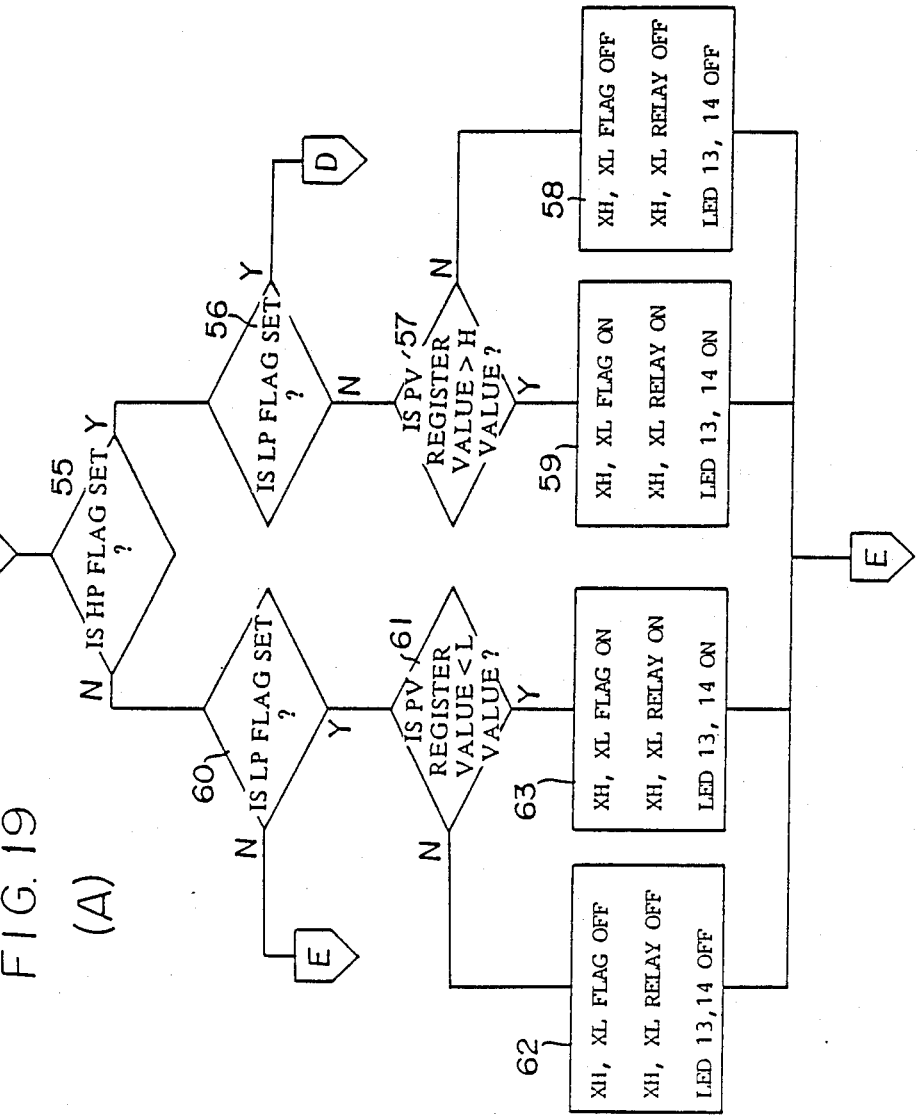
FIG. 19 is another flow chart, broken into two portions in FIGS. 19(a) and 19(b) for the convenience of layout, with part of it similar to another part of the FIG. 4 flow chart for the first preferred embodiment, and similarly showing another part of the flow of said program obeyed by said micro computer incorporated in said fifth preferred embodiment of the transducer of the present invention, again during said run mode of said program.
Figure 19:
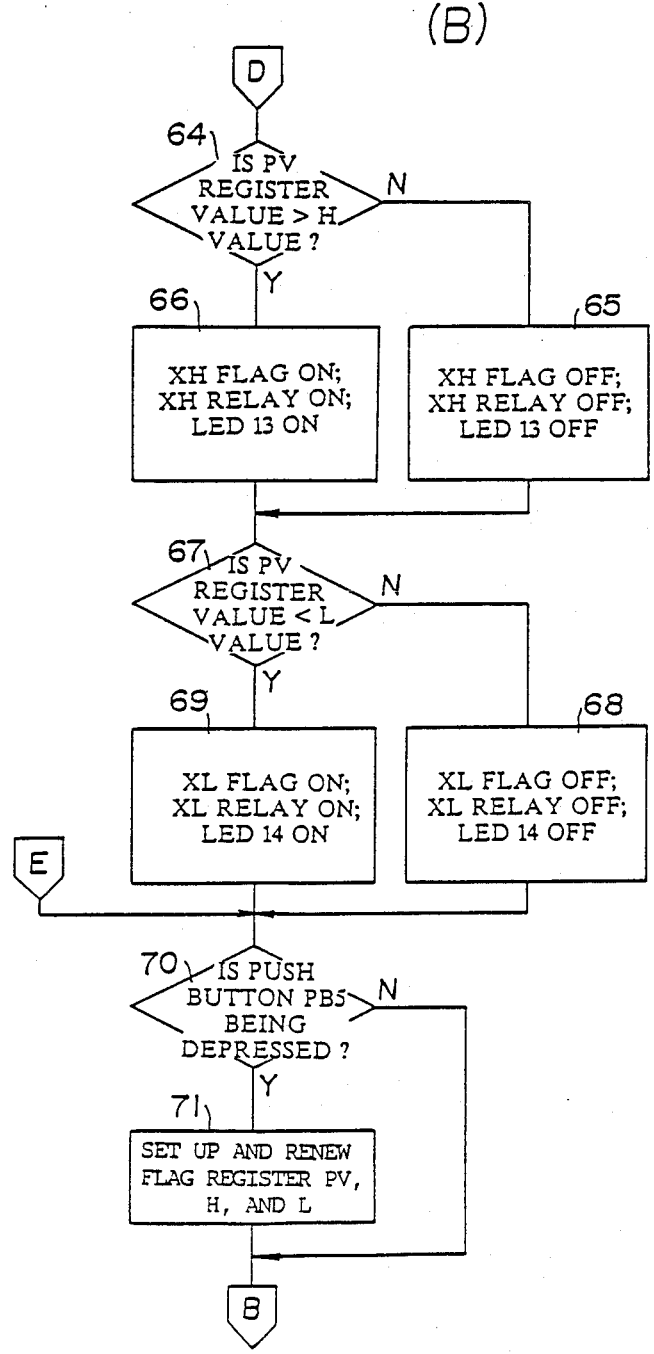

Thereby, as a whole, the process of setting up the upper and the lower limit values is completed, and also the corresponding Hp and Lp flags are set to indicate just what actually was inputted, and finally the operator slides the slide switch SL1 over to its position denoting run operation, and the program flow passes to the tag "B" of FIGS. 18 and 19.

Operation of the fifth preferred embodiment—run mode

Next, the operation of this fifth preferred embodiment of the transducer of the present invention with regard to actual running will be detailed, with particular reference to FIGS. 18 and 19 which altogether make up a flow chart which shows the flow of a program obeyed by the micro computer 4 of FIG. 16, during such a program run mode. It should be noted that the flow chart of FIG. 19 is broken into two portions denotes as 19(a) and 19(b) for the convenience of layout, with the tags "D" and "E" joining said two flow chart portions 19(a) and 19(b) in the logical sense.

Upon completion of the set up stage detailed above, so that a lower limit value and/or an upper limit value have been set up by the operator of this transducer, and also the flags Hp and/or Lp have been appropriately set, said operator then switches over the slide switch SL1 to the run mode. The micro computer 4 checks to ascertain the position of this slide switch SL1 in the step 21, and also in the decision step 40 of this program portion, to which control is passed from the tag "B" at which point the flow of control enters this program portion. In other words, in this decision step 40, a decision is made as to whether the position of the slide switch SL1 indicates running operation, or not. If the answer to this decision is NO, so that the current mode is not the run mode, then it is deemed that the current mode is now the set mode, and then the flow of control passes next to the tag "A", which leads to the program whose flow chart is detailed in FIG. 17 and has been explained above, for the set mode. On the other hand, if the answer to this decision is YES, so that the current mode is indeed the run mode, in this case the flow of control passes next to the step 41.

In this step 41, further input to the push button switches PB1 through PB4 is invalidated, and next the flow of control passes to the step 42.

In this step 42, the data set on the model selection switch 5 is read in to the micro computer 4, and next the flow of control passes to the steps 33 and 34; again, these following steps shown here are exemplary, in the exemplary case that these data on the model selection switch 5 should indicate that the operation required from this transducer is the conversion of a 0 to 150 VAC voltage into a 0 to 5 VDC voltge. In this step 43, then, an input voltage of from approximately 0 to approximately 150 volts of AC is adopted, and next the flow of control passes to the step 44. And, in this step 44, an output voltage of from approximately 0 to approximately 5 volts of DC is adopted, and next the flow of control passes to the step 45. Thus, the input voltage supplied from outside to the input terminals 1a and 1b is rectified and is voltage divided by the input buffer 2, and the output of this input buffer 2 is supplied to the A/D converter 3.

In this step 45, while thus the output of this input buffer 2 is supplied to the A/D converter 3, sampling pulses of a certain frequency are supplied from the micro computer 4 to said A/D converter 3, and the digitalized data is written into the PV value register in the memory of said micro computer 4; and next the flow of control passes to the decision step 46.

In this decision step 46, a decision is made as to whether the H flag register is currently set, or not. If the answer to this decision is NO, so that the H flag register is not currently set, then it is deemed that the higher limit value is not currently being exceeded, and then the flow of control passes next to the decision step 49, so as to check for whether or not the lower limit value is currently being exceeded. On the other hand, if the answer to this decision is YES, so that the H flag register is currently set, then it is deemed that the higher limit value is currently being exceeded, and in this case the flow of control passes next to the step 47.

In this step 47, the upper limit value, already stored in the H set up value register during the set portion of the program of the micro computer 4, is displayed upon the display 6 of the front panel of the transducer, and next the flow of control passes to the step 48. And, in this step 48, the LEDs 15 and 17 are turned off, and the LED 16 is turned on, thus to indicate that the high set value limit has been exceeded, and next the flow of control passes to the tag "C", to transit in the next portion 4(b) of this FIGS. 18 and 19 program portion.

On the other hand, in the decision step 49, a decision is made as to whether the L flag register is currently set, or not. If the answer to this decision is NO, so that the L flag register is not currently set, then it is deemed that the lower limit value is not currently being exceeded (either), and then the flow of control passes next to the step 52. On the other hand, if the answer to this decision is YES, so that the L flag register is currently set, then it is deemed that the lower limit value is currently being exceeded, and in this case the flow of control passes next to the step 50.

In this step 50, like in the step 48, the lower limit value already stored in the L set up value register during the set portion of the program of the micro computer 4, is displayed upon the display 6 of the front panel of the transducer, and next the flow of control passes to the step 51. And, in this step 51, the LEDs 15 and 16 are turned off, and the LED 17 is turned on, thus to indicate that the low set value limit has been exceeded, and next as before the flow of control passes to the tag "C", to transit to the next portion 4(b) of this FIGS. 18 and 19 program portion.

On the other hand, if in the decision steps 36 and 38 it has been determined that neither the H flag nor the L flag have been set, then the flow of program control passes to the step 52. In this step 52, the current value in the PV register, which was inputted thereinto in the step 45, is displayed on the display 6, and is also fed to the latch circuit 7 so as to be temporarily retained therein; and next the flow of control passes to the step 53.

In this step 53, the LEDs 16 and 17 are turned off and the LED 15 is turned on, thus to indicate that the current value is being displayed; and next the flow of control passes to the step 54.

In this step 54, a DC voltage between about 0 and about 5 volts DC correspponding to the input voltage is produced from the A/D converter 8 and is outputted to the outside from the output terminals 9a and 9b; and next the flow of control passes to the tag "C", to transit to the next portion 19(a) of this FIGS. 18 and 19 program portion.

Control is passed from the tag "C" at which point the flow of control enters the first program portion 19(a) of this second FIGS. 18 and 19 program portion, to the decision step 55.

In this decision step 55, a decision is made as to whether the Hp flag is set, or not. If the answer to this decision is NO, so that the Hp flag is not set and thus no input of the upper limit value occurred in the FIG. 17 set mode operational phase, then the flow of control passes next to the decision step 60. On the other hand, if the answer to this decision is YES, so that the Hp flag is set and thus in fact input of the upper limit value did indeed occur in the FIG. 17 set mode operational phase, then in this case the flow of control passes next to the decision step 56.

In this decision step 56, a decision is made as to whether the Lp flag is set, or not. If the answer to this decision is NO, so that the Lp flag is not set and thus no input of the lower limit value occurred in the FIG. 17 set mode operational phase, then the flow of control passes next to the decision step 57. On the other hand, if the answer to this decision is YES, so that the Hp flag is set and thus in fact input of the lower limit value did indeed occur in the FIG. 17 set mode operational phase as well as input of the upper limit value, then in this case the flow of control passes next via the tag "D" to the decision step 64 of the second program portion 19(b) of this FIG. 19.

On the other hand, in the alternative case that control is passed to the decision step 57, a decision is made as to whether the current value in the PV register is greater than the value set in the H value register, or not. If the answer to this decision is NO, so that the current PV register value has not exceeded the upper limit therefor, then the flow of control passes next to the step 58. On the other hand, if the answer to this decision is YES, so that the current PV register value has indeed in fact exceeded the upper limit therefor, then in this case the flow of control passes next to the step 59.

In the step 59, to which control is thus passed if the upper limit value has in fact been exceeded, both the XH flag and also the XL flag are set, both the XH relay and also the XL relay are turned on, and the LEDs 13 and 14 are both turned on, thus to indicate that the upper limit value has been exceeded; and next the flow of control passes via the tag "E" to the decision step 70 of the second program portion 19(b) of this FIG. 19. On the other hand, in the step 58, to which control is thus passed if the upper limit value has not in fact been exceeded, both the XH flag and also the XL flag are unset (i.e., set off), both the XH relay and also the XL relay are turned off, and the LEDs 13 and 14 are both turned off, thus to indicate that the upper limit value has not in fact been exceeded; and next as before the flow of control passes via the tag "E" to the decision step 70 of the second program portion 19(b) of this FIG. 19.

If the decision of the decision step 55 goes the other way, then, in the decision step 60, a decision is made as to whether the Lp flag is set, or not. If the answer to this decision is NO, so that the Lp flag is not set and thus no input of the lower limit value occurred in the FIG. 17 set mode operational phase or input of the upper limit value either, then in this case the flow of control passes next via the tag "E" to the decision step 70 of the second program portion 19(b) of this FIG. 19. On the other hand, if the answer to this decision is YES, so that the Hp flag is set and thus in fact input of the lower limit value did indeed occur in the FIG. 17 set mode operational phase, then the flow of control passes next to the decision step 61.

In this decision step 61, a decision is made as to whether the current value in the PV register is less than the value set in the L value register, or not. If the answer to this decision is NO, so that the current PV register value has not dropped below the lower limit therefor, then the flow of control passes next to the step 62. On the other hand, if the answer to this decision is YES, so that the current PV register value has indeed in fact dropped below the lower limit therefor, then in this case the flow of control passes next to the step 63.

In the step 63, to which control is thus passed if the lower limit value has in fact been dropped below, both the XH flag and also the XL flag are set, both the XH relay and also the XL relay are turned on, and both the LEDs 13 and 14 are turned on, thus to indicate that the lower limit value has been exceeded; and next the flow of control as before passes via the tag "E" to the decision step 70 of the second program portion 19(b) of this FIG. 19. On the other hand, in the step 62, to which control is thus passed if the lower limit value has not in fact been exceeded, both the XH flag and also the XL flag are unset (i.e., set off), both the XH relay and also the XL relay are turned off, and both the LEDs 13 and 14 are turned off, thus to indicate that the lower limit value has not in fact been exceeded; and next as before the flow of control passes via the tag "E" to the decision step 70 of the second program portion 19(b) of this FIG. 19.

Control is passed from the tag "D" at which point the flow of control enters the second program portion 19(b) of this second FIGS. 18 and 19 program portion, to the decision step 64. In this decision step 64, a decision is made as to whether the current value in the PV register is greater than the value set in the H value register, or not. If the answer to this decision is NO, so that the current PV register value has not exceeded the upper limit therefor, then the flow of control passes next to the step 65. On the other hand, if the answer to this decision is YES, so that the current PV register value has indeed in fact exceeded the upper limit therefor, then in this case the flow of control passes next to the step 66.

In the step 66, to which control is thus passed if the upper limit value has in fact been exceeded, the XH flag is set, the XH relay is turned on, and the LED 13 is turned on, thus to indicate that the upper limit value has been exceeded; and next the flow of control passes to the decision step 67. On the other hand, in the step 65, to which control is thus passed if the upper limit value has not in fact been exceeded, the XH flag is unset (i.e. set off), the XH relay is turned off, and the LED 13 is turned off, thus to indicate that the upper limit value has not in fact been exceeded; and next as before the flow of control passes to the decision step 67.

In this decision step 67, a decision is made as to whether the current value in the PV register is less than the value set in the L value register, or not. If the answer to this decision is NO, so that the current PV register value has not dropped below the lower limit therefor, then the flow of control passes next to the step 68. On the other hand, if the answer to this decision is YES, so that the current PV register value has indeed in fact dropped below the lower limit therefor, then in this case the flow of control passes next to the step 69.

In the step 69, to which control is thus passed if the lower limit value has in fact been dropped below, the XL flag is set, the XL relay is turned on, and the LED 14 is turned on, thus to indicate that the lower limit value has been dropped below; and next the flow of control passes to the decision step 70. On the other hand, in the step 68, to which control is thus passed if the lower limit value has not in fact been dropped below, the XL flag is unset (i.e., set off), the XL relay is turned off, and the LED 14 is turned off, thus to indicate that the lower limit value has not in fact been dropped below; and next as before the flow of control passes to the decision step 70.

In this decision step 70, a decision is made as to whether the push button switch PB5 is currently being pressed by the operator of this transducer, or not. If the answer to this decision is NO, so that the push button switch PB5 is not currently being depressed, then the flow of control passes next to the tag "B", to transmit back to the FIG. 18 program portion, to repeat the program flow explained above without further ado. On the other hand, if the answer to this decision is YES, so that the push button switch PB5 is in fact currently being depressed, then in this case the flow of control passes next to the step 71.

In this step 71, at which point it is definitely determined that the push button switch PB5 is being depressed by the operator, the values of the PV flag, of the H flag, and of the L flag are sequentially set up and renewed, and next as above the flow of control passes to the tag "B", to transit back to the FIG. 18 program portion, to repeat the program flow explained above.

Thus, according to the construction and operation of the fifth preferred embodiment of the transducer of the present invention as explained above, it is seen that it is possible to display the input voltage at the same time as obtaining a linearized DC output which corresponds to said input voltage, and to provide a transducer which has the function of a meter relay to set up the upper and lower limits of the input with a pair of set up registers, and to produce a certain output when these limits are exceeded. And, further, in the case of only one of the upper limit value and the lower limit value being set up, then both of the two relays XH and XL are simultaneously activated and deactivated, whereby the power control capacity of this transducer is enhanced, and the control of a second independent circuit thereby is made possible.

The sixth preferred embodiment

Figure 20:
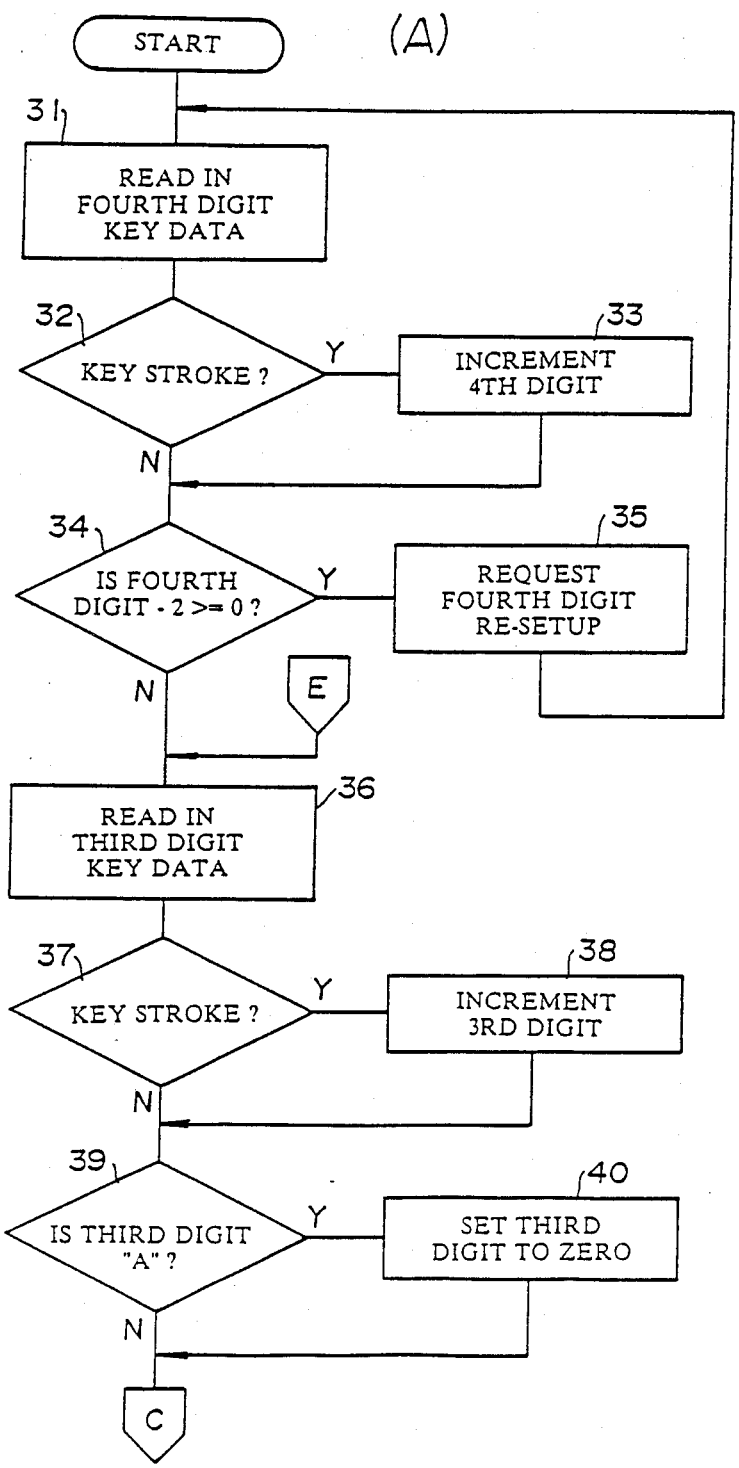
FIG. 20 is another flow chart, broken into three portions in FIGS. 20(a), 20(b), and 20(c) for the convenience of layout, showing the flow of a subprogram for data input, obeyed by a micro computer incorporated in a sixth preferred embodiment of the transducer of the present invention during a set mode of said program.
Figure 20:
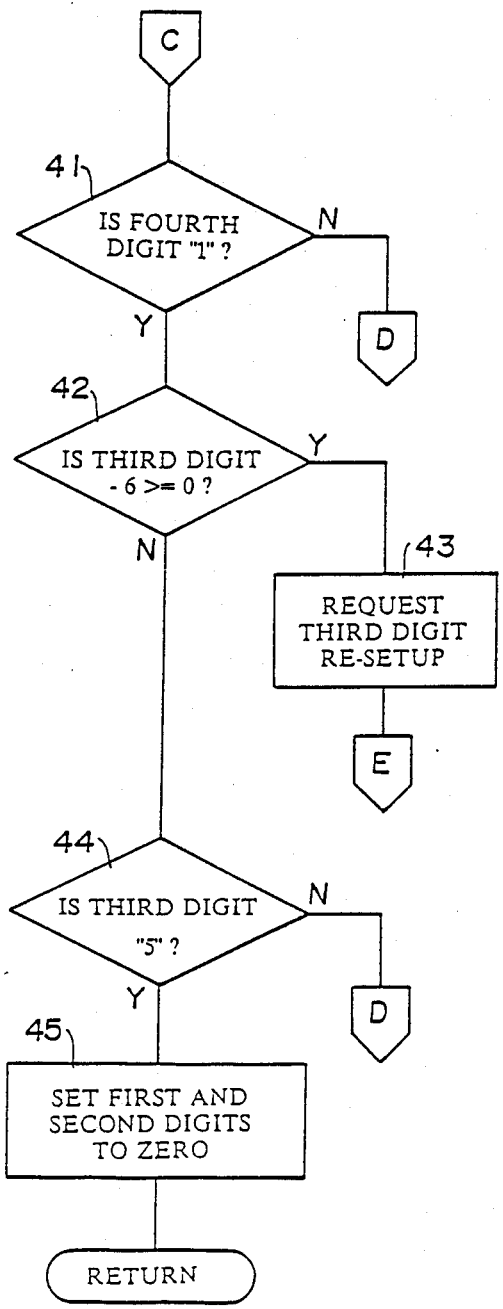
Figure 20:
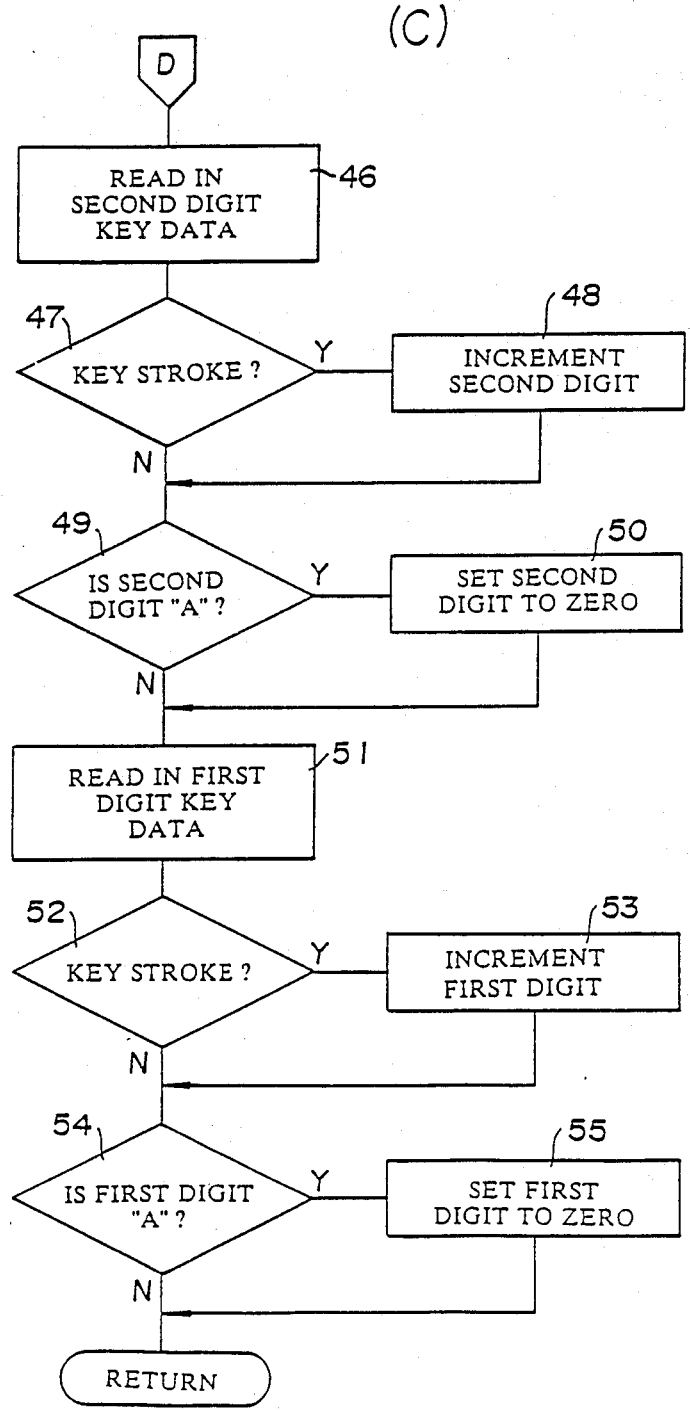

The sixth preferred embodiment of the transducer of the present invention will now be shown and described with the aid of FIG. 20, in a similar manner to what was done above with relation to the previous preferred embodiments.

Structure of the sixth preferred embodiment

The schematic block diagrammatical view of the internal structure of the first preferred embodiment of the transducer of the present invention, shown in FIG. 1, and the front control panel schematic view which was shown in FIG. 2, both can be applied to this sixth preferred embodiment, also; and hence no particular repetition thereof will be made, in the interests of brevity of description. Thus, in its more gross physical aspects, the sixth preferred embodiment of the transducer of the present invention is structured substantially in the same way as the first preferred embodiment of the transducer of the present invention, only differing with regard to the nature of the program which is obeyed by the micro computer 4 incorporated in it (i.e, in the nature of the fine structure of the ROM memory or the like of said micro computer 4 which determines its operational action); and hence no particular repetition of the recitation of such gross physical structure will be made, in the interests of brevity of description.

Operation of the sixth preferred embodiment

Now, the operational action of this sixth preferred embodiment of the transducer according to the present invention will be explained. The general or overall flow of the operation thereof is substantially the same as that of the first preferred embodiment detailed above, but there are some detail differences with regard to the set mode, which particularly characterize this sixth preferred embodiment.

Operation of the sixth preferred embodiment in run mode

There are no substantial differences from the first preferred embodiment as detalied above, and hence no particular repetition thereof will be made, in the interests of brevity of description. And, particularly, the flow chart shown in FIG. 4 applies exactly, including its tags "A" and "B".

Operation of the sixth preferred embodiment-set mode

Figure 3:
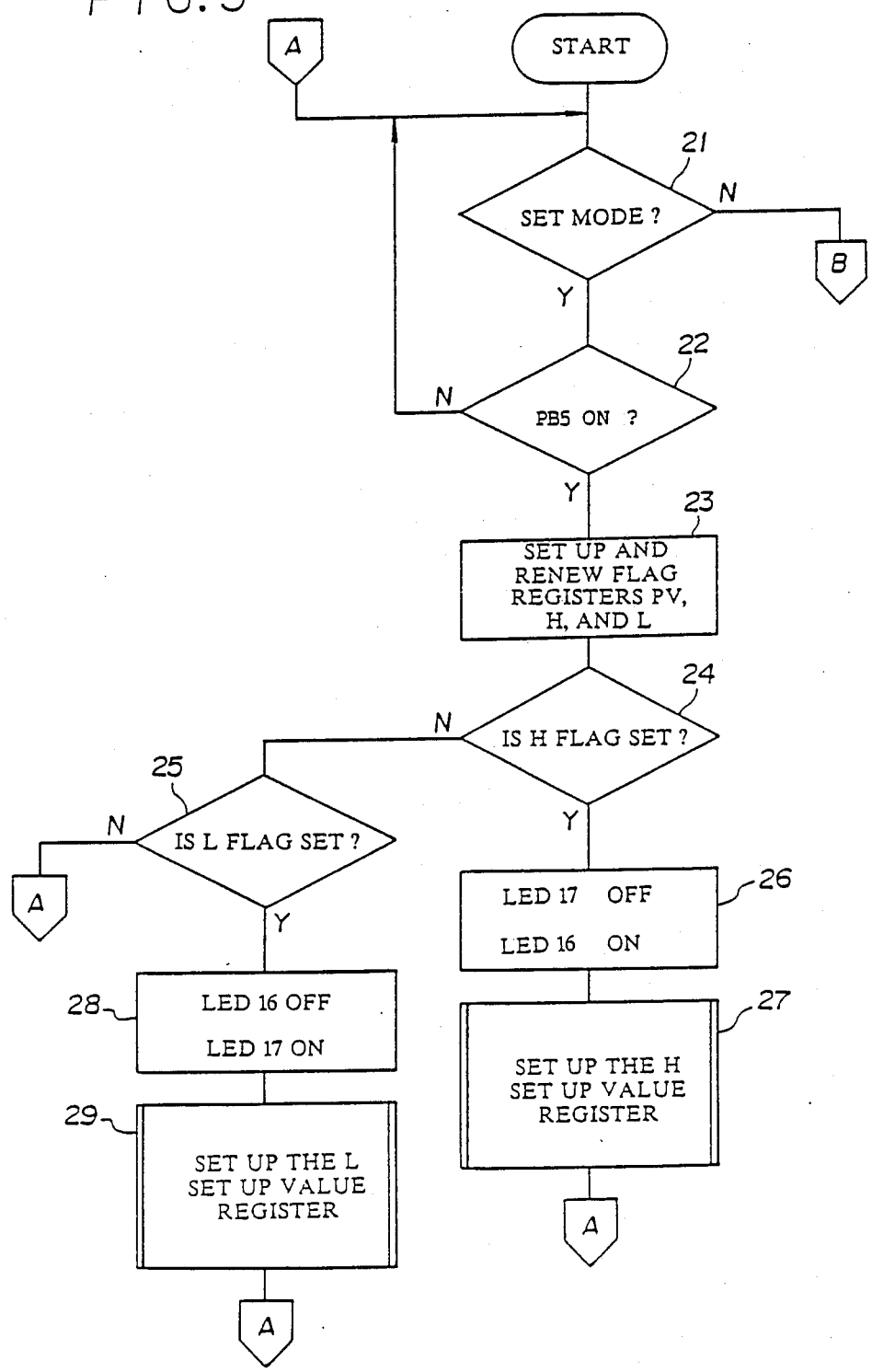
FIG. 3 is a flow chart, showing the flow of a program obeyed by a micro computer incorporated in said first preferred embodiment of the transducer of the present invention, during a set mode of said program for setting up an upper and a lower limit value.

Further, the overall flow of the operation of this sixth preferred embodiment of the transducer of the present invention with regard to setting operation will not be particulary detailed, since the flow chart of FIG. 3 which shows the flow of the program obeyed by the micro computer 4 of FIG. 1 during such a program set mode is applicable to this sixth preferred embodiment also. However, the internal details of the processes of inputting the upper and the lower limit value, shown only as the blocks 27 and 29 in FIG. 3, which are the particular characterizing features of this sixth preferred embodiment, are shown in detail in the flow chart of FIG. 20. It should be noted that the flow chart of FIG. 20 is broken into three portions denoted as 20(*a*), 20(*b*) and 20(*c*) for the convenience of layout, with the tag "C" joining the first portion 20(*a*) of said flow chart portions to the second such portion 20(*b*) in the logical sense, and similarly the tags "D" and "E" joining the second 20(*b*) of said flow chart portions to the third such portion 20(*c*).

Since the exemplary version of this sixth preferred embodiment transducer is adapted to convert an input voltage of from approximately 0 to approximately 150 volts of AC into an output voltage of from approximately 0 to approximately 5 volts of DC, it is appropriate, as an example, to detail the case in which the upper allowable limit for the upper and the lower limt values to be inputted during the steps 27 and 29 of FIG. 3 is a digital value of "150", while the lower allowable limit for said upper and lower limit values is a digital value of "0". In other words, the subroutine of this FIG. 20 is for performing this particular limitation of the inputted value.

After the START block in the first portion 20(*a*) of this FIG. 20 program portion, then, in the step 31, the key data for the fourth digit of the upper or the lower limit value is read in, and next the flow of control passes to the decision step 32.

In this decision step 32, a decision is made as to whether a key stroke has occured, or not. If the answer to this decision is NO, so that no key stroke has occurred, then the flow of control passes next directly to the decision step 34, thus skipping the step 33. On the other hand, if the answer to this decision is YES, so that a further key stroke has occurred, then in this case the flow of control passes next to the step 33.

In this step 33, the fourth digit value is incremented, and next the flow of control passes to the decision step 34.

In this decision step 34, a decision is made as to whether the current value of the fourth digit, minus 2, is greater than or equal to zero, or not. If the answer to this decision is YES, so that the fourth digit is currently greater than or equal to "2", then it is deemed that an error has occurred, and then the flow of control passes next to the step 35. On the other hand, if the answer to this decision is NO, so that the fourth digit is currently "1" or "0", then it is deemed that this input is acceptable, and in this case the flow of control passes next to the step 36.

In the step 35, a procedure is performed to request the re-set up of the fourth digit, since the value currently held thereby is unacceptable. This procedure may be, for example, performed by flashing the display, or by flashing only the fourth digit of the display. And next the flow of control passes back to the step 31 again so as to read in this new value for the fourth digit.

On the other hand, in the step 36, the key data for the third digit of the upper or the lower limit value is read in, and next the flow of control passes to the decision step 37.

In this decision step 37, a decision is made as to whether a key stroke has occurred, or not. If the answer to this decision is NO, so that no key stroke has occurred, then the flow of control passes next directly to the decision step 39, thus skipping the step 38. On the other hand, if the answer to this decision is YES, so that a further key stroke has occurred, then in this case the flow of control passes next to the step 38.

In this step 38, the third digit value is incremented, and next the flow of control passes to the decision step 39.

In this decision step 39, a decision is made as to whether the current value of the third digit is equal to "A" (hexadecimal 10), or not. If the answer to this decision is NO, so that the third digit is currently less than hexadecimal "10", then it is deemed that this input is acceptable, and in this case the flow of control passes next to the tag "C", thence to transit to the second portion 20(*b*) of this FIG. 20 subprogram portion. On the other hand, if the answer to this decision is YES, so that the third digit is currently hexademical "10", then the flow of control passes next to the step 40. And in this step 40 the value of the third digit is set to "0", and next as before the flow of control passes next to the tag "C", thence to transit to the second portion 20(*b*) of this FIG. 20 subprogram portion.

In the decision step 41 to which this tag "C" leads in said second program portion 20(*b*), a decision is made as to whether the current value of the fourth digit is equal to "1", or not. If the answer to this decision is NO, so that the fourth digit is currently equal to "0", then it is deemed that no checking for the third digit is required, and then the flow of control passes next via the tag "D" to the third portion 20(*c*) of this FIG. 20 subprogram portion. On the other hand, if the answer to this decision is YES, so that the fourth digit is currently "1", then it is deemed that some checking for the third digit is required (to verify that said third digit is not "6" or greater), and in this case the flow of control passes next to the decision step 42.

In this decision step 42, a decision is made as to whether the current value of the third digit, minus 6, is greater than or equal to zero, or not. If the answer to this decision is YES, so that the third digit is currently greater than or equal to "6", then it is deemed that an error has occurred, and then the flow of control passes next to the step 43. On the other hand, if the answer to this decision is NO, so that the third digit is currently one of "0" through "5", then it is deemed that this input is acceptable, and in this case the flow of control passes next to the decision step 44.

In the step 43, a procedure is performed to request the re-set up of the third digit, since the value currently held thereby is unacceptable. This procedure may be, for example, performed by flashing the display, or by flashing only the third digit of the display. And next the flow of control passes back via the tag "E" to the step 36 again, so a to read in a new value for the third digit.

In the decision step 44, a decision is made as to whether the current value of the third digit is equal to "5", or not. If the answer to this decision is YES, so that the third digit is currently equal to "5", then is it deemed that the second and first digits should be constrained to be "0", and then the flow of control passes next to the step 45. On the other hand, if the answer to this decision is NO, so that the third digit is currently one of "0" through "4", then it is deemed that no particular such constraint for the second and the first digit is required, and in this case the flow of control passes next to the tag "C", thence to transit to the third position 20(*c*) of this FIG. 20 subprogram portion. And, in the step 45, the second digit is set to "0" and also the first digit is set to "0", and next the flow of control passes to return from this routine, since all of the fourth through the first digits have now been determined.

In the step 46 to which this tag "D" leads in said third program portion 20(c), the key data for the second digit of the upper or the lower limit value is read in, and next the flow of control passes to the decision step 47.

In this decision step 47, a decision is made as to whether a key stroke has occurred, or not. If the answer to this decision is NO, so that no key stroke has occurred, then the flow of control passes next directly to the decision step 49, thus skipping the step 48. On the other hand, if the answer to this decision is YES, so that a further key stroke has occured, then in this case the flow of control passes next to the step 48.

In this step 48, the second digit value is incremented, and next the flow of control passes to the decision step 49.

In this decision step 49, a decision is made as to whether the current value of the second digit is equal to "A" (hexadecimal 10), or not. If the answer to this decision is NO, so that the second digit is currently less than hexadecimal "10", then it is deemed that this input is acceptable, and in this case the flow of control passes next to the step 51. On the other hand, if the answer to this decision is YES, so that the second digit is currently hexadecimal "10", then the flow of control passes next to the step 50. And in this step 50 the value of the second digit is set to "0", and next the flow of control passes to the step 51.

In this step 51, the key data for the first digit of the upper or the lower limit value is read in, and next the flow of control passes to the decision step 52.

In this decision step 52, a decision is made as to whether a key stroke has occurred, or not. If the answer to this decisions is NO, so that no key stroke has occurred, then the flow of control passes next directly to the decision step 54, thus skipping the step 53. On the other hand, if the answer to this decision is YES, so that a further key stroke has occurred, then in this case the flow of control passes next to the step 53.

In this step 53, the first digital value is incremented, and next the flow of control passes to the decision step 54.

In this decision step 54, a decision is made as to whether the current value of the first digit is equal to "A" (hexadecimal 10), or not. If the answer to this decision is NO, so that the first digit is currently less than hexadecimal "10", then it is deemed that this input is acceptable, and in this case the flow of control passes next to return from this routine, since all of the fourth through the first digits have now been determined. On the other hand, if the answer to this decision is YES, so that the first digit is currently hexadecimal "10", then the flow of control passes next to the step 55. And in this step 50 the value of the first digit is set to "0", and next the flow of control passes to return from this routine, since similarly all of the fourth through the first digits have now been determined.

Thus, it is seen that, according to the construction and operation of this sixth preferred embodiment of the transducer of the present invention as explained above, it it is possible to display the input voltage at the same time as obtaining a linearized DC output which corresponds to said input voltage, and to provide a transducer which has the function of a meter relay to set up the upper and the lower limits of the input with a pair of set up registers, and to produce a certain output when these limits are exceeded. And, further, when inputting the values for the upper limit value and the lower limit value, if any erroneous entry is made that is outside the prescribed limits for the input voltage, an error indication is presented to the user, so that he or she may correct the error and may input a new valid entry. Accordingly, mistaken operation is effectively prevented.

Although, according to this shown sixth preferred embodiment of the transducer of the present invention as explained above, the outputting of the error indication to the user was performed immediately upon inputting of a digit that was inappropriate, in another possible construction it would be possible to only issue such an error indication after the data was fully inputted. Such a modification should be considered as being within the scope of the above described specialized inventive concept.

The seventh preferred embodiment

Figure 21A:
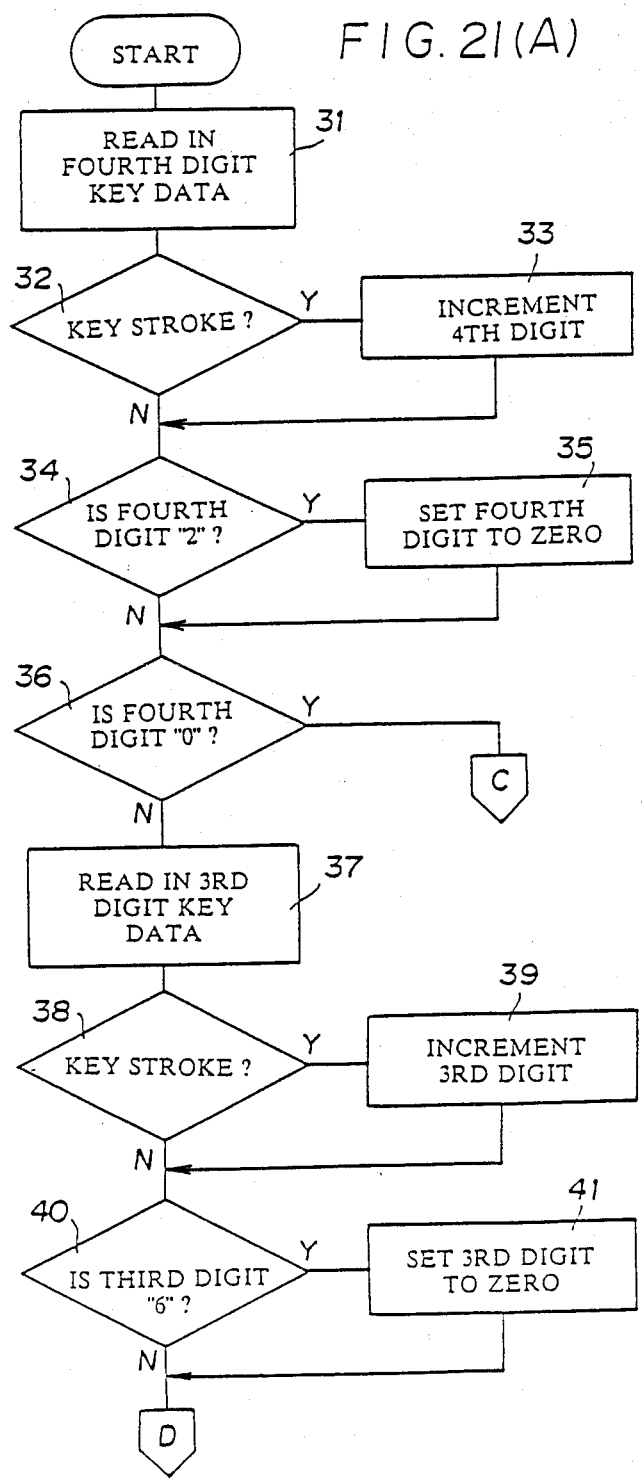
FIG. 21 is another flow chart, similar to FIG. 20 for the sixth preferred embodiment, broken into three portions in FIGS. 21(a), 21(b), and 21(c) for the convenience of layout, showing the flow of a subprogram for data input, obeyed by a micro computer incorporated in a seventh preferred embodiment of the transducer of the present invention during a set mode of said program.
Figure 21:
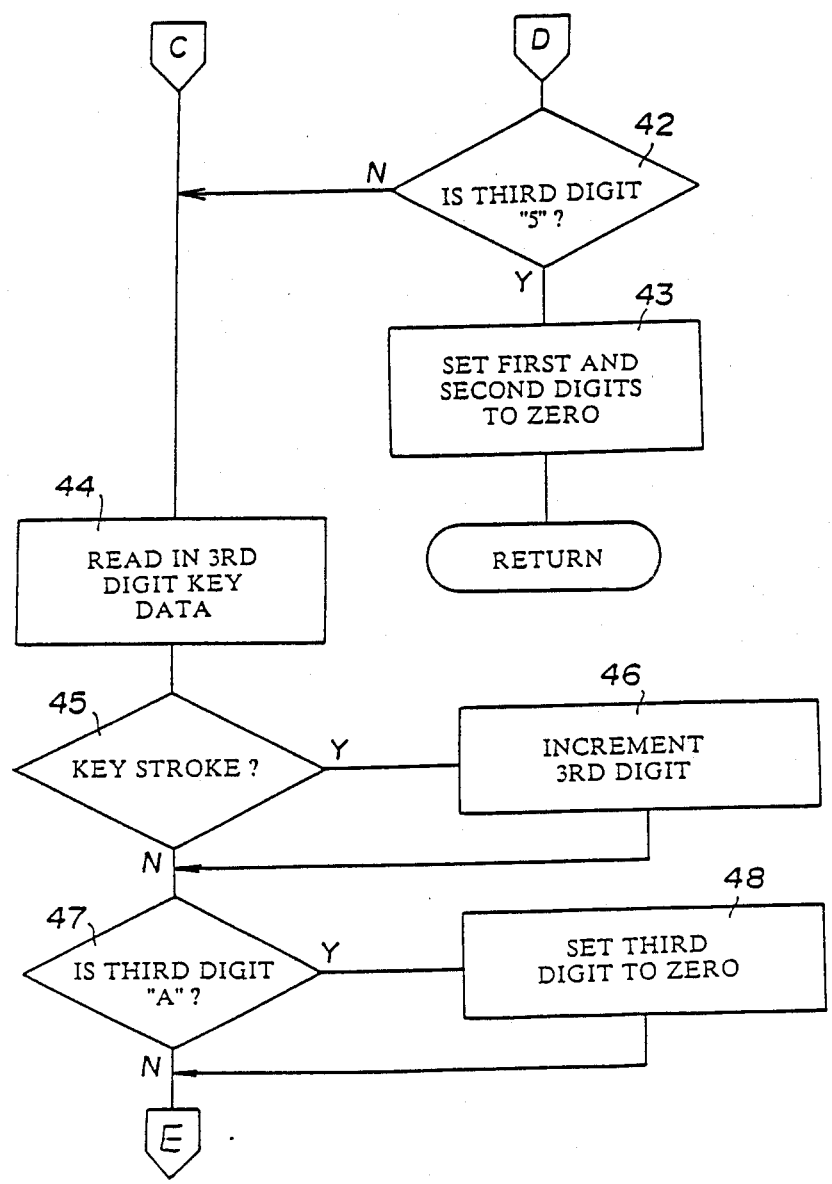
Figure 21C:
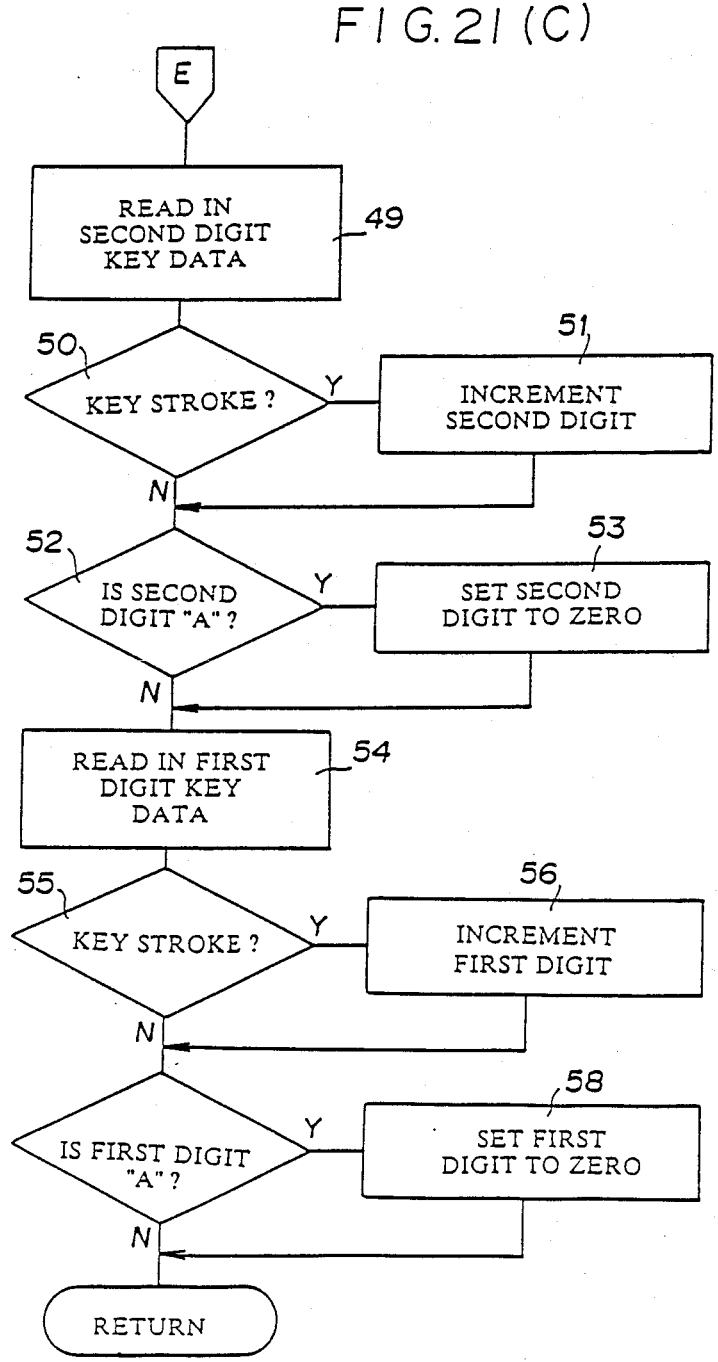

The seventh preferred embodiment of the transducer of the present invention will now be shown and described with the aid of FIG. 21, in a similar manner to what was done above with relation to the previous preferred embodiments.

Structure of the seventh preferred embodiment

The schematic block diagrammatical view of the internal structure of the first preferred embodiment of the transducer to the present invention, shown in FIG. 1, and the front control panel schematic view which was shown in FIG. 2, both can be applied to the seventh preferred embodiment, also; and hence no particular repetition thereof will be made, in the interests of brevity of description. Thus, in its more gross physical aspects, like the sixth preferred embodiment described proximately above, the seventh preferred embodiment of the transducer of the present invention is structured substantially in the same way as the first preferred embodiment of the transducer of the present invention, again only differing with regard to the nature of the program which is obeyed by the micro computer 4 incorporated in it (i.e., in the nature of the fine structure of the ROM memory or the like of said micro computer 4 which determines its operational action); and hence no particular repetition of the recitation of such gross physical structure will be made, in the interests of brevity of description.

Operation of the seventh preferred embodiment

Now, the operational action of this seventh preferred embodiment of the transducer according to the present invention will be explained. As with the sixth preferred embodiment, the general or overall flow of the operation thereof is substantially the same as that of the first preferred embodiment detailed above, but there are some detail differences with regard to the set mode, which particularly characterize this seventh preferred embodiment. Thus, in the case of the Operation of the seventh preferred embodment in run mode There are no substantial differences from the first preferred embodiment or the sixth preferred embodiment as detailed above, and hence no particular repetition thereof will be made, in the interests of brevity of description. And, particularly, the flow chart in FIG. 4 applies exactly, including its tags "A" and "B".

Operation of the seventh preferred embodiment-set mode

Further, the overall flow of the operation of this seventh preferred embodiment of the transducer of the present invention with regard to setting operation will not be particularly detailed, since the flow chart of FIG. 3 which shows the flow of the program obeyed by the micro computer 4 of FIG. 1 during such a program set mode is applicable to this seventh preferred embodiment also. However, the internal details of the processes of inputting the upper and the lower limit value, shown only as the blocks 27 and 29 in FIG. 3, which are the particular characterizing features of this seventh preferred embodiment, are shown in detail in the flow chart of FIG. 21. It should be noted that the flow chart of FIG. 21 is broken into three portions denoted as 21(a), 21(b) and 21(c) for the convenience of layout, with the tags "C" and "D" joining the first portion 21(a) of said flow chart portions to the second portion 21(b) in the logical sense, and similarly the tag "E" joining the second 21(b) of said flow chart portions to the third such portion 21(c).

Since the exemplary version of this seventh preferred embodiment transducer is adapted to convert an input voltage of from approximately 0 to approximately 150 volts of AC into an output voltage of from approximately 0 to approximately 5 volts of DC, it is again appropriate, as an example, to detail the case in which the upper allowable limit for the upper and the lower limit values to be inputted during the steps 27 and 29 of FIG. 3 is a digital value of "150", while the lower allowable limit for said upper and lower limit values is a digital value of "0". In other words, the subroutine of this FIG. 21 is for performing this particular limitation of the inputted value.

After the START block in the first portion 21(a) of this FIG. 21 program portion, then, in the step 31, the key data for the fourth digit of the upper or lower limit value is read in, and next the flow of control passes to the decision step 32.

In this decision step 32, a decision is made as to whether a key stroke has occurred, or not. If the answer to this decision is NO, so that no key stroke has occurred, then the flow of control passes next directly to the decision step 34, thus skipping the step 33. On the other hand, if the answer to this decision is YES, so that a further key stroke has occurred, then in this case the flow of control passes next to the step 33.

In this step 33, the fourth digit value is incremented, and next the flow of control passes to the decision step 34.

In this decision step 34, a decision is made as to whether the current value of the fourth digital is equal to "2", or not. If the answer to this decision is YES, so that the fourth digit is currently equal to "2", then it is deemed that an input error by the operator has occurred, and then the flow of control passes next to the step 35. On the other hand, if the answer to this decision is NO, so that the fourth digit is currently "1", then it is deemed that this input is acceptable, and in this case the flow of control passes next to the step 36.

In the step 35, the fourth digit is set to zero, since the value currently held thereby is unacceptable. In this case, no consultation of the operator of this transducer is performed, by contrast to the sixth preferred embodiment described above. And next the flow of control passes to the decision step 36.

In this decision step 36, a decisions is made as to whether the current value of the fourth digit is equal to "0", or not. If the answer to this decision is NO, so that the fourth digit is equal to "1", then it is required to limit the third digit to the range "0" through "5", and then the flow of control passes next to the step 36. On the other hand, if the answer to this decision is YES, so that the fourth digit is currently "0", then it is decided that any value for the third digit will be acceptable, and in this case the flow of control passes next via the tag "C" to the step 44 in the second portion 21(b) of this FIG. 21 program portion.

However, in the step 37, at which point it is determined that it is required to limit the third digit to the range "0 " through "5", the key data for the third digit of the upper or the lower limit value is read in, and next the flow of control passes to the decision step 38.

In this decision step 38, a decision is made as to whether a key stroke has occurred, or not. If the anser to this decision is NO, so that no key stroke has occurred, then the flow of control passes next directly to the decision step 40, thus skipping the step 39. On the other hand, if the answer to this decision is YES, so that a further key stroke has occurred, then in this case the flow of control passes next to the step 39.

In this step 39, the third digit value is incremented, and next the flow of control passes to the decision step 40.

In this decision step 40, a decision is made as to whether the current value of the third digit is equal to "6", or not. If the answer to this decision is NO, so that the third digit is currently not equal to "6", then in this case the flow of control skips the step 41, to pass next via the tag "D" to the decision step 42 of the second portion 21(b) of this FIG. 21 subprogram portion. On the other hand, if the anser to this decision is YES, so that the third digit is currently equal to "6", then the flow of control passes next to the step 41. And in this step 41 the value of the third digit is set to "0", and next as before the flow of control passes next via the tag "D" to the decision step 42 of the second portion 21(b) of this FIG. 21 subprogram portion.

In the decision step 42 to which this tag "D" leads in said second program portion 21(b), a decision is made as to whether the current value of the third digit is equal to "5", or not. If the answer to this decision is NO, so that the third digit is not currently equal to "5", then the flow of control passes next to the step 44. On the other hand, if the answer to this decision is YES, so that the third digit is currently "5", then in this case the flow of control passes next to the step 43. An in this step 43, the first and the second digit are forcibly set to zero without further user consultation, and next the flow of control passes to return from this routine, since all of the fourth through the first digits have now been determined.

However, if the fourth digit is determined in the step 36 to be currently equal to "0", or if the third digit is determined in the step 42 not to be currently equal to "5", then control is transferred to the step 44, in which the key data for the third digit of the upper or the lower limit value is read in, and next the flow of control passes to the decision step 45.

In this decision step 45, a decision is made as to whether a key stroke has occurred, nor not. If the answer to this decision is NO, so that no key stroke has occurred, then the flow of control passes next directly to the decision step 47, thus skipping the step 46. On the other hand, if the answer to this decision is YES, so that a further key stroke has occurred, then in this case the flow of control passes next to the step 46.

In this step 46, the third digit value is incremented, and next the flow of control passes to the decision step 47.

In this decision step 47, a decision is made as to whether the current value of the third digit is equal to "A" (i.e., hexadecimal "10"), or not. If the answer to this decision is NO, so that the third digit is currently not equal to hexadecimal "10", then in this case the flow of control skips the step 48, to pass next via the tag "E" to the step 49 of the third portion 21(c) of this FIG. 21 subprogram portion. On the other hand, if the answer to this decision is YES, so that the third digit is currently equal to hexadecimal "10", then the flow of control passes next to the step 48. And in this step 48 the value of the third digit is set to "0", and next as before the flow of control passes next via the tag "E" to the decision step 49 of the third position 21(c) of this FIG. 21 subprogram portion.

In the step 49 to which this tag "E" leads in said third program portion 21(c), the key data for the second digit of the upper or the lower limit value is read in, and next the flow of control passes to the decision step 50.

In this decision step 50, a decision is made as to whether a key stroke has occurred, or not. If the answer to this decision is NO, so that no key stroke has occurred, then the flow of control next passes directly to the decision step 52, thus skipping the step 51. On the other hand, if the answer to this decision is YES, so that a further key stroke has occurred, then in this case the flow of control passes next to the step 51.

In this step 51, the second digit value is incremented, and next the flow of control passes to the decision step 52.

In this decision step 52, a decision is made as to whether the current value of the second digit to equal to "A" (hexadecimal 10), or not. If the answer to this decision is NO, so that the second digit is currently less than hexadecimal "10", then it is deemed that this input is acceptable, and in this case the flow of control passes next to the step 54. On the other hand, if the answer to this decision is YES, so that the second digit is currently hexadecimal "10", then the flow of control passes next to the step 53. And in this step 53 the value of the second digit is set to "0", and next the flow of control passes to the step 54.

In this step 54, the key data for the first digit of the upper or the lower limit value is read in, and next the flow of control passes to the decision step 55.

In this decision step 55, a decision is made as to whether a key stroke has occurred, or not. If the answer to this decision is NO, so that no key stroke has occurred, then the flow of control passes next directly to the decision step 57, thus skipping the step 56. On the other hand, if the answer to this decision is YES, so that a further key stroke has occurred, then it is in this case the flow of control passes next to the step 56.

In this step 56, the first digit value is incremented, and next the flow of control passes to the decision step 57.

In this decision step 57, a decision is made as to whether the current value of the first digit is equal to "A" (hexadecimal 10), or not. If the answer to this decision is NO, so that the first digit is currently less than hexadecimal "10", then it is deemed that this input is acceptable, and in this case the flow of control passes next to return from this routine, since all of the fourth through the first digits have now been determined. On the other hand, if the answer to this decision is YES, so that the first digit is currently hexadecimal "10", then the flow of control passes next to the step 58. And in this step 58 the value of the first digit is set to "0", and next the flow of control passes to return from this routine, since similarly all of the fourth through the first digits have now been determined.

Thus, it is seen that, according to the construction and operation of this seventh preferred embodiment of the transducer of the present invention as explained above, it it is possible to display the input voltage at the same time as obtaining a linearized DC output which corresponds to said input voltage, and to provide a transducer which has the function of a meter relay to set up the upper and the lower limits of the input with a pair of set up registers, and to produce a certain output when these limits are exceeded. And, further, when inputting the values for the upper limit value and the lower limit value, if any erroneous entry is attempted to be made that is outside the prescribed limits for the input voltage, no particular error indication is presented to the user so that he or she may correct the error and may input a new valid entry, as was done in the case of the sixth preferred embodiment described above, but instead in this seventh preferred embodiment of the transducer of the present invention the inputted value is arbitrarily revised to be within the acceptable range therefor. Accordingly, mistaken operation is effectively prevented, in a different way from what was done in the sixth preferred embodiment.

The eighth preferred embodiment

Figure 22:
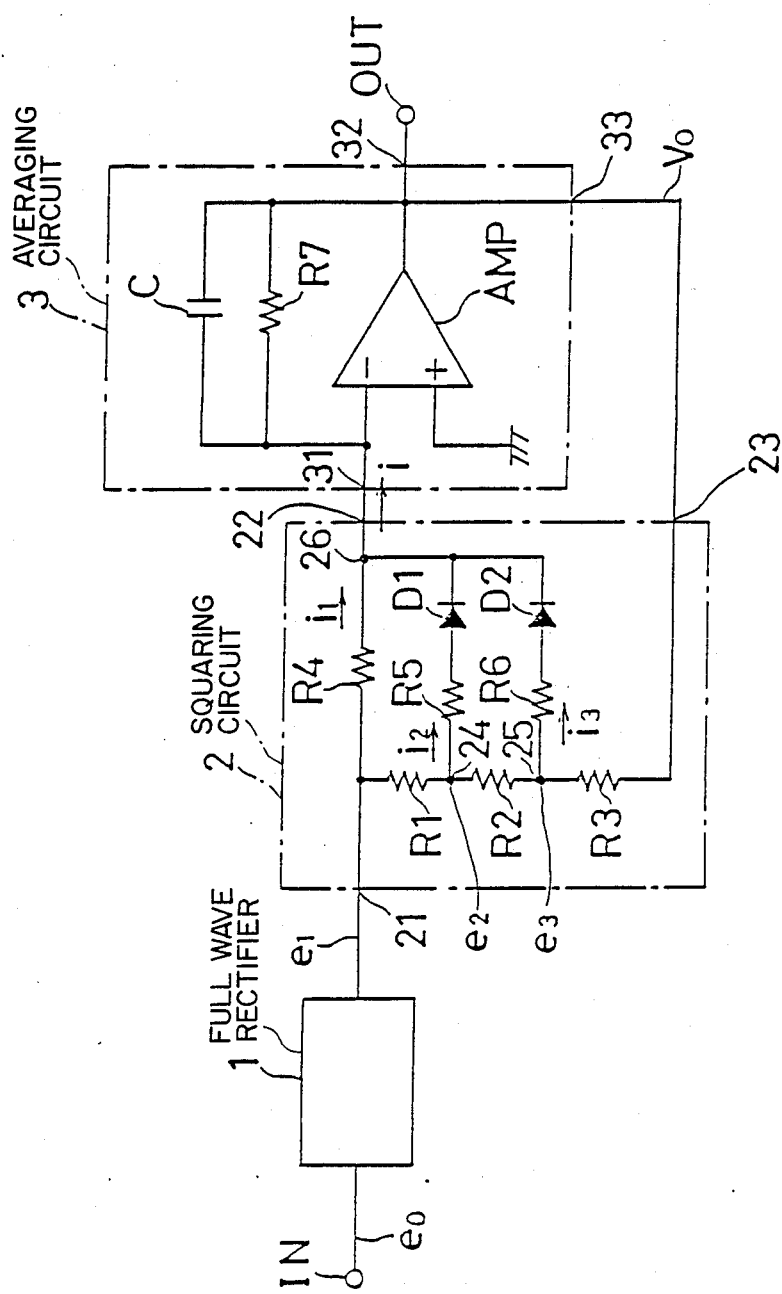
FIG. 22 is a circuit diagram of the eighth preferred embodiment of the present invention, which is an AC effective value—DC conversion circuit.
Figure 23:
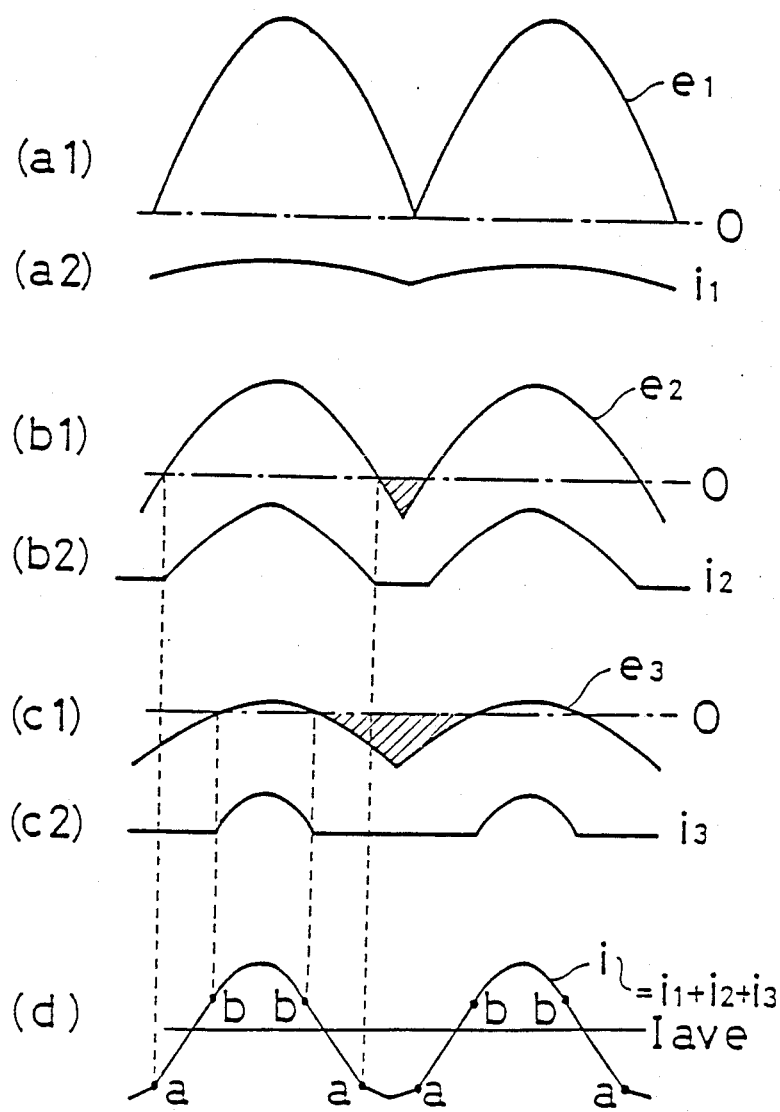
FIG. 23 is a time chart for illustrating the action of said eighth preferred embodiment AC effective value—DC conversion circuit of FIG. 22.

The eighth preferred embodiment of the present invention is an AC effective value-DC conversion circuit, which will now be shown and described with the aid of FIGS. 22 and 23.

FIG. 22 is a circuit diagram of an AC effective value-DC conversion circuit. In FIG. 22, IN denotes an input for an AC voltage (e0) while OUT denotes an output for an effective value voltage (V0). The reference numeral 1 denotes a full wave rectifying circuit which full wave rectifies the AC voltage (e0) from the input terminal IN and outputs it as a rectified voltage (e1) whichis to be effective value converted.

The reference numeral 2 denotes a square circuit which comprises an input unit 21 for receiving the rectified voltage (e1) from the full wave rectifying circuit 1, an output unit 22 for outputting a squared electric current (i), and a negative feedback input unit 23 for inputting a negative feedback voltage (V0).

The reference numeral 3 denotes an everaging circuit which comprises an input unit 31 for receiving the squared electric current (i) from the output unit 22 of the squaring circuit 2, an output unit 32 for outputting an effective value voltage (V0) of the rectified voltage (e1), and an output unit 33 for outputting the effective value voltage (V0) as a negative feedback voltage (V0). This averaging circuit 3 outputs the rectified voltage (e1), as an effective value voltage (V0) after averaging the rectified voltage (e1) according to the squared current (i).

The squaring circuit 2 comprises a resistor R4 as a first means for converting the rectified voltage (e1) given to the input unit 21 thereof into a first current (i1) which is proportional to the rectified voltage (e1). This resistor R4 is connected between the input unit 21 and the output unit 22 of the squaring circuit 2. The squaring circuit 2 further comprises resistors R1, R2, R3, R5, and R6 and diodes D1 and D2 as a second conversion means for converting the negative feedback voltage (V0) to a second and a third current (i2 and i3) which are inversely proportional to the value of the negative feedback voltage (V0). The resistors R1, R2 and R3 are connected between the input unit 21 and the negative feedback input unit 23 in a mutually serial manner. The resistor R5 and the diode D1, and the resistor R6 and the diode D2, are connected in series so as to form a first and a second series circuit. The first series circuit is connected between the junction 24 of the resistors R1 and R2 and the output unit 22 while the second series circuit is connected between the junction 25 of the resistors R2 and R3 and the output unit 22. The squaring circuit 2 is further provided with a summing means for summing the currents (i1, i2 and i3) from the two conversion means and outputting the summed current (i=i1+i2+i3) as a square current (i) and this summing means is formed by connecting one end of the resistor R4 and the cathodes of the diodes D1 and D2 in common to define a common node 26.

The averaging circuit 3 comprises an operational amplifier AMP, and a smoothing capacitor C and a resistor R7 for determining the gain of the operational amplifier, which are connected in parallel between the inverting input terminal (−) and the output terminal of the operational amplifier AMP. The non-inverting input (+) of this operational amplifier AMP is grounded. This output terminal of the operational amplifier AMP is connected to the output units 32 and 33 of the averaging circuit 3.

Now the action of this eighth preferred embodiment of the present invention will be described in the following with reference made to the time chart of FIG. 23. FIG. 23 (a1) shows the wave form of the rectified voltage (e1) which is given from the full wave rectifying circuit 1 to the input unit 21 of the squaring circuit 2, FIG. 23 (a2) shows the wave form of the first current (i1) which flows through the resistor R4 of the squaring circuit 2, FIG. 23 (b1) shows the wave form of the voltage (e2) which appears at the junction 24, FIG. 23 (b2) shows the wave form of the second current (i2) which flows through the resistor R5, FIG. 23 (c1) shows the wave form of the voltage (e3) which appears at the junction 25, FIG. 23 (c2) shows the wave form of the third current (i3) which flows through the resistor R6, and FIG. 23(d) shows the wave form of the squared current (i) which appears at the node 26.

The rectified voltage (e1) of the wave form such as the one shown in FIG. 23 (a1) is supplied to the input unit 21 of the squaring circuit 2. Since the input unit 31 of the averaging circuit 3 is an imaginary ground (or earth), the first current (i1) which flows through the resistor R4 of the squaring circuit 2 can be expressed by i1=e1/R4, where i1 is the electric current value of the first current, e1 is the voltage value of the rectified voltage (e1), and R4 is the resistive value of the resistor R4, and "/" denotes the action of arithmetic division. The wave form of the first current (i1) is as shown in FIG. 23 (a2).

Since the negative feedback voltage (V0) and the rectified voltage (e1) which are given to the negative feedback input unit 23 of the squaring circuit 2 are voltage divided by the resistors R1, R2 and R3 at the junction 24, the voltage (e2) at the junction 24 is as shown in FIG. 23 (b1). In other words, this voltage (e2) has the intervals of negative voltage as shown by the hatching lines. Therefore, the second current (i2) which flows through the resistor R5 is made as shown in FIG. 23 (b2) by the diode D1. Likewise, the voltage (e3) at the junction 25 becomes as shown in FIG. 23 (c1). Therefore, the third current (i3) which flows through the resistor R6 is made as shown in FIG. 23 (c2) by the diode D2. Since these currents (i1, i2 and i3) are summed at the node 26, the summed current (i) (squared current i) becomes as shown in FIG. 23 (d). In the wave form of the squared current (i), the interval a—a corresponds to the second current (i2) while the interval b—b corresponds to the third current (i3).

The magnitudes of the various currents depend on the resistive values of the various resistors R4, R5 and R6, and by appropriately selecting these resistive values it is possible to approximate or simulate the wave form of the squared current (i) to the square of the rectified voltage (V0). Furthermore, the wave form of the squared current (i) of FIG. 23 (d) had bends at two points (in one quarter of each cycle) but by increasing the number of the junctions 24 and 25 it is possible to better approximately the bent line to a square (quadratic) curve. Therefore, since the square of the AC voltage (e0) which is applied to the full wave rectifying circuit 1 is the square of the rectified voltage (e1) and the negative feedback voltage (V0) from the output unit 33 of the averaging circuit 3 is given to the negative feedback input unit 23 of the squaring ciruit 2, the square current (i) is proportional to the square of the AC voltage (e0) and inversely proportional to the negative feedback voltage (V0) or can be expressed by the following mathematical expression:

$$i = (k \cdot e_0^2)/V_0 \quad (1)$$

where i is the current value of the squared current (i), k is a constant, e0 is the voltage value of the rectified voltage, and V0 is the voltage value of the negative feedback voltage (V0).

This squared current (i) is averaged by the averaging circuit into an averaged current (Iave) as shown in FIG. 23 (d). In the averaging circuit 3, since the averaged current (Iave) flows through the resistor R7 thereof, the effective value voltage (V0) can be expressed by the following equation (2):

$$\begin{aligned} V0 &= -R7 \cdot Iave \\ &= -R7 \cdot (1/T) \cdot \int \{k \cdot e_0^2)/V0\} dt \end{aligned} \quad (2)$$

where R7 is the resistive value of the resistor R7, Iave is the current value of the averaged current (Iave), e0 is the voltage value of the AC voltage (e0), V0 is the voltage value of the effective value voltage (V0), and T is one half of the interval of the AC voltage (e0).

Therefore, the effective value voltage (V0) can be expressed by the following equation (3):

$$V0 = \sqrt{\{(k \cdot R7)/T\} \cdot \int e_0^2 dt} \quad (3)$$

Since this equation is identical to the theoretical formula for the effective value, the effective value voltage (V0) which is the output of the averaging circit 3 is indeed the effective value.

In this eighth preferred embodiment, since there is no circuit element which limits a frequency property, it can provide favorable frequency characteristics. The time constant thereof is determined by the capacitive value of the capacitor C and the resistive value of the ressitor R7 but since the time constant can be reduced to the extent where the ripple component of the AC voltage (e0) is not affected thereby its response can be extremely fast. Furthermore, since the effective value conversion is based on the theoretical formula for the effective value, the distortion (of the output) is extremely small as compared to the circuit for the pseudo effective value conversion and highly reliable effective value conversion can be effected.

Although the squaring circuit 2 of the above eighth preferred embodiment was based on an approximation using a plurality of diodes, the present invention is not to be considered as limited thereby, but alternatively the squaring circuit 2 may be a squaring circuit using transistors.

The ninth preferred embodiment

Figure 24:
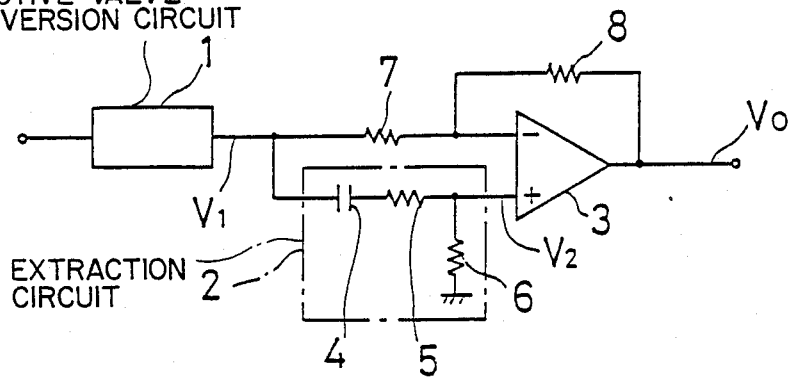
FIG. 24 is an electric circuit diagram of a ripple removal circuit which is a ninth preferred embodiment of the present invention.
Figure 25:
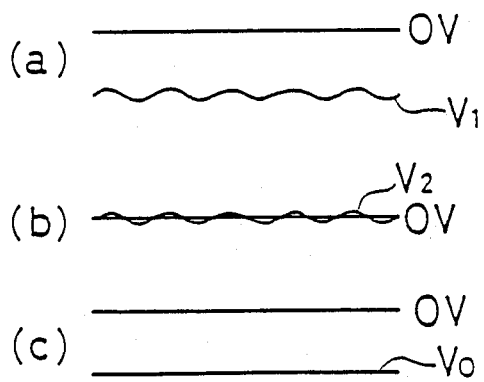
FIG. 25 is a wave form diagram for illustrating the action of the ninth preferred embodiment ripple removal circuit of FIG. 24.
Figure 26:
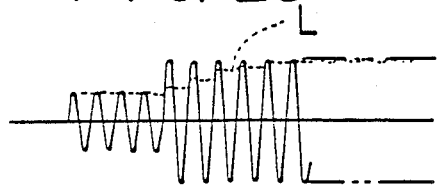
FIG. 26 is a wave form diagram for illustrating the action of a prior art ripple removal circuit.

The ninth preferred embodiment of the present invention is a ripple removal circuit, which will now be shown and described with the aid of FIGS. 24 through 26. FIG. 24 is a circuit diagram of this ninth preferred embodiment ripple removal circuit. In this figure, the reference numeral 1 denotes an AC effective value-DC conversion circuit, such as the one just described, which produces a DC output which proportional to the effective value of an AC signal, the reference numeral 2 denotes an extraction circuit for extracting an AC component from the original signal which is outputted from the AC effective value-DC conversion circuit 1, and the reference numeral 3 denotes an operational amplifier serving as a computing means.

The extraction circuit 2 is provided with a capacitor 4 for eliminating a DC component from the original signal, and a first and a second resistor 5 and 6 for adjusting the input gain of the extracted AC component to the operational amplifier by voltage division.

The inverting input terminal of the operational amplifier 3 receives the original signal from the AC effective value-DC conversion circuit 1 and the non inverting input terminal of the operational amplifier receives the AC component from the extraction circuit 2 so as to produce an output which is obtained by subtracting the AC component which is superimposed on the original signal from the original signal.

The reference numerals 7 and 8 denote a third resistor and a fourth resistor for determining the gain of the operational amplifier 3.

Now the action of the ripple prevention circuit of the present ninth preferred embodiment is described in the following with reference made to the waveform diagram of FIG. 25.

First of all, the output V1 from the AC effective value-DC conversion circuit 1 can be expressed by the following:

$$V1 = Vd + Va$$

where Vd is the DC component and Va is the ripple component. The output looks as shown in FIG. 25(a).

The voltage V2 which is applied to the non inverting input terminal of the operational amplifier can be likewise expressed as follows:

$$V2 = Va \times R2/(R1 + R2)$$

where R1 and R2 are the resistive values of the first and the second resistor. The output looks as shown in FIG. 25(b).

If the resistive values of the third and the fourth resistors are R3 and R4, the output voltge V0 of the operational amplifier can be expressed as follows:

$$\begin{aligned}
V0 &= -V1 \times R4/R3 + V2(1 + R4/R3) \\
&= -(Vd + Va) \times R4/R3 + Va \times \\
&\quad [R2/(R1 + R2)] \times (1 + R4/R3) \\
&= -Vd \times R4/R3 + Va[R2 \times (R3 + R4)/ \\
&\quad [R3 \times (R1 + R2)] - R4/R3]
\end{aligned}$$

Here, if $$R2/R1 = R4/R3$$

then:

$$R2 \times (R3+R4)/[R3 \times (R1+R2)] - R4/R3 = 0$$

and one can obtain:

$$V0 = -Vd \times R4/R3$$

In other words, by adjusting the ratio of the resistive values of the first and the second resistors 5 and 6, it is possible to obtain a DC output from which the ripple is completely removed as shown in FIG. 25(c).

The means for subtracting the AC component from the original signal on which the AC component is superimposed is not limited by an operational amplifier such as the operational amplifier 3 in the above described ninth preferred embodiment, but may also be a combination of transistors and field effect transistors among other possibilities, and these as an aggregate constitute a computing means 3.

The tenth and eleventh preferred embodiments

Figure 27:
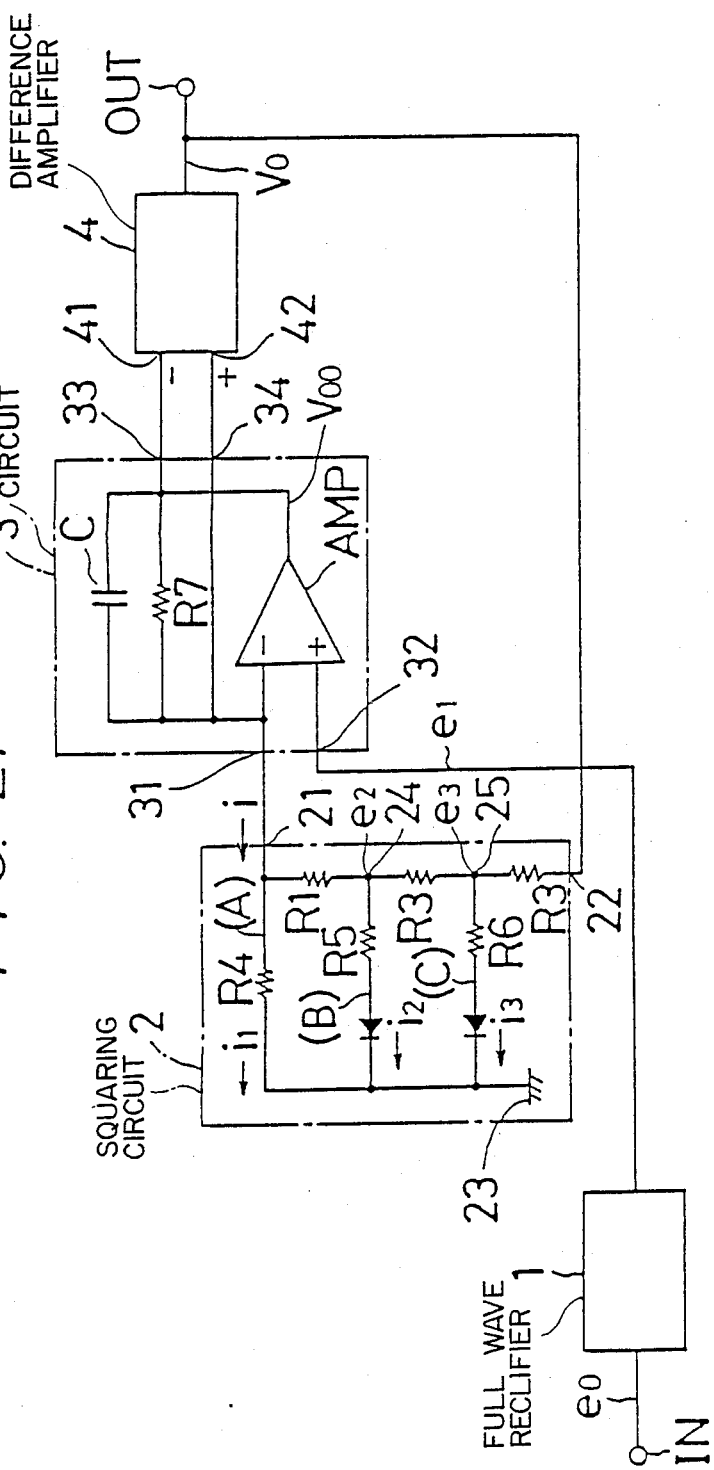
FIG. 27, like FIG. 22 for the eighth preferred embodiment, is a circuit diagram of the tenth preferred embodiment of the present invention, which is an AC effective value—DC conversion circuit.

The tenth and eleventh preferred embodiments of the present invention are AC effective value-DC conversion circuits, which will now be shown and described with the aid of FIGS. 27 through 30. FIG. 27 is a circuit diagram of the tenth preferred embodiment AC effective value-DC conversion circuit. In this figure, the reference symbol IN denotes an input for an AC voltage (e0) while OUT denotes an output for an effective value voltage (V0). The reference numeral 1 denotes a full wave rectifying circuit which full wave rectifies the AC voltage (e0) from the input terminal IN and outputs it as a positive rectified voltage (e1) which is to be effective value converted.

The reference numeral 2 denotes a squaring circuit having resistors R1 to R6 and diodes D1 and D2. This squaring circuit 2 comprises an output unit 21 for drawing a squared electric current (i), and a negative feedback input unit 22 for inputting a negative feedback voltage (V0). The squaring circuit 2 further comprises a primary path A (including the resistor R4) for conducting a primary electric current (i1) from the output unit 21 thereof and the ground 23, and a pair of secondary paths B and C for conducting secondary electric currents (i2 and i3) between corresponding voltage points 24 and 25 which are lower in voltage than the rectified voltage (e1) and the ground 23. The low voltage points 24 and 25 are the junctions between the resistors R1 and R2 and the resistors R2 and R3. The secondary paths B and C are provided with the resistor R5 and the diode D1, and the resistor R6 and the diode D2, respectively. Since the diodes D1 and D2 are intended to function as directive elements, they may be replaced by other directive elements such as transistors.

The reference numeral 3 denotes an averaging circuit which comprises an input unit 31 for supplying the squared current to the output unit 22 of the squaring circuit, an input unit 32 for receiving the rectified voltage (e1) from the full wave rectifying circuit 1, an output unit 33 which produces an averaged output voltage (V00), and an output unit 34 which produces the imaginarily short circuited rectified voltage (e1) at the input unit 31. The averaging circuit 3 further comprises an operational amplifier AMP and a smoothing capacitor C and a resistor R7 for determining the gain of the operational amplifier which are connected in parallel between the inverting input terminal (−) and the output terminal of the operational amplifier AMP.

The reference numeral 4 denotes a difference amplifier having an input (−) 41 which is connected to the output unit 33 of the averaging circuit 3 and another input terminal (+) 42 which is connected to the output unit 34 of the averaging circuit 3.

Figure 28:
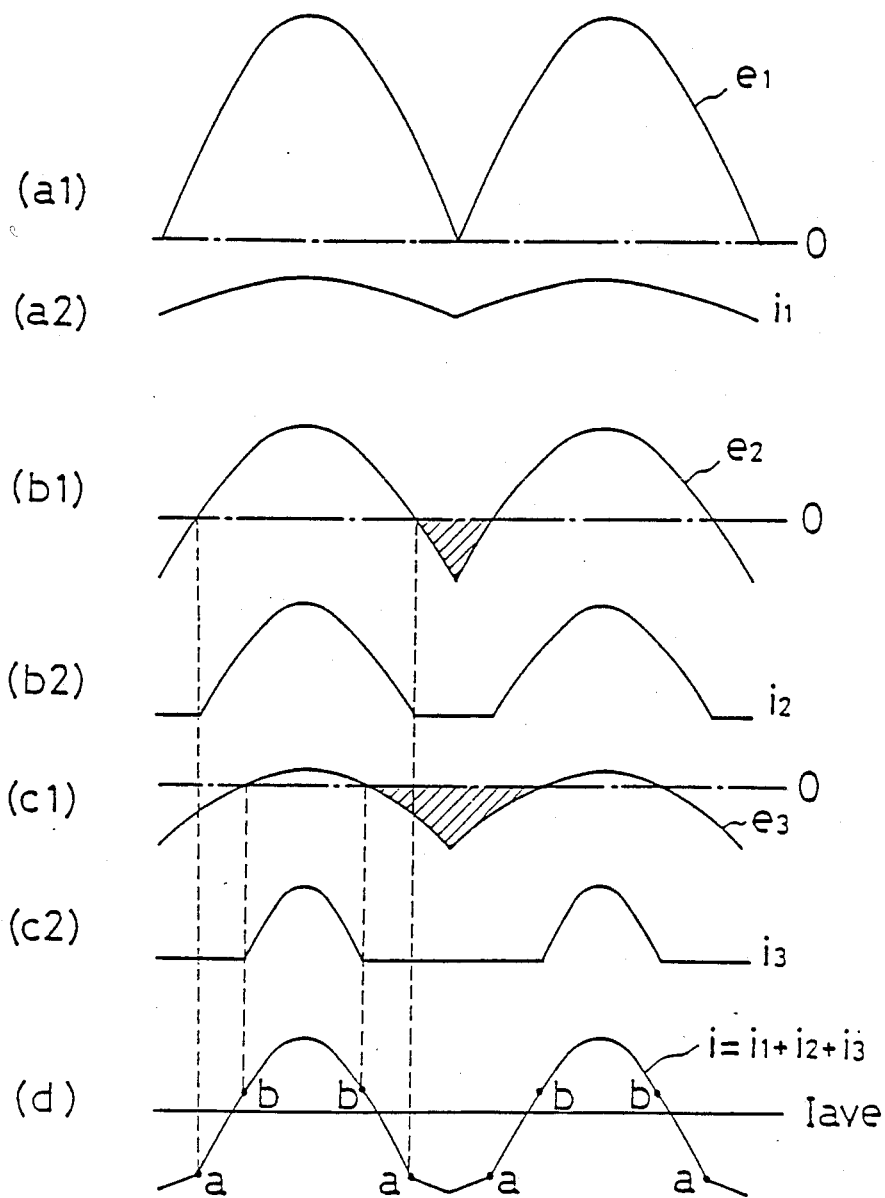
FIG. 28, like FIG. 23 for the eighth preferred embodiment, is a time chart for illustrating the action of said tenth preferred embodiment AC effective value—DC conversion circuit of FIG. 27.

Now the action of this tenth preferred embodiment of the present invention will be described in the following with reference to the wave form diagram of FIG. 28. FIG. 28 (a1) shwons the wave form of the rectified voltage (e1) which is given from the full wave rectifying circuit 1 to the noninverting input (+) of the operational amplifier AMP of the averaging circuit 2. FIG. 28 (a2) shows the wave form of the primary current (i1) which flows through the resistor R4 in the primary path A of the squaring circuit 2 while FIG. 28 (b1) shows the wave form of the voltage (e2) which appears at the junction 25, and FIG. 28 (b2) shows the wave form of the secondary current (i2) which flows through the resistor R5 in the secondary path B. FIG. 28 (c1) shows the wave form of the voltage (e3) which appears at the junction 25, FIG. 28 (c2) shows the wave form of the secondary current (i3) which flows through the resistor R6 in the secondary path C. FIG. 28 (d) shows the wave form of the squared current (i) which appears at the node 21. In the drawings, "0" denotes the ground voltage at the ground 23.

The rectified voltage (e1) of the wave form such as the one shown in FIG. 28 (a1) is supplied to the non inverting input (+) of the operational amplifier AMP. Since the inverting and non-inverting input terminals (+) and (−) are imaginarily short circuited, the primary current (i1) which flows through the resistor R4 of the squaring circuit 2 corresponds to the voltage difference between the rectified voltage (e0) and the zero voltage at the ground 23. This can be mathematically expressed by the equation i1=e1/R4, where i1 is the electric current value of the primary current, e1 is the voltage value of the rectified voltage (e1), and R4 is the resistive value of the resistor R4. Of course, the symbol "/" denotes arithmetic division. The wave form of the first current (i1) is as shown in FIG. 28 (a2).

Since the rectified voltage (e1) which appears at the output unit 21 of the squaring circuit 2 is voltage divided by the resistors R1, R2 and R3 at the junctions 24 and 25 in relation with the output (V0) of the difference amplifier 4 which is applied to the the negative feedback input, the voltage (e2) at the junction 24 becomes as shown in FIG. 28 (b1). In other words, this voltage (e2) has the intervals of negative voltage as shown by the hatched lines. Therefore, the secondary current (i2) which flows through the resistor R5 is made as shown in FIG. 28 (b2) by the conduction of the diode D1 if the voltage (e2) is higher than zero. Likewise, the voltage (e3) at the junction 25 becomes as shown in FIG. 28 (c1). Therefore, the secondary current (i3) which flows through the resistor R6 is made as shown in FIG. 28 (c2) by the diode D2.

Since the sum of these currents (i1, i2 and i3) is the squared current which appears at the output unit 21, the summed current of the square current becomes as shown in FIG. 28 (d). In the wave form of the squared current (i), the interval a-a corresponds to the secondary current (i2) while the interval b-b corresponds to the secondary current (i3).

The magnitudes of the various currents depend on the resistive values of the various resistors R4, R5 and R6, and by appropriately selecting these resistive values it is possible to approximate or simulate the wave form of the squared current (i) to the square of the rectified voltage (V0). Furthermore, the wave form of the squared current (i) of FIG. 28 (d) had bends at two points, in one quarter of each cycle, but by increasing the number of the junctions 23 and 24 it is possible to better approximate the bent line to a square (quadratic) curve.

Therefore, since the square of the AC voltage (e0) which is applied to the full wave rectifying circuit 1 is the square of the rectified voltage (e1) and the negative feedback voltage (V0) from the output unit 33 of the averaging circuit 3 is given to the negative feedback input unit 23 of the squaring circuit 2, the square current (i) is proportional to the square of the AC voltage (e0) and inversely proportional to the output (V0) of the difference amplifier or can be expressed by the following mathematical expression:

$$i = (k_1 \cdot e_0^2)/V_0 \qquad (1)$$

where i is the current value of the squared current (i), k1 is a constant, e0 is the voltage value of the rectified voltage, and V0 is the voltage value of the output of the difference amplifier 4.

This squared current (i) is averaged by the averaging circuit 3 into an averaged current (Iave) as shown in FIG. 28 (d). In the averaging circuit 3, since the averaged current (Iave) flows through the resistor R7 thereof, the averaged voltage can be expressed by the following equation (2):

$$V_{00} = e_1 + R_7 \cdot I_{ave} = e_1 + (k_1 \cdot R_7) \cdot \{1/(T \cdot V_0)\} \cdot \int e_0^2 dt \qquad (2)$$

where R7 is the resistive value of the resistor R7, Iave is the current value of the averaged current (Iave), e0 is the voltage value of the AC voltage (e0), V0 is the voltage value of the effective value voltage (V0), and T is one half of the interval of the AC voltage (e0).

And, since the difference amplifier 4 produces the difference between the rectified voltage (e1) and the averaged output (V00), with k2 set as a constant, the effective value voltage (V0) can be expressed by the following equation (3):

$$V_0 = k_2(e_1 - V_{00}) = \{-(k_1 \cdot k_2 \cdot R_7)/(T \cdot V_0)\} \cdot \int e_1^2 dt \qquad (3)$$

Therefore, by setting V0 to the left hand side, one can obtain:

$$V0 = \sqrt{\{(k1 \cdot k2 \cdot R7)/T\} \cdot \int e0^2 dt} \qquad (4)$$

Since this equation (4) is identical to the theoretical formula for the effective value, the effective value voltage (V0) which is the output of the averaging circuit 3 is indeed the effective value.

In this tenth preferred embodiment of the present invention, since there is no circuit element which limits the frequency property, it can provided favorable frequency characteristics. The time constant thereof is determined by the capacitive value of the capacitor C and the resistive value of the resistor R7, but since the time constant can be reduced to the extent where the ripple component of the AC voltage (e0) is not affected thereby, its response can be extremely fast. Furthermore, since the effective value conversion is based on the theoretical formula for the effective value, the distortion of the output is extremely small as compared to the prior art type of circuit for pseudo effective value conversion, and highly reliable effective value conversion can be effected.

Although the squaring circuit 2 of the above tenth preferred embodiment of the present invention was based on an approximation using a plurality of diodes, the present invention is not to be considered as being limited thereby; alternatively, the squaring circuit 2 may be a squaring circuit using transistors.

Although in the above described tenth preferred embodiment of the present invention the rectified voltage (e1) was positive, alternatively said rectified voltage may also be made negative by changing the polarities of the diodes D1 and D2.

Figure 29:
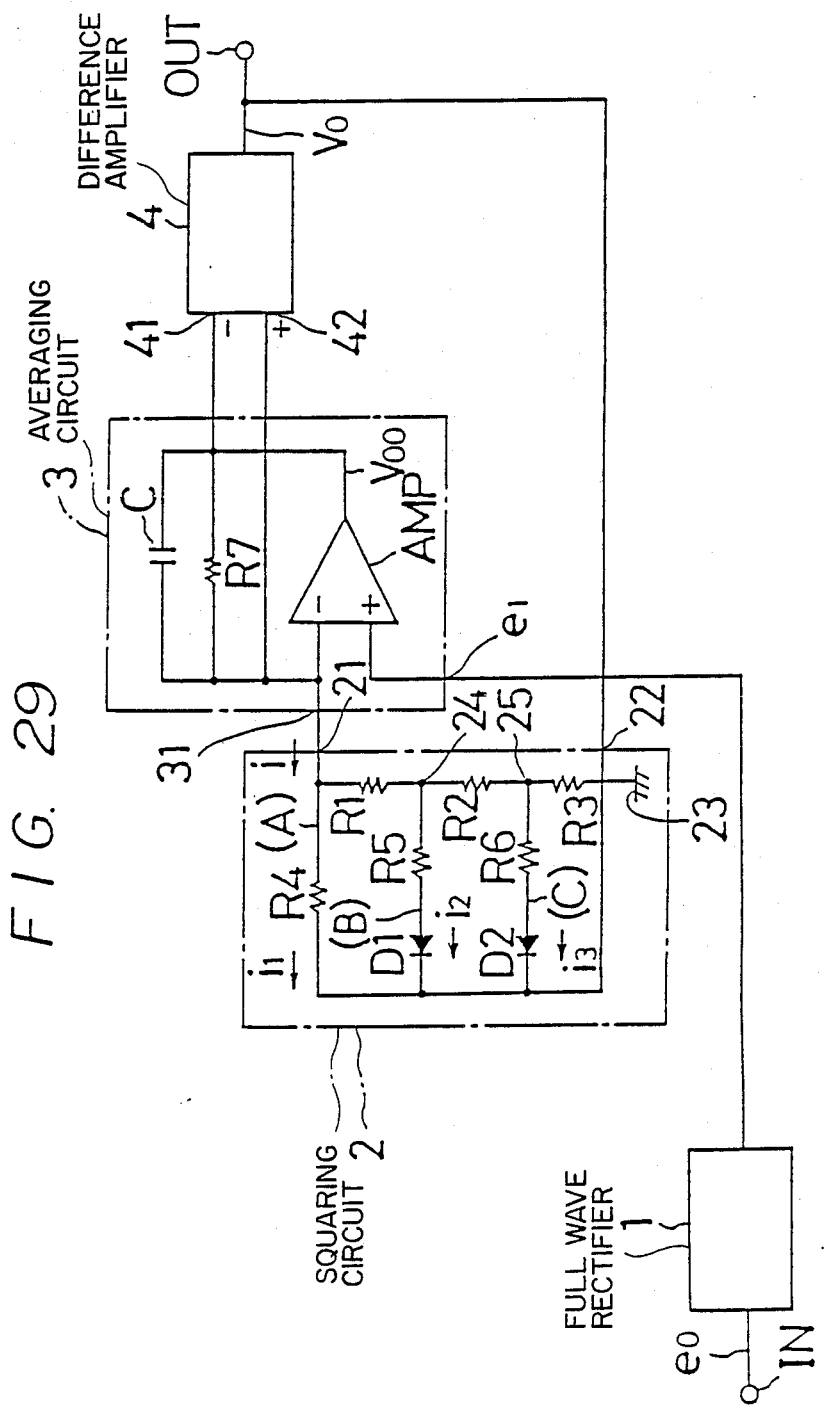
FIG. 29, like FIGS. 22 and 27 for the eighth and tenth preferred embodiments respectively, is a circuit diagram of the eleventh preferred embodiment of the present invention, which is an AC effective value—DC conversion circuit.
Figure 30:
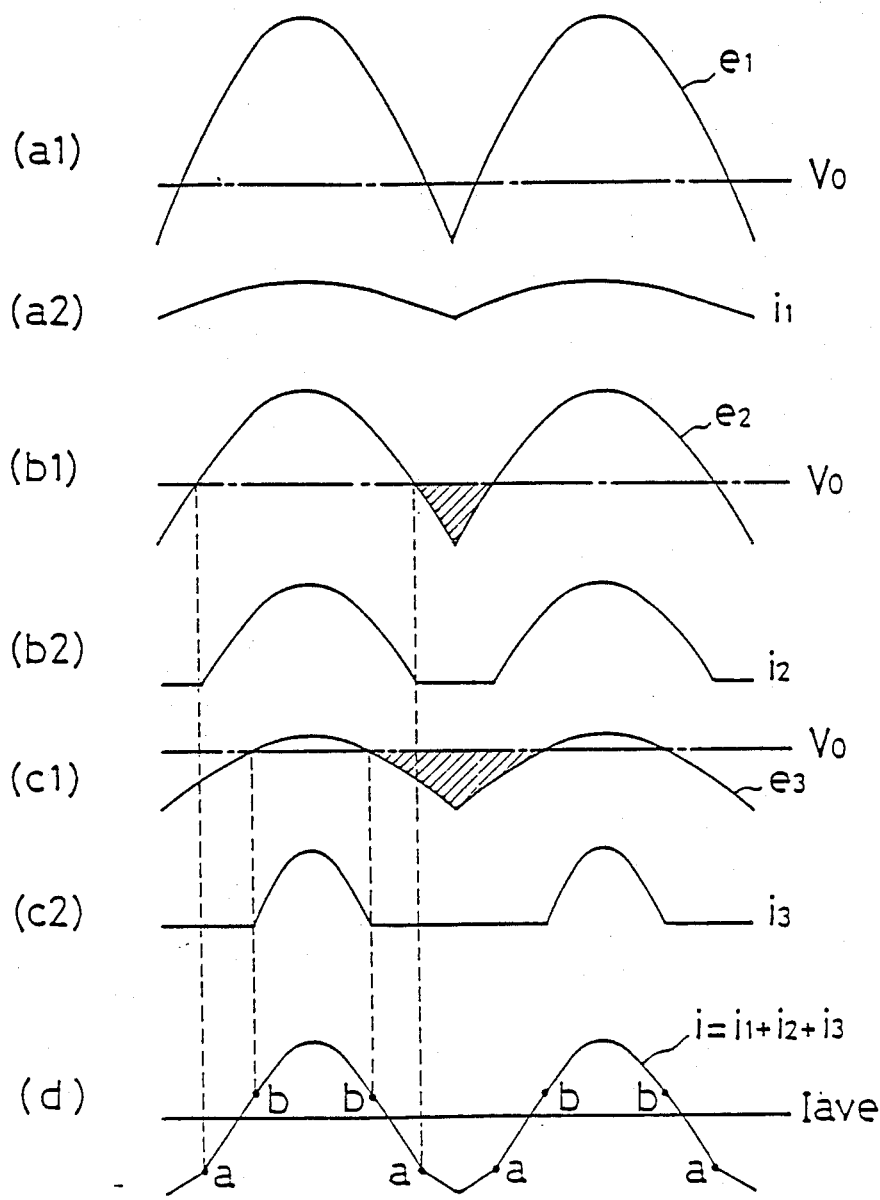
FIG. 30, like FIGS. 23 and 28 for the eighth and tenth preferred embodiments respectively, is a time chart for illustrating the action of said eleventh preferred embodiment AC effective value—DC conversion circuit of FIG. 29.

FIG. 29 is a circuit diagram of the eleventh preferred embodiment of the present invention, and like parts are denoted by like numerals to those utilized in FIG. 27. And FIG. 30 is a wave form diagram for illustrating the operation of this eleventh preferred embodiment. A main feature of this eleventh preferred embodiment of the present invention is that the negative feedback input 22 is connected to the resistor R4 and the cathodes of the diodes D1 and D2, while the other end of the resistor R4 is connected to the ground 23. However, the action of this eleventh preferred embodiment is substantially the same as that of the previously described tenth preferred embodiment, but the voltages of the low voltage points are determined by the voltage difference between the rectified voltage (e1) and the zero ground voltage at the ground 23 and the primary and the secondary currents A, B and C of the primary and the secondary paths A, B and C are determined by the voltage differences between the voltages (e2 and e3) at the low voltage points 24 and 25 and the negative feedback voltage (V0). Otherwise, this eleventh preferred embodiment is identical to the previously described tenth preferred embodiment; and hence no particular repetition thereof will be made, in the interests of brevity of description.

The twelfth preferred embodiment

Figure 31:
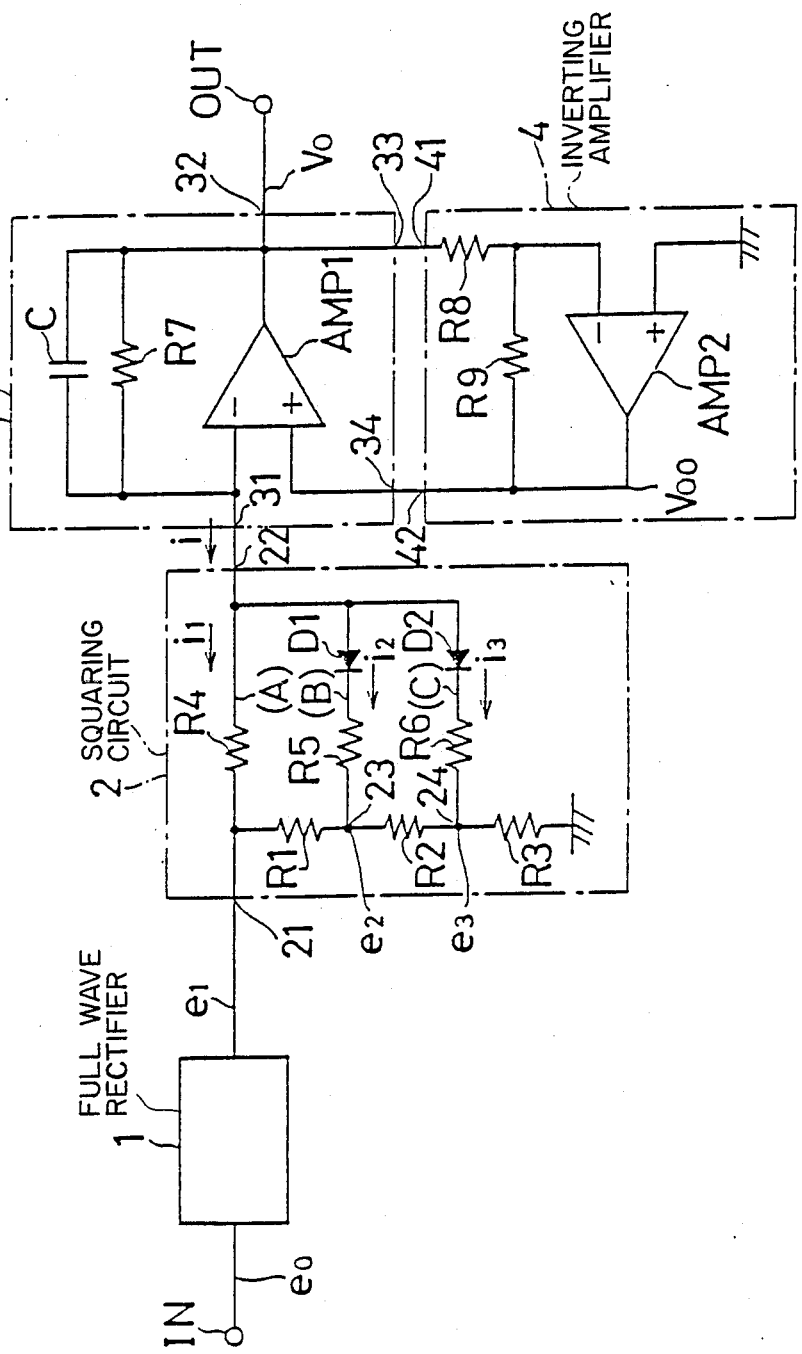
FIG. 31, like FIGS. 22, 27, and 29 for the eighth, tenth, and eleventh preferred embodiments respectively, is a circuit diagram of the twelfth preferred embodiment of the present invention, which is also an AC effective value—DC conversion circuit.
Figure 32:
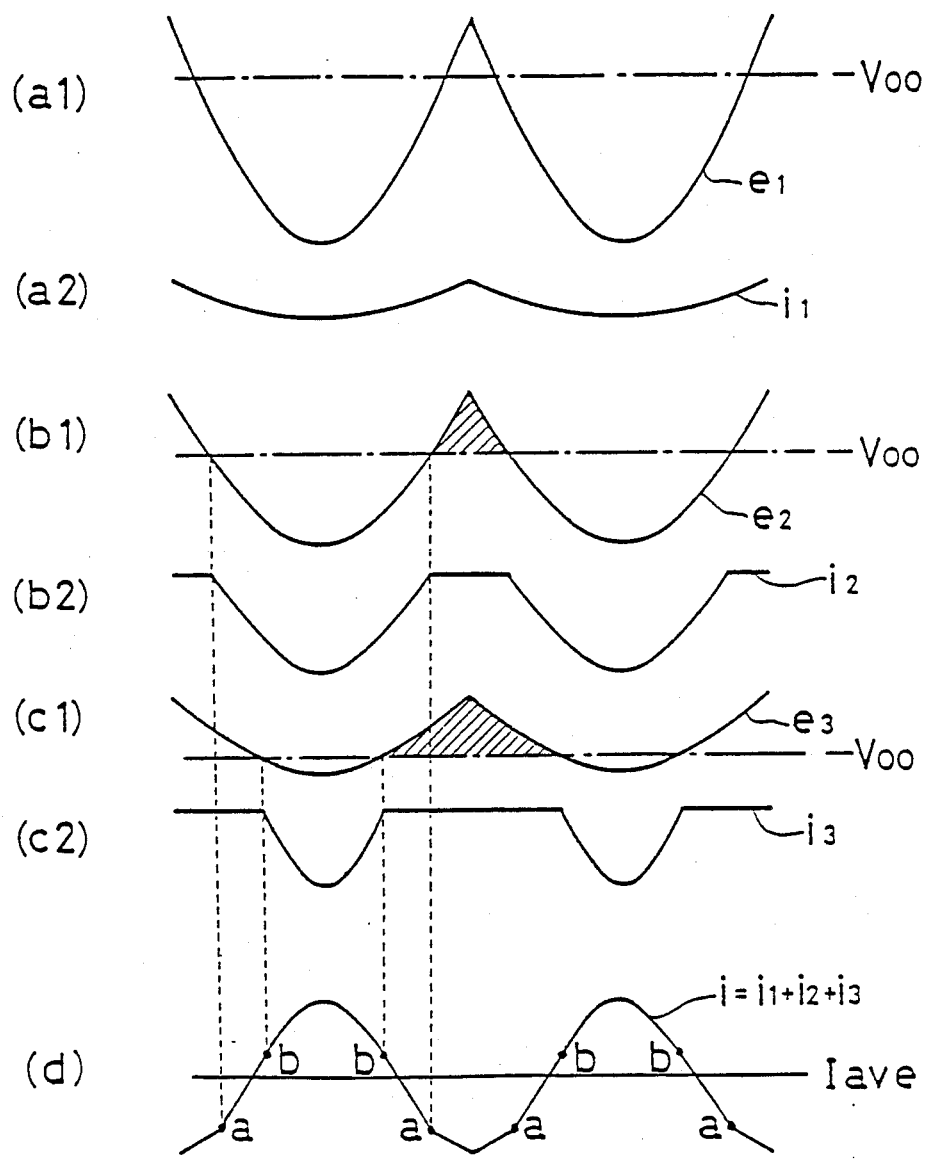
FIG. 32, like FIGS. 23, 28, and 30 for the eighth, tenth, and eleventh preferred embodiments respectively, is a time chart for illustrating the action of said twelfth preferred embodiment AC effective value—DC conversion circuit of FIG. 31.

The twelfth prefered embodiment of the present invention is also an AC effective value-DC conversion circuit, which will now be shown and described with the aid of FIGS. 31 and 32. FIG 31 is a circuit diagram of this twelfth preferred embodiment AC effective value-DC conversion circuit. In this figure, the reference symbol IN denotes an input for an AC voltage (e0) while OUT denotes an output for an effective value voltage (V0). The reference numeral 1 denotes a full wave rectifying circuit which full wave rectifies the AC voltage (e0) from the input terminal IN and outputs it as a positive rectified voltage (e1) which is to be effective value converted.

The reference numeral 2 denotes a squaring circuit having resistors R1 to R6 and diodes D1 and D2. This squaring circuit 2 comprises an input unit 21 which receives a rectified voltage (e1) from the full wave rectifying circuit 1, and an output unit 22 for outputting a squared electric current (i). The squaring circuit 2 further comprises a primary path A (including the resistor R4) for conducting a primary electric current (i1) between the input and the output output unit 21 and 22 thereof, and a pair of secondary paths B and C for conducting secondary electric currents (i2 and i3) between corresponding voltage points 23 and 24 which are lower in voltage than the rectified voltage (e1) and the output unit 22. The low voltage points 23 and 24 are the junctions between the resistors R1 and R2 and the resistors R2 and R3. The secondary paths B and C are provided with the resistor R5 and the diode D1, and the resistor R6 and the diode D2, respectively. Since the diodes D1 and D2 are intended to function as directive elements, they may be replaced by other directive elements such as transistors.

The reference numeral 3 denotes an averaging circuit which comprises an input unit 31 for supplying the squared current (i) to the output unit 22 of the squaring circuit 2, output units 32 and 33 for outputting the effective value voltage (V0) of the rectified voltage (e1) and an input unit 34 for receiving an inverted output (-V00). This averaging circuit 3 further comprises an operational amplifier AMP1 and a smoothing capacitor C and a resistor R7 for determining the gain of the operational amplifier which are connected in parallel between the inverting input terminal (−) and the output terminal of the operational amplifier AMP1. This averaging circuit 2 outputs the effective value voltage by averaging the rectified voltage (e1) according to the square current (i).

The reference numeral 4 denotes an inverting amplifier having an input terminal 41 which is connected to the output unit 33 of the averaging circuit 3 and an output terminal 42 which is connected to the output unit 34 of the averaging circuit 3. This inverting amplifier comprises a resistor R8 which is connected to its input unit 41 at its one end, an operational amplifier AMP2 which is connected at its inverting input terminal (−) to the other end of the resistor R8, and a resistor R9 which is connected across the inverting input terminal (−) and the output terminal of the operational amplifier AMP2. The output terminal of this operational amplifier AMP2 is connected to the output terminal 42 of the inverting amplifier 4.

Now the action of this twelfth preferred embodiment of the present invention is described in the following with reference to the waveform diagram of FIG. 32. FIG. 32 (a1) shows the waveform of the rectified voltage (e1) which is given from the full wave rectifying circuit 1 to the input unit 21 of the squaring circuit 2 while FIG. 32 (a2) shows the waveform of the primary current (i1) which flows through the resistor R4 in the primary path A of the squaring circuit 2. FIG. 32 (b1) shows the waveform of the voltage (e2) which appears at the junction 23 and FIG. 32 (b2) shows the waveform of the secondary current (i2) which flows through the resistor R5 in the secondary path B. FIG. 32 (c1) shows the waveform of the voltage (e3) which appears at the junction 24 while FIG. 32 (c2) shows the waveform of the secondary current (i3) which flows through the resistor R6 in the secondary path C. FIG. 32 (d) shows the waveform of the squared current (i) which appears at the node 21. In the drawings, -V00 denotes the output of the inverting amplifier 4.

The rectified voltage (e1) of the waveform such as the one shown in FIG. 32 (a1) is supplied to the input unit 21 of the squaring circuit 2. Since the input unit 31 of the averaging circuit 3 is imaginarily short circuited the primary current (i1) which flows through the resistor R4 of the squaring circuit 2 corresponds to the voltage difference between the rectified voltage (e0) and the output voltage (-V00) of the inverting amplifier 4. This can be mathematically expressed by the equation $i1 = -(e1 - V00)/R4$, where i1 is the electric current value of the primary current, e1 is the voltage value of the rectified voltage (e1), and R4 is the resistive value of the resistor R4. Also, of course, "/" denotes arithmetic division. The waveform of the first current (i1) is as shown in FIG. 32 (a2).

Since the rectified voltage (e1) which appears at the input unit 21 of the squaring circuit 2 is voltage divided by the resistors R1, R2 and R3 at the junctions 23 and 24, the voltage (e2) at the junction 24 becomes as shown in FIG. 32 (b1). In other words, this voltage (e2) has the intervals of positive voltage as shown by the hatched lines. Therefore, the secondary current (i2) which flows through the resistor R5 is made as shown in FIG. 32 (b2) by the conduction of the diode D1 if the negative voltage (e2) is lower that the output voltage (-V00) of the inverting amplifier 4. Likewise, the voltage (e3) at the junction 24 becomes as shown in FIG. 34 (c1). Therefore, the secondary current (i3) which flows through the resistor R6 is made as shown in FIG. 32 (c2) by the diode D2.

Since these currents (i1, i2 and i3) are summed at a junction 22 the summed current or the squared current will look as shown in FIG. 32 (d). In the waveform of the squared current (i), the interval a-a corresponds to the secondary current (i2) while the interval b-b corresponds to the secondary current (i3).

The magnitudes of the various currents (i1, i2 and i3) depend on the resistive values of the various resistors R4, R5 and R6, and, by appropriately selecting these resistive values it is possible to approximate or simulate the waveform of the squared current (i) to the square of the rectified voltage (V0). Furthermore, the waveform of the squared current (i) of FIG. 32 (d) had bends at two points in one quarter of each cycle, but by increasing the number of the junctions 23 and 24 it is possible to better approximate the bent line to a square (quadratic) curve.

Therefore, since the square of the AC voltage (e0) which is applied to the full wave rectifying circuit 1 is the square of the rectified voltage (e1), the squared current (i) is proportional to the square of the AC voltage (e0) and inversely proportional to the output (-V00) of the inverting amplifier 4 or can be expressed by the following mathematical expression:

$$i = (k1 \cdot e0^2)/V00 \qquad (1)$$
$$= (k1 \cdot e0^2)/(k2 \cdot V0)$$

where $V00 = k2 \, V0$, i is the current value of the squared current (i), k1 and k2 are constants, e0 is the voltage value of the rectified voltage, V0 is the voltage value of the output of the averaging circuit and -V00 is the output voltage of the inverting amplifier 4.

This squared current (i) is averaged by the averaging circuit 3 into an averaged current (Iave) as shown in FIG. 32 (d). In the averaging circuit 3, since the averaged current (Iave) flows through the resistor R7 thereof, the averaged voltage (V0) can be expressed by the following equation (2):

$$V_0 = -V_{00} + R_7 \cdot I_{ave} = -k_2 \cdot V_0 + R_7 \cdot (1/T) \cdot \int \{(k_1 \cdot e_0^2)/(k_2 \cdot V_0)\} dt \qquad (2)$$

where R7 is the resistive value of the resistor R7, Iave is the current value of the averaged current (Iave), e0 is the voltage value of the AC voltage (e0), V0 is the voltage value of the effective value voltage (V0), and T is one half of the interval of the AC voltage (e0).

Therefore, the effective value voltage can be expressed by the following equation (3):

$$V_0 = \sqrt{(k_1 \cdot R_7)/\{k_2 \cdot T(1 + k_2)\} \cdot \int e_0^2 dt} \qquad (3)$$

Since this equation (3) is identical to the theoretical formula for the effective value, the effective value voltage (V0) which is the output of the averaging circuit 3 is indeed the effective value.

In this twelfth preferred embodiment of the present invention, since there is no circuit element which limits its frequency property, it can provide favorable frequency characteristics. The time constant thereof is determined by the capacitive value of the capacitor C and the resistive value of the resistor R7 but since the time constant can be reduced to the extent where the ripple component of the AC voltage (e0) is not affected thereby its response can be extremely fast. Furthermore, since the effective value conversion is based on the theoretical formula for the effective value, the distortion of the output is extremely small as compared to the circuit for the pseudo effective value conversion, and highly reliable effective value conversion can be effected.

Although the squaring circuit 2 of the above twelfth preferred embodiment of the present invention was based on approximation using a plurality of diodes, the present invention is not to be considered as limited thereby, but the squaring circuit 2 may be a squaring circuit using transistors.

Although in the above described embodiment the rectified voltage (e1) was positive, alternatively it could also be made negative by changing the polarities of the diodes D1 and D2.

Disclaimer

Although the present invention has been shown and described in terms of the preferred embodiments thereof, and with reference to the appended drawings, it should not be considered as being particularly limited thereby, since the details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiments, or of the drawings, but solely by the scope of the accompanying claims, which follow.

What is claimed is:

1. An AC effective value-DC conversion circuit, comprising:
   a squaring circuit having an input unit for receiving a rectified voltage which is to be effective value converted, an output unit for outputting a squared electric current, and a negative feedback input unit for inputting a negative feedback voltage; and
   an averaging circuit having an input unit for receiving the squared electric current from the output unit of the squaring circuit, and an output unit for outputting an effective value voltage of the rectified voltage, and outputting the rectified voltage as a feedback voltage to the negative feedback input unit;
   the squaring circuit comprising:
   a first conversion means for converting the rectified voltage given to the input unit thereof into an electric current which is proportional to the rectified voltage value;
   a second conversion means including (a) voltage dividing means for dividing a total voltage obtained by adding the rectified voltage and said feedback voltage, (b) voltage-to-current converting means directly connected to said voltage dividing means for converting a voltage divided by said voltage dividing means into a current, and (c) rectifying means for rectifying said current from said voltage-to-current converting means; and
   a summing means for summing the electric currents from the two conversion means and outputting the summed current as the squared electric current.

2. An AC effective value-DC conversion circuit, comprising:
   a squaring circuit having an output unit at which a squared current appears and a negative feedback input unit for inputting a negative feedback voltage;
   an averaging circuit having an operational amplifier, one input terminal of the operational amplifier being connected to the output unit of the squaring circuit while another input terminal receives a rectified voltage which is to be effective value converted; and:
   a difference amplifier having an input terminal which is connected to an output unit of the operational amplifier of the averaging circuit, another input terminal which is connected to the one input terminal of the operational amplifier of the averaging circuit, and an output terminal which is connected to the negative feedback input unit of the squaring circuit;
   the squaring circuit comprising:
   a primary path which conducts a primary electric current which corresponds to the voltage difference between the rectified voltage and the ground voltage or the voltage difference between the rectified voltage and a negative feedback voltage; and:
   a secondary path which conducts a secondary electric current between a voltage point which is lower than the rectified voltage and the ground voltge or the negative feedback voltage;
   a directional element such as a diode being provided in the secondary path; and:
   a sum electric current produced as a sum of the primary and the secondary electric current becoming the squared current.

3. An AC effective value-DC conversion circuit, comprising:
   a squaring circuit having an input unit which receives a rectified voltage which is to be effective value converted, and an output unit at which a squared current appears;
   an averaging circuit having an operational amplifier, one input terminal of the operational amplifier being connected to the output unit of the squaring circuit; and:
   an inverting amplifier which inverts and amplifies an output of the averaging circuit and supplies its output to another input terminal of the operational amplifier of the averaging circuit;
   the squaring circuit comprising a primary path which conducts a primary electric current between its input unit and output unit, and a secondary path which conducts a secondary electric current between a voltage point which is lower than the rectified voltage and the output unit;
   a directional element such as a diode being provided in the secondary path; and:
   a sum electric current produced as a sum of the primary electric current and the secondary electric current becoming the squared current.

* * * * *

UNITED STATES PATENT AND TRADEMARK OFFICE
CERTIFICATE OF CORRECTION

PATENT NO. : 4,875,016

DATED : October 17, 1989

INVENTOR(S) : Hideaki NAKAMURA, Tamotsu SHIMAMORI, Shinichi MURASHIGE

It is certified that error appears in the above-identified patent and that said Letters Patent is hereby corrected as shown below:

On the title page, under item [19], "Nakamura et al." should be
--Murashige--; and On the title page, in item [75], delete
"Hideaki Nakamura, Joyo;
Tamotsu Shimamori, Nagaokakyo;"

so that the patent reads:
-- Shinichi Murashige
Kyoto, Japan --.

Signed and Sealed this

Sixth Day of October, 1992

*Attest:*

DOUGLAS B. COMER

*Attesting Officer*     *Acting Commissioner of Patents and Trademarks*